United States Patent
Watanabe

(10) Patent No.: US 9,807,808 B2
(45) Date of Patent: Oct. 31, 2017

(54) COMMUNICATION SYSTEM, COMMUNICATION DEVICE, AND COMMUNICATION METHOD

(71) Applicant: FUJITSU LIMITED, Kawasaki-shi (JP)

(72) Inventor: Naotoshi Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 382 days.

(21) Appl. No.: 14/489,053

(22) Filed: Sep. 17, 2014

(65) Prior Publication Data

US 2015/0173114 A1    Jun. 18, 2015

(30) Foreign Application Priority Data

Dec. 17, 2013  (JP) .................. 2013-260619

(51) Int. Cl.
| | |
|---|---|
| *H04J 1/10* | (2006.01) |
| *H04W 76/02* | (2009.01) |
| *H04W 8/26* | (2009.01) |
| *H04W 28/08* | (2009.01) |

(52) U.S. Cl.
CPC .......... *H04W 76/021* (2013.01); *H04W 8/26* (2013.01); *H04W 28/08* (2013.01)

(58) Field of Classification Search
None
See application file for complete search history.

(56) References Cited

U.S. PATENT DOCUMENTS

| | | | |
|---|---|---|---|
| 2002/0026560 A1 | 2/2002 | Jordan et al. | |
| 2003/0177176 A1* | 9/2003 | Hirschfeld | G06F 9/485 709/203 |
| 2013/0279375 A1* | 10/2013 | Newberg | H04W 88/16 370/260 |

FOREIGN PATENT DOCUMENTS

| | | |
|---|---|---|
| JP | 2002-527818 A | 8/2002 |
| JP | 2005-267016 A | 9/2005 |
| WO | WO 00/22526 A1 | 4/2000 |

\* cited by examiner

*Primary Examiner* — Omar Ghowrwal
*Assistant Examiner* — Angel Brockman
(74) *Attorney, Agent, or Firm* — Arent Fox LLP

(57) ABSTRACT

A communication system includes a first device configured to transmit first data, a second device, a third device, a fourth device, and a storage device configured to store correspondence information, and when the second device is in the first state, the second device transmits the first data to the address of the third device, and when the second device is in the second state, the second device transmits the first data to the fourth device, the second device notifies the fourth device of the address of the second device, the fourth device receives the first data and notifies the storage device of the address of the second device, the storage device notifies the fourth device of the address of the third device associated with the address of the second device based on the correspondence information, and the fourth device transmits the first data to the address of the third device.

18 Claims, 43 Drawing Sheets

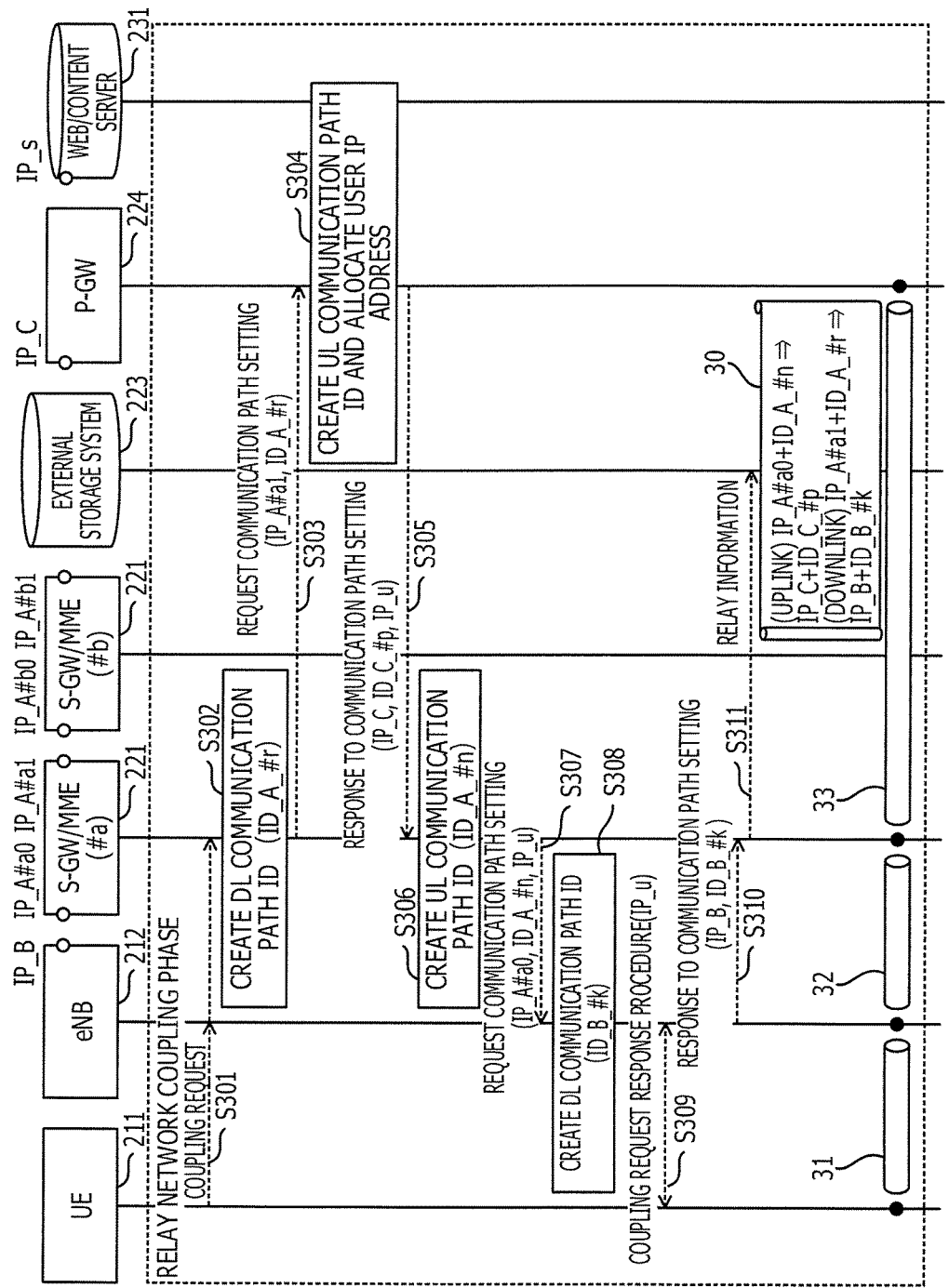

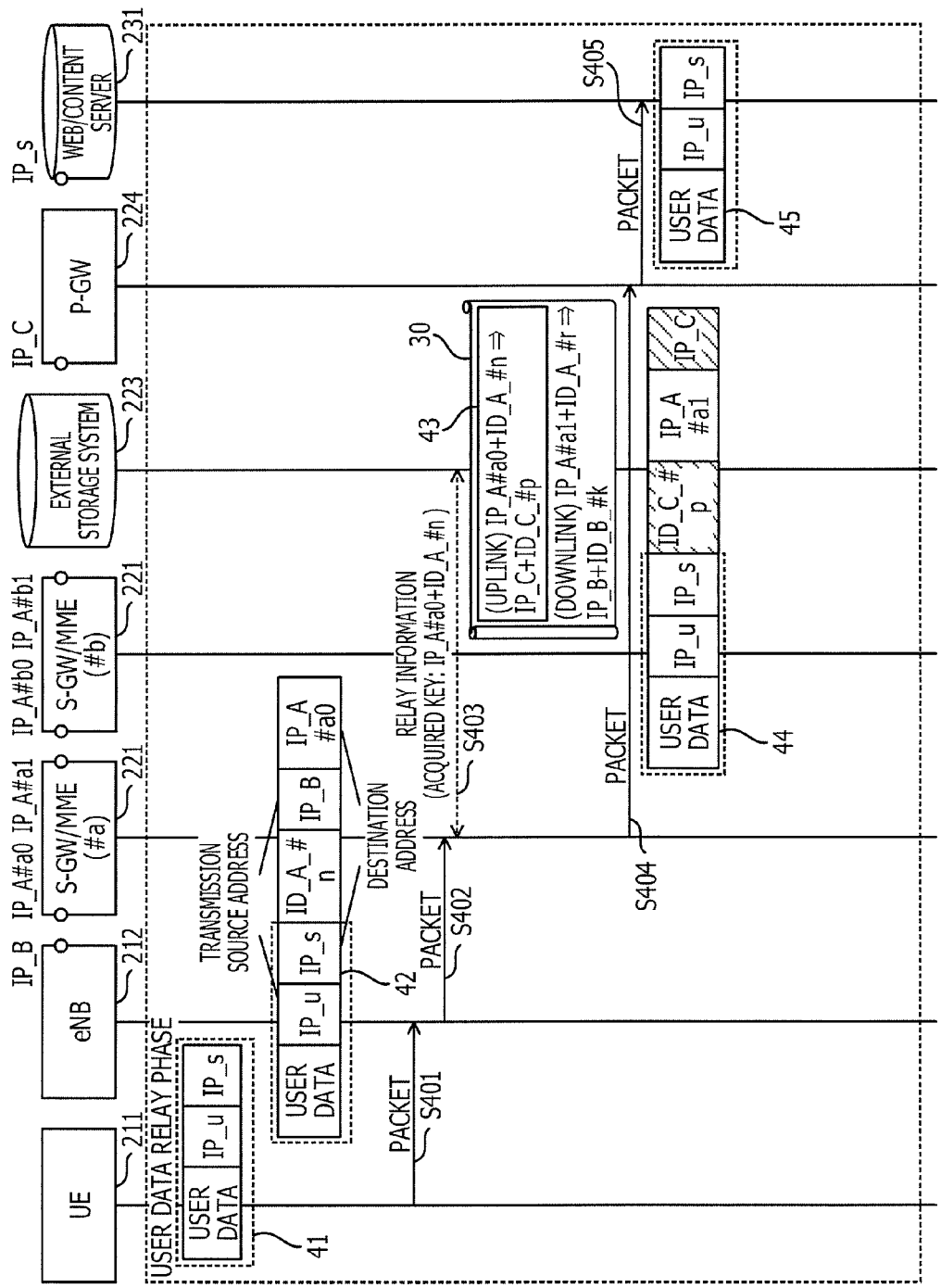

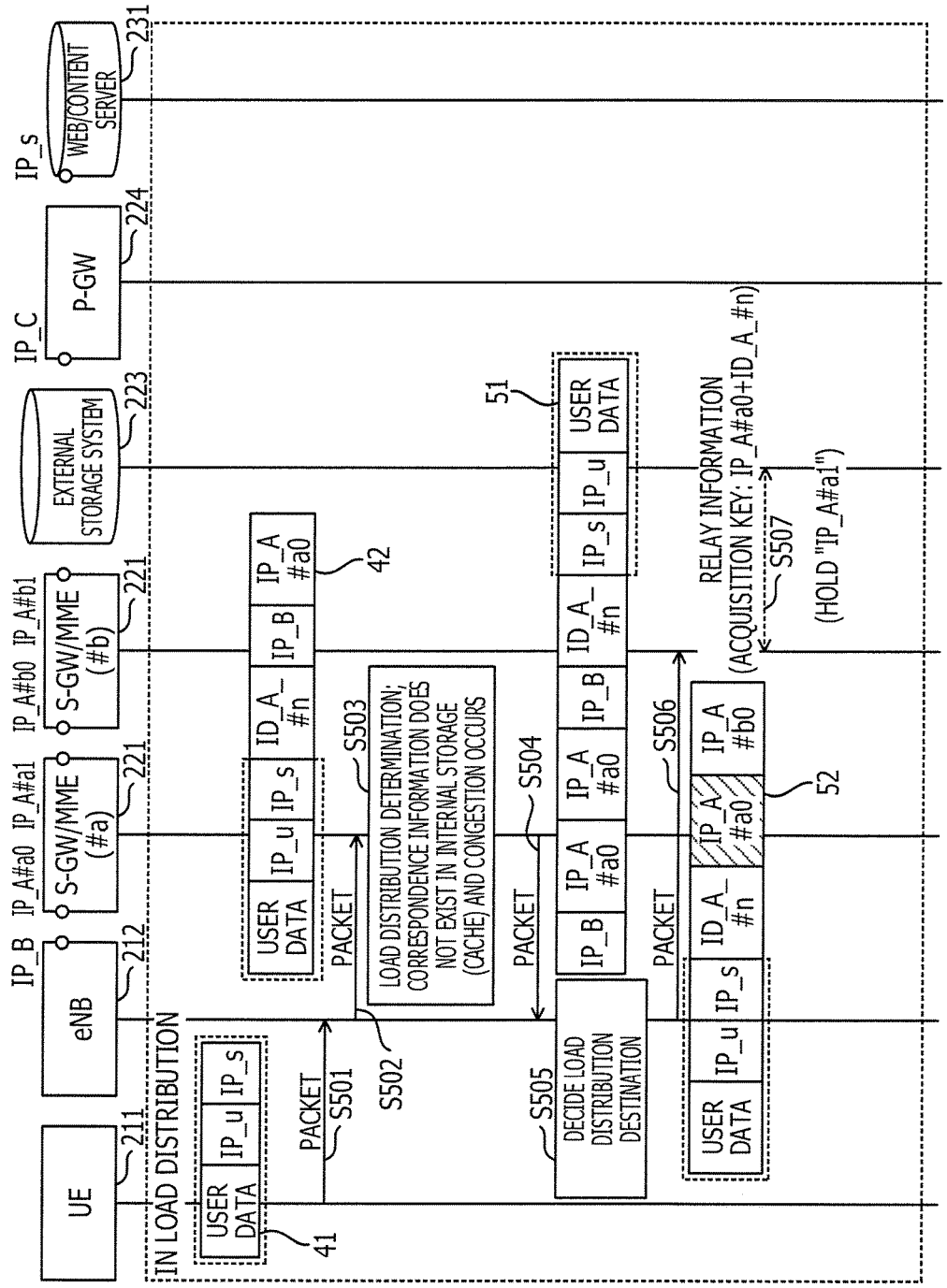

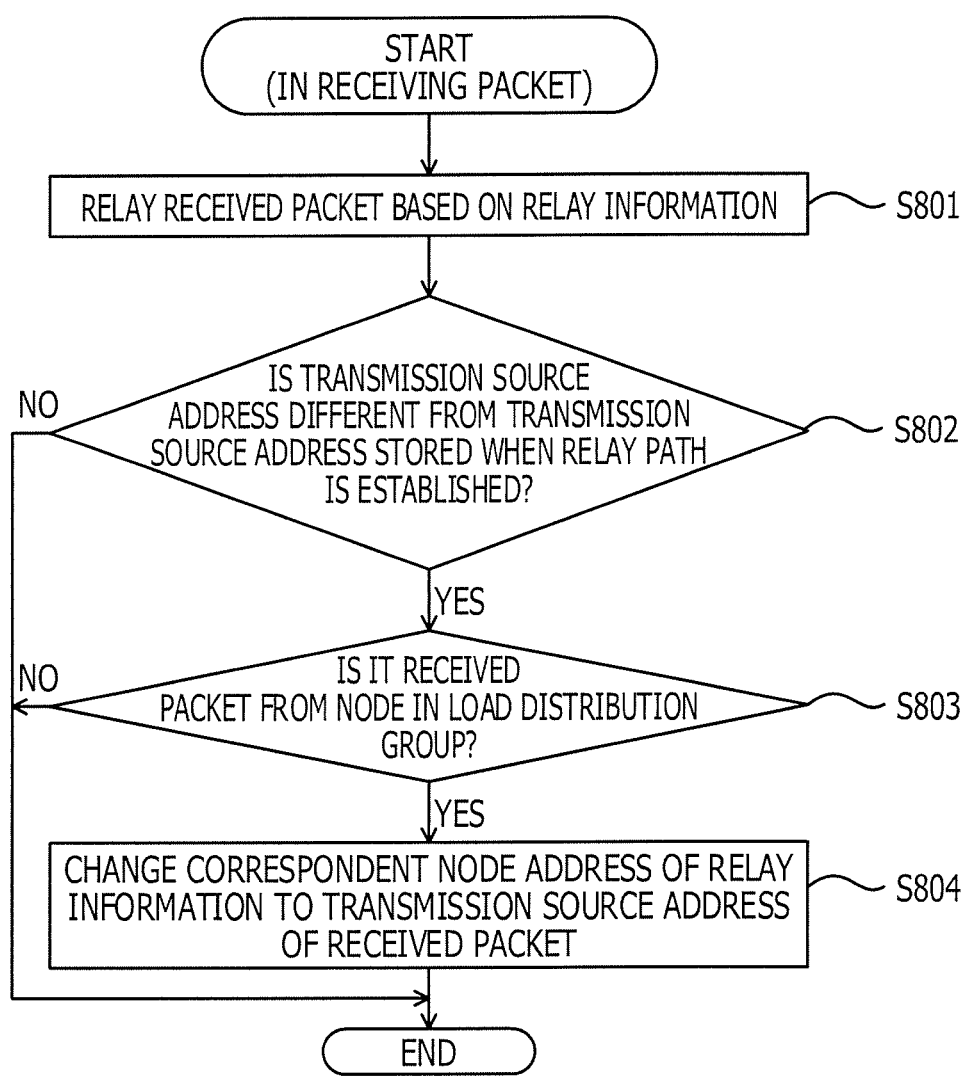

FIG. 9B

| 910 | 911 DESTINATION ADDRESS (OWN NODE ADDRESS) | 912 RECEIVED DATA COMMUNICATION PATH ID | 913 CORRESPONDENT NODE ADDRESS (FOR CHECKING TRANSMISSION SOURCE) | 914 CORRESPONDENT NODE ADDRESS | 915 COMMUNICATION PATH ID | 916 OWN NODE ADDRESS IN TRANSMISSION SOURCE |
|---|---|---|---|---|---|---|
| (DOWNLINK) | **** | **** | **** | **** | **** | **** |
| (UPLINK) | IP_A#a0 | ID_A_#n | IP_B | IP_C | ID_C_#p | IP_A#a1 |
| (DOWNLINK) | IP_A#a1 | ID_A_#r | IP_C | IP_B | ID_B_#k | IP_A#a0 |
| (UPLINK) | | | | | | |

FIG. 11A

| RECEIVED DATA | | TRANSMISSION DATA | | |
|---|---|---|---|---|
| RADIO COMMUNICATION PATH IDENTIFIER (1111) | CORRESPONDENT NODE ADDRESS (1112) | COMMUNICATION PATH ID (1113) | OWN NODE ADDRESS IN TRANSMISSION SOURCE (1114) | PREVIOUS CORRESPONDENT NODE ADDRESS (BEFORE LOAD DISTRIBUTION) (1115) |
| **** | **** | **** | **** | **** |
| ID#x | IP_A#b0 | ID_A_#n | IP_B | IP_A#a0 |

FIG. 13A

| DESTINATION ADDRESS (OWN NODE ADDRESS) | RECEIVED DATA | | CORRESPONDENT NODE ADDRESS (FOR CHECKING TRANSMISSION SOURCE) | TRANSMISSION DESTINATION INTERFACE | REVERSE RELAY INFORMATION MANAGEMENT NUMBER |
|---|---|---|---|---|---|
| | COMMUNICATION PATH ID | | | | |
| **** | **** | | **** | **** | **** |
| IP_C | ID_C_#p | | IP_A#a1 | IF#x | 100 |

| 1321 RELAY INFORMATION MANAGEMENT NUMBER | RECEIVED DATA | | 1324 CORRESPONDENT NODE ADDRESS | 1325 COMMUNICATION PATH ID | 1326 OWN NODE ADDRESS IN TRANSMISSION SOURCE |
|---|---|---|---|---|---|
| | 1322 RECEPTION INTERFACE | 1323 DESTINATION ADDRESS (UE ADDRESS) | | | |
| **** | **** | **** | **** | **** | **** |
| 100 | IF#x | IP_u | IP_A#b1 | ID_A_#r | IP_C |

1320

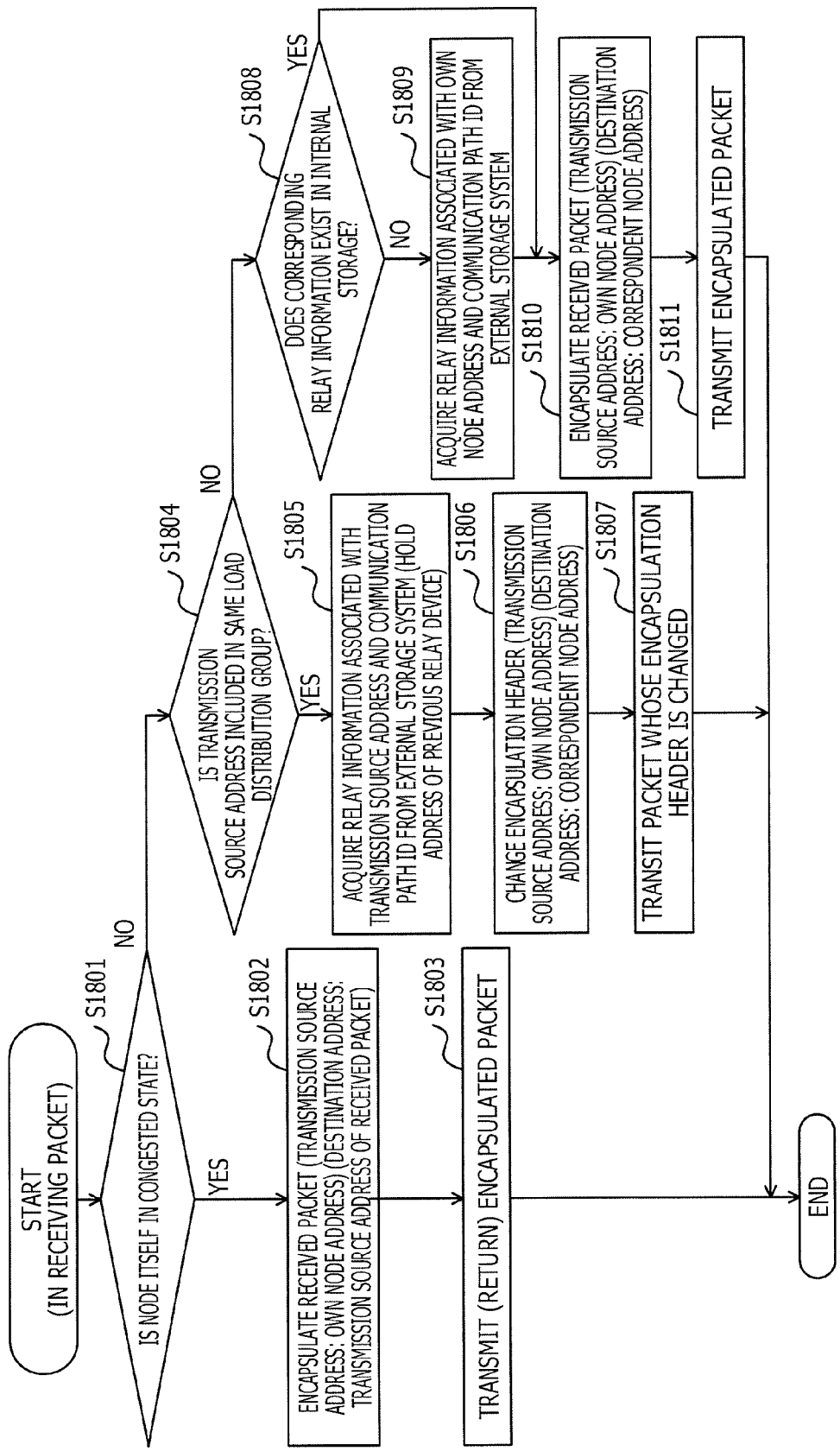

FIG. 21A

| | RECEIVED DATA | TRANSMISSION DATA | | | |
|---|---|---|---|---|---|
| | RADIO COMMUNICATION PATH IDENTIFIER (1111) | CORRESPONDENT NODE ADDRESS (1112) | COMMUNICATION PATH ID (1113) | OWN NODE ADDRESS IN TRANSMISSION SOURCE (1114) | PREVIOUS NODE ADDRESS (BEFORE LOAD DISTRIBUTION) (1115) |
| | **** | **** | **** | **** | **** |
| | ID#x | IP_A#c0 | ID_A_#n | IP_B | IP_A#a0 |

| | RECEIVED DATA | | TRANSMISSION DATA |
|---|---|---|---|
| DESTINATION ADDRESS (OWN NODE ADDRESS) | COMMUNICATION PATH ID | CORRESPONDENT NODE ADDRESS (FOR CHECKING TRANSMISSION SOURCE) | RADIO COMMUNICATION PATH IDENTIFIER |
| **** | **** | **** | **** |
| IP_B | ID_B_#k | IP_A#c0 | ID#x |

1120, 1121, 1122, 1123, 1124

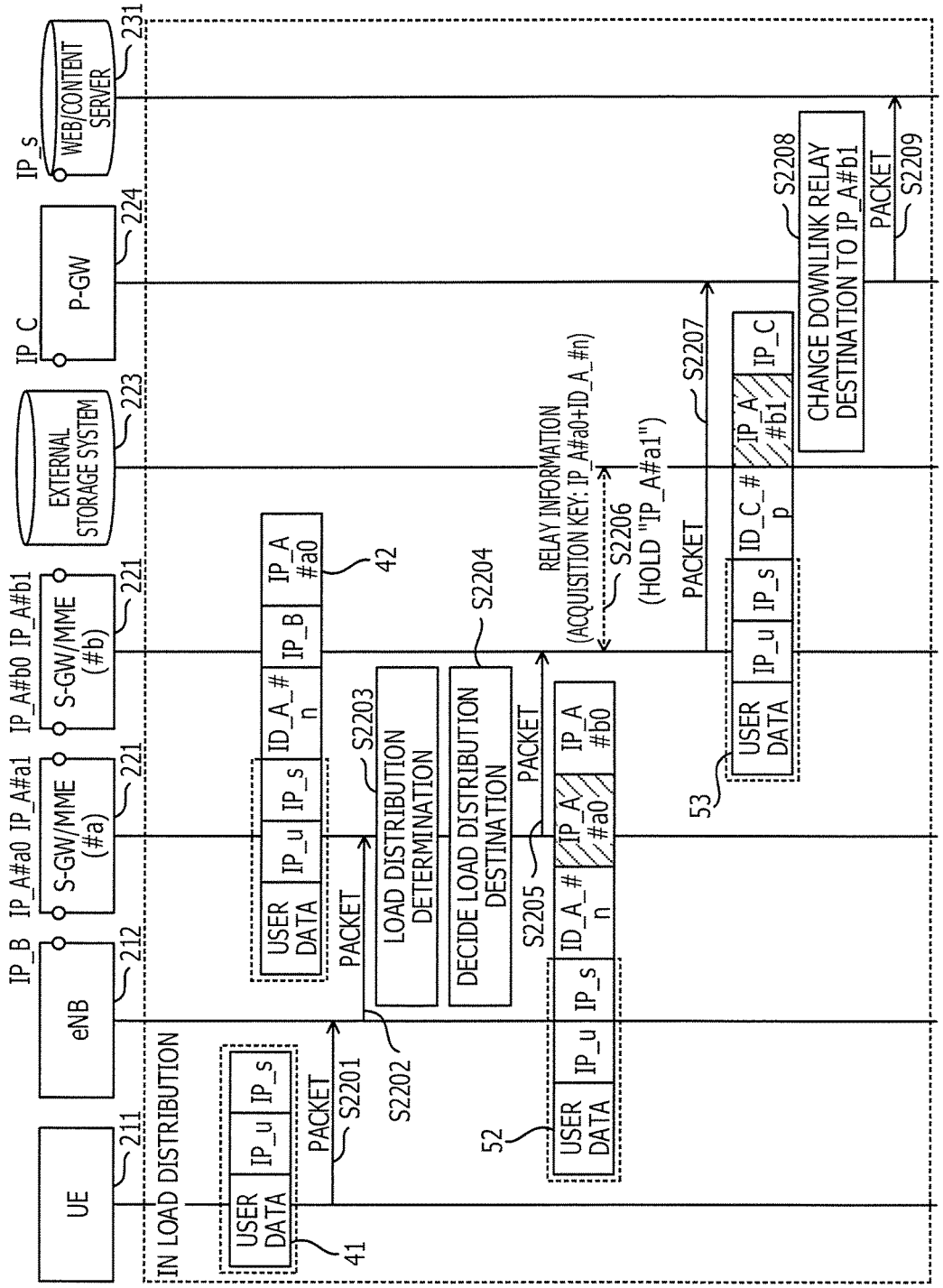

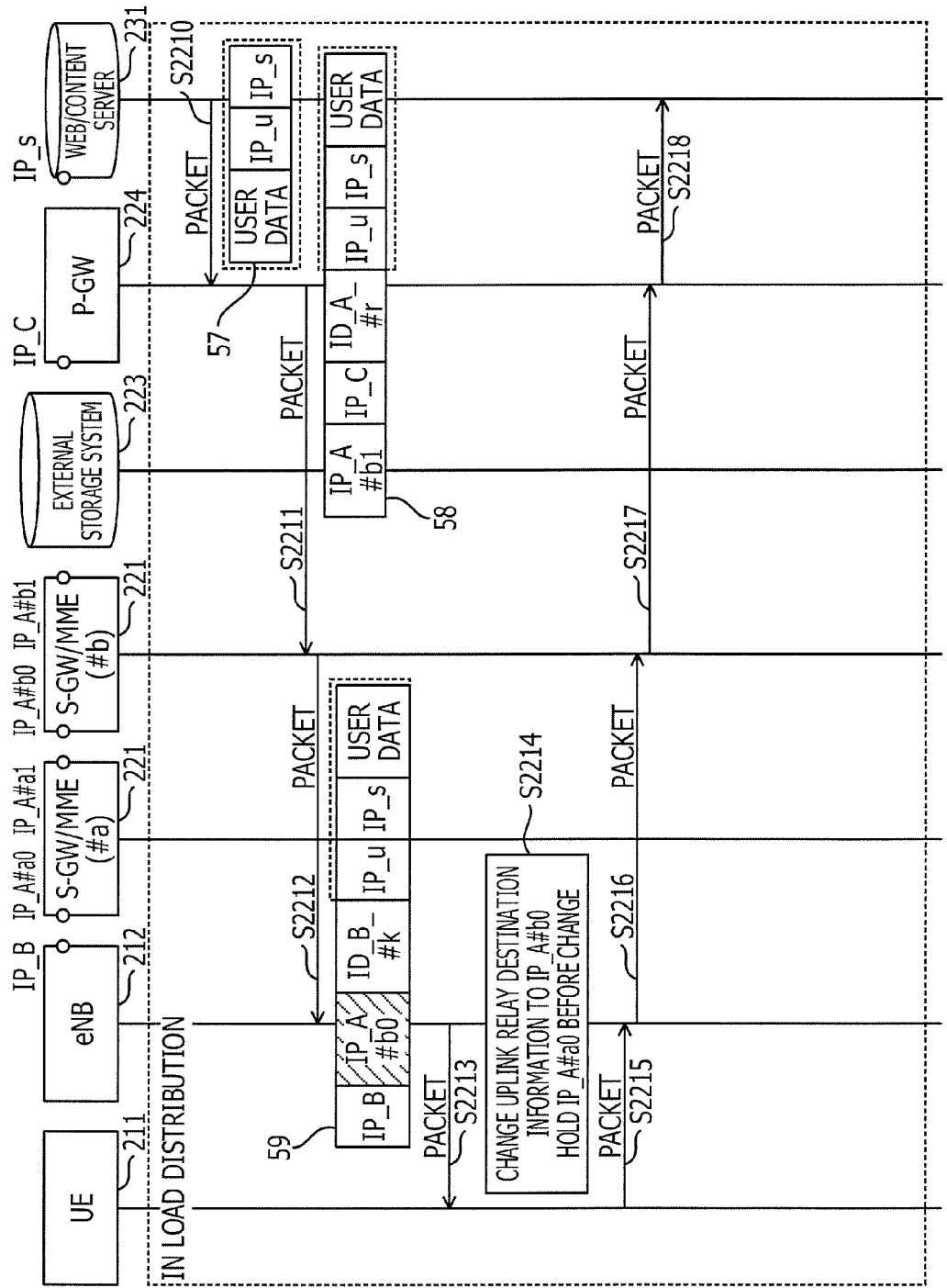

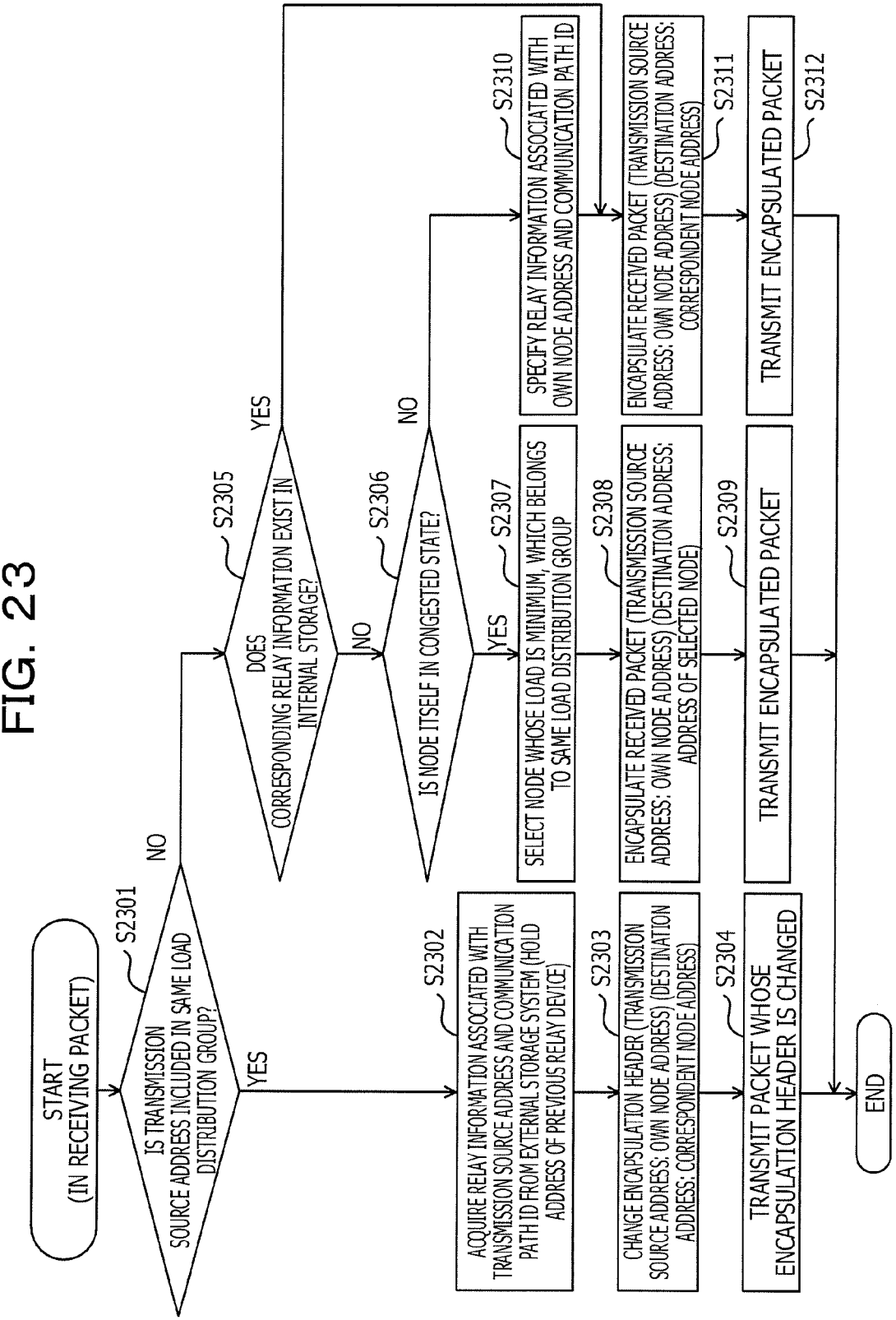

FIG. 25B

| 1120 | DESTINATION ADDRESS (OWN NODE ADDRESS) 1121 | RECEIVED DATA — COMMUNICATION PATH ID 1122 | CORRESPONDENT NODE ADDRESS (FOR CHECKING TRANSMISSION SOURCE) 1123 | TRANSMISSION DATA — RADIO COMMUNICATION PATH IDENTIFIER 1124 |
|---|---|---|---|---|
| | **** | **** | **** | **** |
| | IP_B | ID_B_#k | IP_A#b0 | ID#x |

COMMUNICATION SYSTEM, COMMUNICATION DEVICE, AND COMMUNICATION METHOD

CROSS-REFERENCE TO RELATED APPLICATION

This application is based upon and claims the benefit of priority from the prior Japanese Patent Application No. 2013-260619 filed on Dec. 17, 2013, the entire contents of which are incorporated herein by reference.

FIELD

The embodiments discussed herein are related to a communication system, a communication device, and a communication method.

BACKGROUND

A technique has been known in which a remote authentication dial in user service (RADIUS) server, which receives a request from a gateway general packet radio service support node (GGSN), stores information in the request in a database as session information for each user and transmits a replica of the session information to a wireless application protocol gateway (WAP-GW).

There is also a known technique for load balancing in a system including a collection of cooperating cache servers, in which, in response to a cache miss for an object, one or more of requests for the object are shifted between cooperating cache servers. Related art documents include Japanese Laid-open Patent Publication No. 2005-267016 and Japanese National Publication of International Patent Application No. 2002-527818.

SUMMARY

According to an aspect of the invention, a communication system includes a first device configured to transmit first data, a second device, a third device, a fourth device, and a storage device configured to store correspondence information, wherein the second device receives the first data and determines whether the second device is in a first state or a second state, and when the second device is in the first state, the second device notifies the storage device of an address of the second device, the storage device notifies the second device of an address of the third device associated with the address of the second device based on the correspondence information, and the second device transmits the first data to the address of the third device, and when the second device is in the second state, the second device transmits the first data to the fourth device, the second device notifies the fourth device of the address of the second device, the fourth device receives the first data and notifies the storage device of the address of the second device, the storage device notifies the fourth device of the address of the third device associated with the address of the second device based on the correspondence information, and the fourth device transmits the first data to the address of the third device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a sequential diagram illustrating an example of an operation in a relay network coupling phase in the communication system according to the second embodiment;

FIG. 4 is a sequential diagram illustrating an example of an operation in a user data relay phase in the communication system according to the second embodiment;

FIG. 5A is a sequential diagram (No. 1) illustrating an example operation performed in load distribution in the communication system according to the second embodiment.

FIG. 8 is a flowchart illustrating example processing which is performed on a downstream node of the load distribution destination node according to the second embodiment;

FIG. 9B is a diagram illustrating an example relay table of the load distribution destination node after the relay network coupling phase;

FIG. 11A is a diagram illustrating an example uplink relay table which is stored in the load distribution source node according to the second embodiment;

FIG. 13A is a diagram illustrating an example uplink relay table of the downstream node of the load distribution destination node according to the second embodiment;

FIG. 13B is a diagram illustrating an example downlink relay table of the downstream node of the load distribution destination node according to the second embodiment;

FIG. 18 is a flowchart illustrating example processing which is performed on a load distribution destination node according to the third embodiment;

FIG. 21A is a diagram illustrating an example uplink relay table which is stored in a load distribution source node according to the third embodiment;

FIG. 21B is a diagram illustrating an example downlink rely table which is stored in the load distribution source node according to the third embodiment;

FIG. 22A is a sequential diagram (No. 1) illustrating an example of an operation in load distribution in a communication system according to a fourth embodiment;

FIG. 22B is a sequential diagram (No. 2) illustrating an example of an operation in load distribution in the communication system according to the fourth embodiment;

FIG. 23 is a flowchart illustrating example processing which is performed on a load distribution destination node according to the fourth embodiment;

FIG. 25B is a diagram illustrating an example downlink relay table which is stored in the load distribution source node according to the fourth embodiment;

DESCRIPTION OF EMBODIMENTS

Figure 1A:
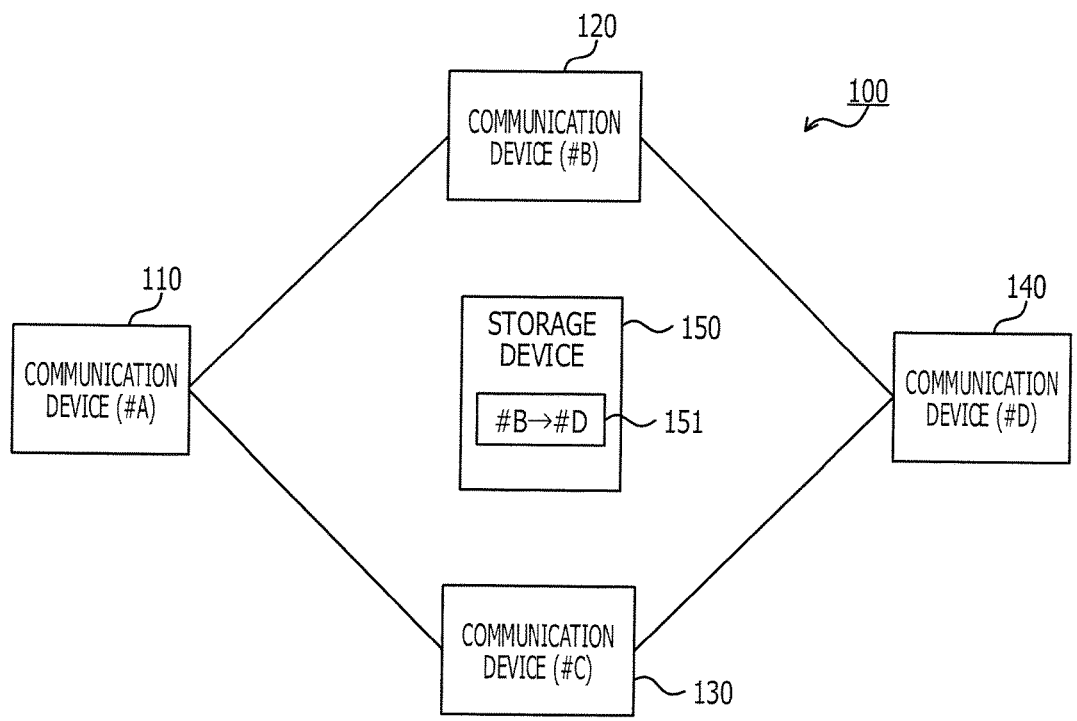
FIG. 1A is a diagram illustrating an example communication system according to a first embodiment.

A conventional technique has such a problem that, when a communication of a relay device is distributed to another relay device for load distribution, communication is not efficiently performed because a communication path is reestablished.

An object of the present embodiment is to provide a communication system, a communication device, and a communication method which are capable of improving communication efficiency. Hereinafter, a communication system, a communication device, and a communication method according the embodiments are described in detail by referring to the drawings.

First Embodiment

Figure 1B:
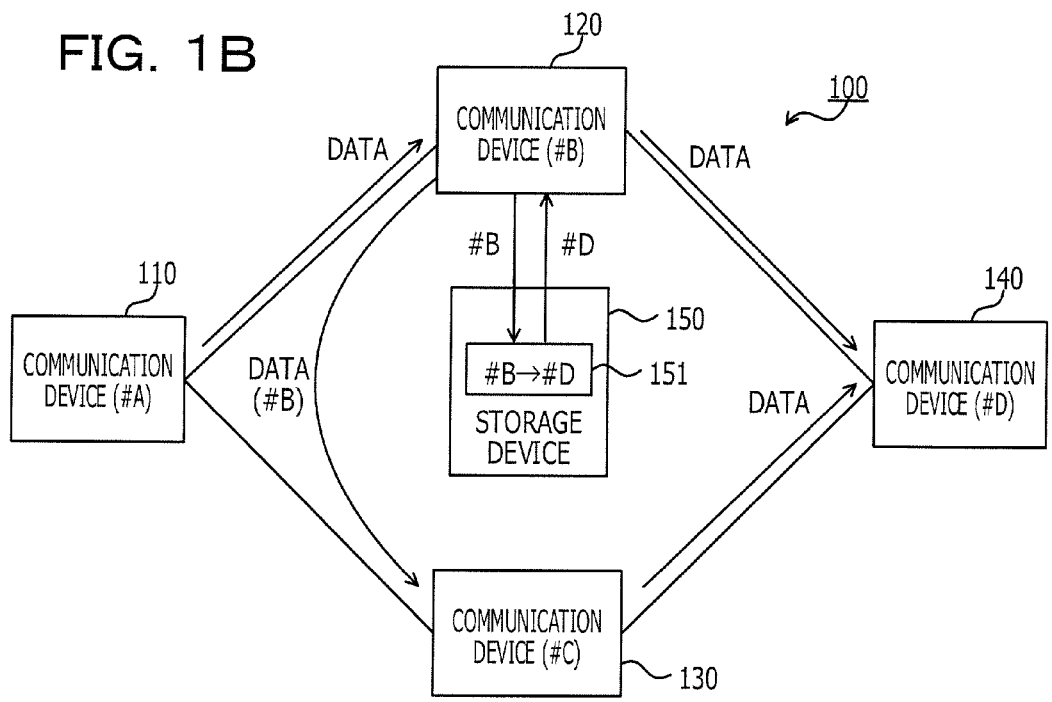
FIG. 1B is a diagram (No. 1) illustrating an example flow of signals in the communication system in FIG. 1A.
Figure 1C:
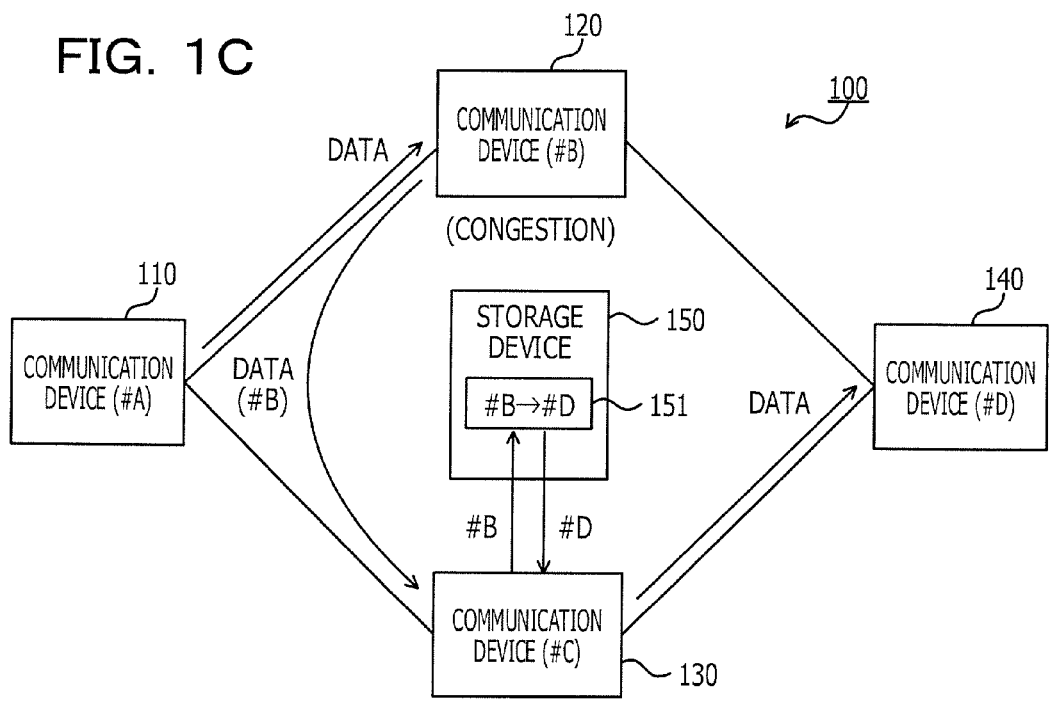
FIG. 1C is a diagram (No. 2) illustrating an example flow of signals in the communication system in FIG. 1A.

FIG. 1A is a diagram illustrating an example communication system according to a first embodiment. FIG. 1B is a diagram (No. 1) illustrating an example flow of signals in the communication system illustrated in FIG. 1A. FIG. 1C is a diagram (No. 2) illustrating an example flow of signals in the communication system illustrated in FIG. 1A. As illustrated in FIGS. 1A to 1C, a communication system 100 according to the first embodiment includes communication devices 110, 120, 130, and 140 (#A to #D), and a storage device 150.

The communication device 110 coupled to the communication devices 120 and 130. The communication device 140 is coupled to the communication devices 120 and 130. It is assumed in the examples in FIG. 1A to 1C that a communication path through which data passes the first communication device 110, the communication device 120, and the communication device 140 in this order is established.

The storage device 150 is a storage device which is provided in an outside of the communication device 120. In the examples illustrated in FIGS. 1A to 1C, the storage device 150 stores relay information 151 (from #B to #D) which associates an address (#B) of the communication device 120 with an address (#D) in a relay destination of data which is relayed by the communication device 120.

As illustrated in FIG. 1B, the communication device 110 first transmits data to the communication device 120.

When the data is received from the communication device 110 in a first state, the communication device 120 notifies the storage device 150 of the address (#B) of the communication device 120 so as to acquire the address (#D) in the relay destination associated with the address (#B) from the storage device 150. Then, the communication device 120 relays the data received from the communication device 110 to the relay destination address (#D) acquired from the storage device 150. Accordingly, through a communication path established as above, the data may be transmitted to the communication device 140.

As illustrated in FIG. 1C, when the data is received from the communication device 110 in a second state, the communication device 120 does not acquire the address (#D) in the relay destination from the storage device 150. The communication device 120 transfers the data received from the communication device 110 and the address (#B) of the communication device 120 to the communication device 130. The transfer to the communication device 130 is performed through the communication device 110, for example. Or the transfer to the communication device 130 may be performed without the communication device 110.

The communication device 130 notifies the storage device 150 of the address (#B) transferred from the communication device 120 so as to acquire the relay destination address (#D) from the storage device 150. The communication device 130 relays the data transferred from the communication device 120 to the relay destination address (#D) acquired from the storage device 150. Accordingly, through a communication path different from the established communication path, the data may be transferred to the communication device 140.

As described above, in the first embodiment, in the second state, the communication device 120 transfers the data received from the communication device 110 and the address (#B) of the communication device 120 to the communication device 130. Then, the communication device 130 acquires the relay destination address (#D) from the storage device 150 by using the address (#B) transferred from the communication device 120 and relays the data transferred from the communication device 120 to the relay destination address (#D).

As a result, when the communication device 120 is in the second state, load distribution to relay the data may be performed by the communication device 130 without reestablishing a communication path. Accordingly, the communications may become more efficient.

In addition, as compared with the case where various pieces of relay information of the communication device 120 are transmitted to the communication device 130, for example, an increase in load of communications between the communication devices may be suppressed.

<As for the First State and the Second State>

For example, the first state means a state where relay information 151 of the address (#B) of the communication device 120 and the relay destination address (#D) is stored in an internal memory (cache) of the communication device 120 or the communication device 120 is not in a predetermined congested state. Also, for example, the second state means a state where the relay information 151 of the address (#B) of the communication device 120 and the relay destination address (#D) is not stored in an internal memory (cache) of the communication device 120 or the communication device 120 is in a predetermined congested state.

In this case, in the first embodiment, when the communication device 120 is in a congested state and the relay information 151 is not stored in the internal memory of the communication device 120, the data may be relayed by the communication device 130 without reestablishing a communication path. Accordingly, an access of the communication device 120 to the storage device 150 in the congested state may be suppressed and communications may be made efficient.

Also, when the relay information 151 is stored in the internal memory (cache) of the communication device 120, the transfer is not performed so as to avoid redundantly storing the relay information in the communication devices 120 and 130. Accordingly, the efficiency deterioration of the memories (caches) of the communication devices 120 and 130 may be suppressed. In addition, an increase in the access to the storage device 150, along with the acquisition of the redundant relay information, may be suppressed.

<Modification of the Relay Information>

The relay information 151 may be information associating a combination of the address (#B) of the communication device 120 and an identifier of a communication path (from #A to #B) with a combination of the relay destination address (#D) of the data which is relayed by the communication device 120 and a identifier of a communication path (from #B to #D).

In this case, when the data is received from the communication device 110 in the first state, the communication device 120 notifies the storage device 150 of the address (#B) of the communication device 120 and the identifier of the communication path for the received data so as to acquire the combination of the relay destination address (#D) and the identifier of the communication path.

Similarly, the communication device 130 notifies the storage device 150 of the address (#B) transferred from the communication device 120 and the identifier of the communication path for the data transferred from the communication device 120 so as to acquire the combination of the relay destination address (#D) and the identifier of the communication path.

<As for the Configuration of Performing Transfer Through a Transmission Source>

For example, in the second state, the communication device 120 transfers the received data and the address (#B) of the communication device 120 to the communication device 130 through the communication device 110 which is a transmission source of the data. In this case, the communication device 120 sets the address (#B) of the communication device 120 as a transmission source and returns the data received from the communication device 110 to the communication device 110.

The communication device 110 transmits the data returned from the communication device 120 to the communication device 130 after the transmission source address (#B) of the communication device 120 is set as a transmission source. When the address in the transmission source of the data received by the communication device 130 is the address (#B) of the communication device 120, the communication device 130 notifies the storage device 150 of the address (#B) of the communication device 120 so as to acquire the relay destination address (#D) from the storage device 150.

As described above, the communication device 110 sets the address (#B) of the communication device 120 as the transmission source when transmitting the data returned from the communication device 120 to the communication device 130. Accordingly, the communication device 130 may be efficiently notified of that the data to be transmitted is transferred data from the communication device 120.

In addition, when the data returned by the communication device 120 is transmitted to the communication device 130, the communication device 110 may transmit following data whose identifier of a communication path is same as that of the data returned by the communication device 120 to the communication device 130 without transmitting it to the communication device 120. In this case, the communication device 110 also sets the address (#B) of the communication device 120 as a transmission source. Accordingly, in a case where congestion occurs in the communication device 120, relay to bypass the communication device 120 may be performed without reestablishing the communication path.

When the data returned from the communication device 120 is transmitted to the communication device 130, the communication device 140 in the relay destination may transmit the data which is addressed to the communication device 110 to the communication device 130. The data which is addressed to the communication device 110 represents, for example, response data to the data relayed by the communication device 130 to the communication device 140.

<Configuration of Performing Transfer without Involving Transmission Source>

The communication device 120 may transfer the data received in the second state and the address (#B) of the communication device 120 without involving the communication device 110 which is the transmission source of the data. In this case, the communication device 120 sets the address (#B) of the communication device 120 as a transmission source and transfers the data received from the communication device 110 to the communication device 130.

When the address in the destination source of the data received by the communication device 130 is the address (#B) of the communication device 120, the communication device 130 notifies the storage device 150 of the address of the communication device 120 so as to acquire the relay destination address (#D) from the storage device 150.

When the data transmitted to the communication device 120 is relayed by the communication device 130, the communication device 110 may transmit the following data whose identifier of the communication path is same as that of the data transmitted to the communication device 120 to the communication device 130 without transmitting it to the communication device 120. In this case, the communication device 110 also sets the address (#B) of the communication device 120 as a transmission source. Accordingly, in a state where congestion occurs in the communication device 120, relay to bypass the communication device 120 may be performed without reestablishing a communication path.

For example, when response data to the data transmitted to the communication device 120 is received from the communication device 130, the communication device 110 may determine that the data transmitted to the communication device 120 is relayed by the communication device 130.

<Communication Device in Relay Destination>

When the data is relayed by the communication device 130 to the communication device 140, the communication device 140 in the relay destination may transmit the data which is addressed to the communication device 110 to the communication device 130. The data which is addressed to the communication device 110 is, for example, response data to the data relayed by the communication device 130 to the communication device 140.

The communication device 130 transmits the data transmitted from the communication device 140 to the communication device 110. As described above, when a path of the data from the communication device 110 to the communication device 140 becomes a path passing through the communication device 130, a path of the data from the communication device 140 to the communication device 110 may also become a path passing through the communication device 130.

(Communication Device According to First Embodiment)

Figure 1D:
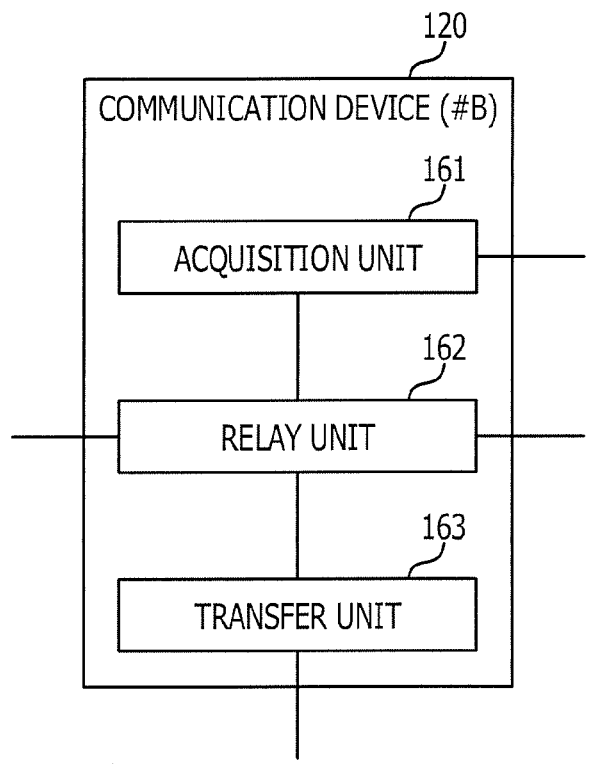
FIG. 1D is a diagram illustrating an example communication device (No. 1) according to the first embodiment.
Figure 1E:
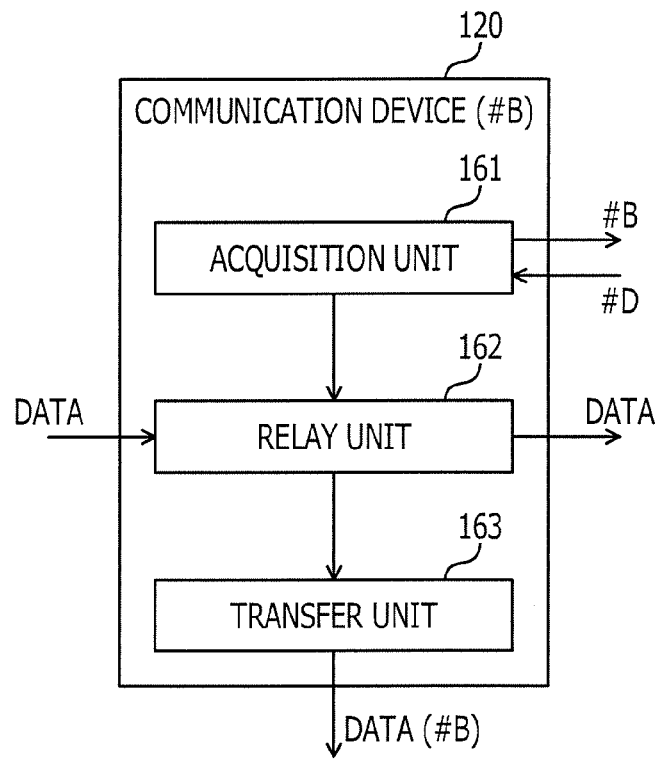
FIG. 1E is a diagram illustrating an example flow of signals in the communication device in FIG. 1D.

FIG. 1D is a diagram illustrating an example communication device (No. 1) according to the first embodiment. FIG. 1E is a diagram illustrating an example flow of signals in the communication device in FIG. 1D. The communication device 120 (#B) illustrated in FIGS. 1A to 1C includes, as illustrated in FIGS. 1D and 1E, an acquisition unit 161, a relay unit 162, and a transfer unit 163.

When the data from the communication device 110 is received in a case where the communication device 120 is in the first state, the acquisition unit 161 notifies the storage device 150 of the address (#B) of the communication device 120 so as to acquire the relay destination address (#D) associated with the address (#B) from the storage device 150. Then, the acquisition unit 161 outputs the acquired address (#D) to the relay unit 162. On the other hand, when the data from the communication device 110 is received in a case where the communication device 120 is in the second state, the acquisition unit 161 does not acquire the address (#D) from the storage device 150.

When the communication device 120 is in the first state, the relay unit 162 relays the data received from the communication device 110 to the relay destination address (#D) which is outputted from the acquisition unit 161. In this manner, the data may be transmitted to the communication device 140 through the established communication path.

In addition, when the communication device 120 is in the second state, the relay unit 162 outputs the data received from the communication device 110 and the address (#B) of the communication device 120 to the transfer unit 163. The transfer unit 163 transfers the data outputted from the relay unit 162 and the address (#B) of the communication device 120 to the communication device 130.

Figure 1F:
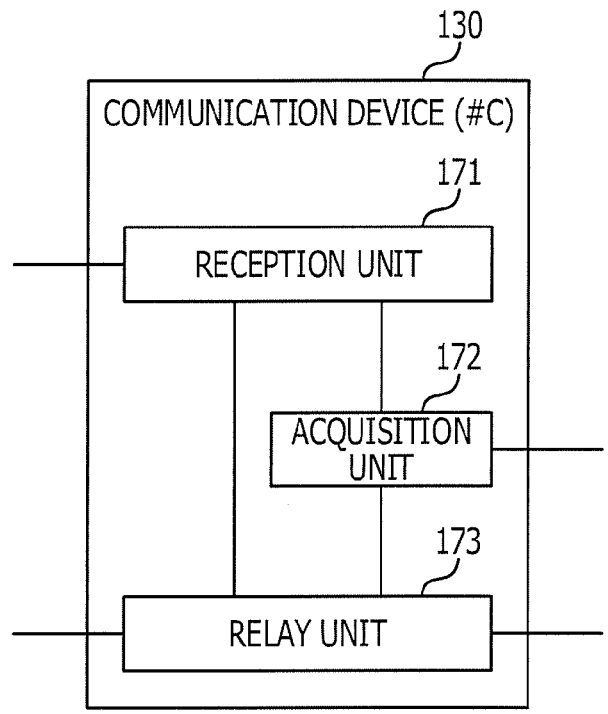
FIG. 1F is a diagram illustrating an example communication device (No. 2) according to the first embodiment.
Figure 1G:
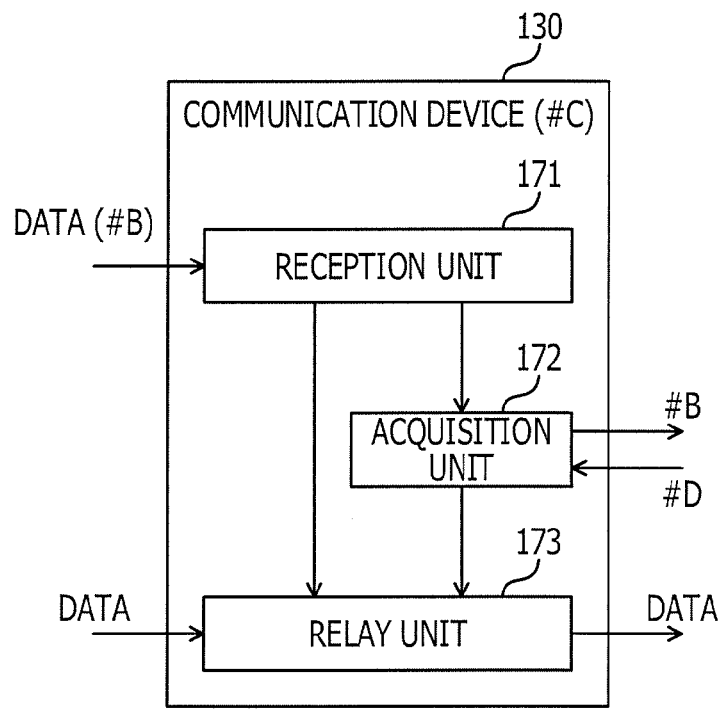
FIG. 1G is a diagram illustrating an example flow of signals in the communication device in FIG. 1F.

FIG. 1F is a diagram illustrating an example communication device (No. 2) according to the first embodiment. FIG. 1G is a diagram illustrating an example flow of signals in the communication device illustrated in FIG. 1F. The communication device 130 (#C) illustrated in FIGS. 1A to 1C includes, for example, as illustrated in FIGS. 1F and 1G, a reception unit 171, an acquisition unit 172, and a relay unit 173.

The reception unit 171 receives the data transferred from the communication device 120 and the address (#B). Then, the reception unit 171 outputs the received address (#B) to the acquisition unit 172. Also, the reception unit 171 outputs the received data to the relay unit 173.

The acquisition unit 172 notifies the storage device 150 of the address (#B) outputted from the reception unit 171 so as to acquire the relay destination address (#D) from the storage device 150. Then, the acquisition unit 172 outputs the acquired address (#D) to the relay unit 173.

The relay unit 173 relays the data outputted from the reception unit 171 to the address (#D) outputted from the acquisition unit 172. Accordingly, the data may be transmitted to the communication device 140 through a communication path different from the established communication path.

Second Embodiment

Communication System According to Second Embodiment

Figure 2:
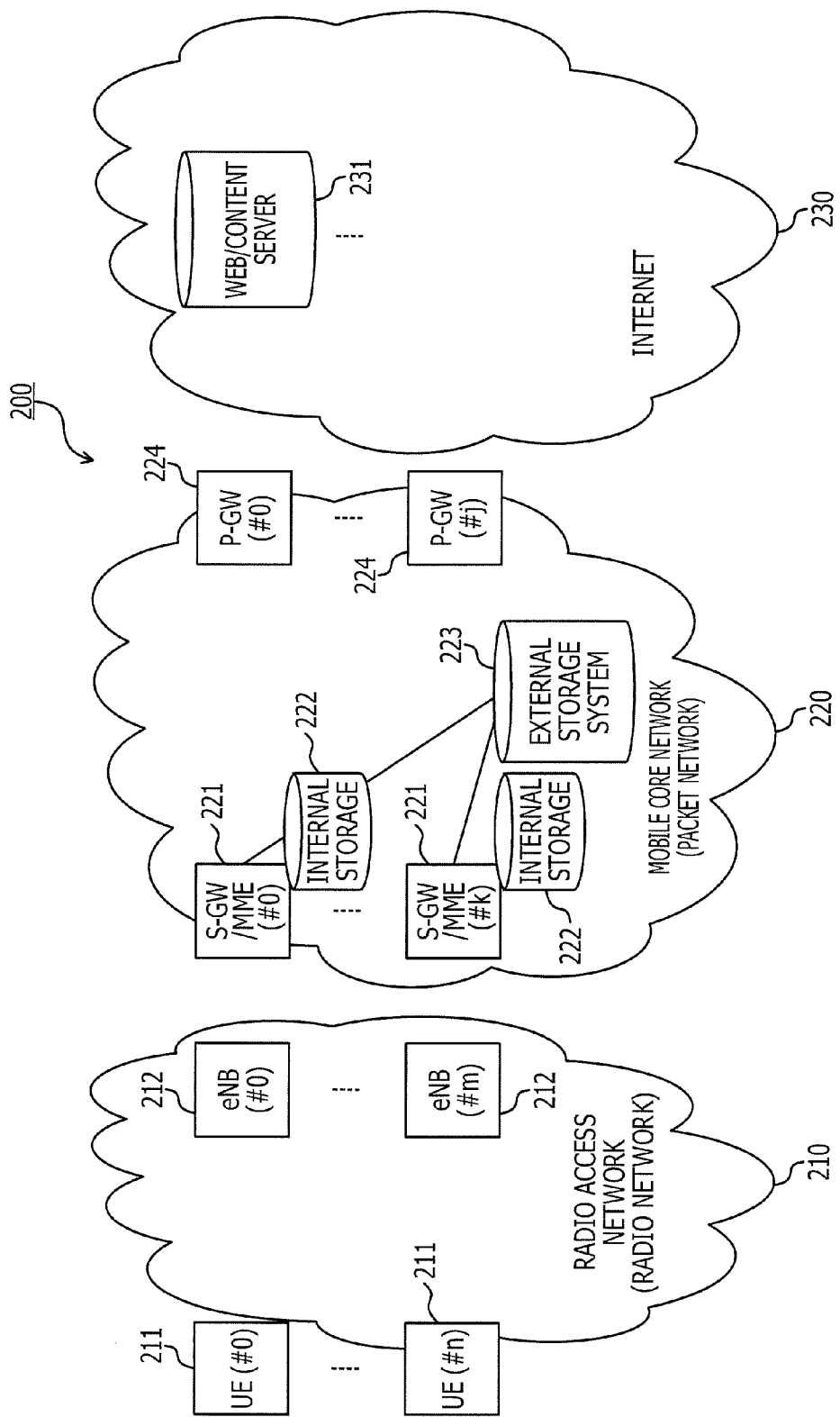
FIG. 2 is a diagram illustrating an example communication system according to a second embodiment.

FIG. 2 is a diagram illustrating an example communication system according to a second embodiment. As illustrated in FIG. 2, a communication system 200 according to the second embodiment includes a radio access network 210 (a radio network), a mobile core network 220 (a packet network), and the Internet 230. The communication system 200 is a communication system to which a long term evolution (LTE), for example, is applied.

The radio access network 210 includes UEs 211 (#0 to #n) and eNBs 212(#0 to #m). Each of the UEs 211(#0 to #n) is a user equipment such as a mobile phone. Radio communications are performed between the UEs (#0 to #n) and the eNBs 212(#0 to #m). The eNB 212(#0 to #m) becomes a load distribution source which distributes a load in an uplink communication (uplink) from the radio access network 210 to the Internet 230.

The mobile core network 220 includes a service-gateway mobility management entities (S-GW/MMEs) 221(#0 to #k), an external storage system 223, and packet data network-gateways (P-GWs) 224(#0 to #j). The S-GW/MME 221 is a communication device with a function of an S-GE and an MME. The P-GW 224 is a gateway with the Internet 230 in the mobile core network 220.

The S-GW/MME 221(#0 to #k) becomes a destination (load distribution destination) to which a load is distributed in the uplink communication (uplink) from the radio access network 210 to the Internet 230. Also, the S-GW/MME 221(#0 to #k) belongs to a same load distribution group and becomes a destination (load distribution destination) to which a load is distributed even in a downlink communication (downlink) from the Internet 230 to the radio access network 210.

The internal storage 222 is an internal storage of the S-GW/MME 221(#0 to #k). The external storage system 223 is an external storage system which is accessible from the S-GW/MME 221(#0 to #k) and is provided in the outside of the S-GW/MME 221(#0 to #k). The external storage system 223 stores relay information (context data) which is used by the S-GW/MMW 221(#0 to #k). The external storage system 223 may be distribution database which is formed by multiple communication devices.

The Internet 230 includes a web/content server 231 and the like. Described hereinafter is a case where the UE 211 (#0 to #n) performs uplink and downlink communications with the web/content server 231.

The communication device 110 illustrated in FIGS. 1A to 1C is applicable to at least any one of the eNBs 212(#0 to #m), for example. Each of the communication devices 120 and 130 illustrated in FIGS. 1A to 1C is applicable to at least any one of the S-GW/MMEs 221(#0 to #k), for example. The communication device 140 is applicable to at least any one of the P-GWs 224(#0 to #j), for example.

However, the applications of the communication devices 110, 120, 130, and 140 are not limited to the cases described above. For example, the communication device 110 may be applied to the UEs 211(#0 to #n), the communication devices 120 and 130 may be applied to the S-GW/MMEs 221(#0 to #k), and the communication device 140 may be applied to the P-GWs 224(#0 to #j). Also, the communication device 110 may be applied to the S-GW/MMEs 221(#0 to #k), the communication devices 120 and 130 may be applied to the P-GWs 224(#0 to #k), and the communication device 140 may be applied to the web/content server 231.

In addition, the communication device 110 may be applied to a radio network controller (RNC) of the communication system 200 and the communication devices 120 and 130 may be applied to a serving GPRS support node (SGSN) of the communication system 200. Also, the communication device 110 may be applied to the SGSN of the communication system 200 and the communication devices 120 and 130 may be applied to the GGSN of the communication system 200.

The communication system 200 provides a mobile service which maintains IP connectivity for communications of an user terminal (UE 211) to be accommodated. Then, a mobile core network unique node (for example, the P-GW 224) provided in an entrance to the external network (for example, the Internet 230) has a fixed IP connection point which is used as an anchor point to form a tunnel communication.

A user terminal in motion may maintain communications by switching tunnel communication paths without changing the IP address of the terminal. Multiple tunnel communication paths are provided for at least each of the user terminals between the nodes which relay packets of the user terminals. An IP address of the node in the ending point and the tunnel communication path ID which are used to identify and specify the tunnel communication path are replaced and decided by the signaling between the nodes.

For example, the S-GW/MME 221(#0 to #k) creates a communication path ID which is used for receiving user data from the P-GW 224 in the downlink communication and notifies the P-GW 224 (#0 to #j) of the created communication path ID together with the IP address of the S-GW/MME 221.

The P-GW (#0 to #j) creates a communication path ID which is used for receiving user data from the S-GW/MME 221(#0 to #k) in the uplink communication and notifies the S-GW/MME 221(#0 to #k) of the created communication path ID together with the IP address of the P-GW 224.

The S-GW/MME 221(#0 to #k) creates a communication path ID which is used for receiving user data from the eNB 212 (#0 to #m) in the uplink communication and notifies the eNB 212 (#0 to #m) of the created communication path ID together with the IP address of the S-GW/MME 221.

The eNB 212 (#0 to #m) creates a communication path ID which is used for receiving user data from the S-GW/MME 221(#0 to #k) in the downlink communication and notifies the S-GW/MME 221(#0 to #k) of the created communication path ID together with the IP address of the eNB 212.

The configuration illustrated in FIG. 2 is same in third to fifth embodiments to be described later.

In the second embodiment, when the S-GW/MME 221 (#a) performs load distribution, the data received from the eNB 212 and the address of the S-GW/MME 221(#a) are transferred to the S-GW/MME 221(#b) through the eNB 212.

(An Operation in a Relay Network Coupling Phase in the Communication System According to the Second Embodiment)

FIG. 3 is a sequential diagram illustrating an example of an operation in a relay network coupling phase in the communication system according to the second embodiment. In FIG. 3, same reference numerals are given to denote portions same as those illustrated in FIG. 2, and the description thereof is omitted.

A UE 211 illustrated in FIG. 3 is a UE included in the UEs 211 (#0 to #n) illustrated in FIG. 2. An eNB 212 illustrated in FIG. 3 is an eNB included in the eNBs 212 (#0 to #m) illustrated in FIG. 2. Each of S-GW/MMEs 221(#a, #b) is an S-GW/MME included in the S-GW/MMEs 221(#0 to #k) illustrated in FIG. 2. A P-GW 224 illustrated in FIG. 3 is a P-GW included in the P-GWs 224 (#0 to #j) illustrated in FIG. 2.

The eNB 212 has an interface with an address (IP_B). The S-GW/MME 221(#a) has an interface with an address (IP_A#a0) and an interface with an address (IP_A#a1). The S-GW/MME 221(#b) has an interface with an address (IP_A#b0) and an interface with an address (IP_A#b1). The P-GW 224 has an interface with an address (IP_C). The web/content server 231 has an interface with an address (IP_s).

The UE 211 first transmits a coupling request for coupling of the Internet 230 to the S-GW/MME 221(#a) through the eNB 212 (step S301). Then, the S-GW/MME 221(#a) creates a communication path ID (ID_A_#r) for DL which is identification information of the downlink communication (step S302).

After that, the S-GW/MME 221(#a) transmits a communication path setting request for setting a communication path to the P-GW 224 (step S303). The communication path setting request includes the address (IP_A#a1) indicating the interface of the S-GW/MME 221(#a) and the communication path ID (ID_A_#r) for DL which is created at step S302.

The P-GW 224 creates a UL communication path ID (ID_C_#p) which is identification information of the uplink communication path and allocates a user IP address (IP_u) to the UE 211.

Then, the P-GW 224 transmits a communication path setting response to the communication path setting request at step S303 to the S-GW/MME 221(#a) (step S305). The communication path setting response includes the address (IP_C) indicating the interface of the P-GW 224 and the UL communication path ID (ID_C_#p) created at step S304, and the user IP address (IP_u) allocated at step S304.

After that, the S-GW/MME 221(#a) creates a UL communication path (ID_A_#n) which is identification information of the uplink communication path (step S306).

The S-GW/MME 221(#a) then transmits a communication path setting request for setting a communication path to the eNB 212 (step S307). The communication path setting request includes the address (IP_A#a0) indicating the interface of the S-GW/MME 221 (#a) and the UL communication path ID (ID_A_#n) created at step S306. In addition, the communication path setting request includes the user IP address (IP_u) included in the communication path setting response at step S305.

Subsequently, the eNB 212 creates a communication path ID (ID_B_#k) for the DL, which is identification information of the downlink communication path (step S308). The eNB 212 performs a procedure for a coupling request response with the UD 211 so as to notify the UE 211 of the user IP address (IP_u) included in the communication path setting request at step S307 (step S309).

Then, the eNB 212 transmits a communication path setting response to the communication path setting request at step S307 to the S-GW/MME 221(#a) (step S310). The communication path setting response includes the address (IP_B) indicating the interface of the eNB 212 and the communication path ID (ID_B_#k) for the DL, which is created at step S308.

Thereafter, the S-GW/MME 221(#a) transmits the relay information 30 to the external storage system 223 (step S311). The external storage system 223 stores the relay information 30 received from the S-GW/MME 221(#a) (see, for example, FIG. 9B).

The relay information 30 includes correspondence information of the combination of the address (IP_A#a0) and the UL communication path ID (ID_A_#n) and the combination of the address (IP_C) and the UL communication path ID (ID_C_#p). The UL communication path ID (IDA_A_#n) is information created at step S306. The address (IP_C) and the UL communication path ID (ID_C_#p) are information included in the communication path setting response at step S305.

Also, the relay information 30 includes correspondence information of the combination of the address (IP_A#a1) and the DL communication path ID (ID_A_#r) and the combination of the address (IP_B) and the DL communication path ID (ID_B_#k). The DL communication path ID (ID_A_#r) is information created at step S302. The address (IP_B) and the DL communication path ID (ID_B_#k) are information included in the communication path setting response at step S310.

Established by each of the steps illustrated in FIG. 2 are a communication path 31 between the UE 211 and the eNB 212, a communication path 32 between the eNB 212 and the S-GW/MME 221(#a), and a communication path 33 between the S-GW/MME 221(#a) and the P-GW 224.

Accordingly, the UE 211 is able to communicate with the web/content server 231 included on the Internet 230.

The operation illustrated in FIG. 3 is same in the third to fifth embodiments to be described later.

(Operation in User Data Relay Phase in Communication System According to Second Embodiment)

FIG. 4 is a sequential diagram illustrating an example operation of a user data relay phase in the communication system according to the second embodiment. In FIG. 4, same reference numerals are given to denote portions same as those described in FIG. 3 and the description thereof is omitted. Steps in FIG. 4, for example, are performed after the relay network coupling phase in FIG. 3, for example.

The UE 211 transmits an uplink packet 41 to the eNB 212 (step S401). The packet 41 at step S401 includes user data, a transmission source address (IP_u) indicating the UE 211, and a destination address (IP_s) indicating the web/content server 231. The transmission source address (IP_u) is a user IP address notified at step S309 in FIG. 3, for example. The user data is data requesting the content data from the web/content server 231, for example.

Thereafter, the eNB 212 transmits a packet 42 to the S-GW/MME 221(#a) to relay the packet 41 (step S402). The packet 42 at step S402 includes not only various pieces of information of the packet 41 (within the dotted line frame) but also a UL communication path ID (ID_A_#n), a transmission source address (IP_B), and a destination address (IP_A#a0).

Then, the S-GW/MME 221(#a) acquires the relay information from the external storage system 223 (step S403). The relay information acquired at step S403 is relay information 43, of the relay information 30, for the uplink communication of the UE 211. For example, the S-GW/MME 221(#a) transmits the destination address (IP_A#a0) as an acquisition key and the UL communication path ID (ID_A_#n) to the external storage system 223. On the other hand, the external storage system 223 transmits the address (IP_C) and the UL communication path ID (ID_C_#p) to the S-GW/MME 221(#a) as relay information.

Then, the S-GW/MME 221(#a) relays the packet 41 by transmitting a packet 44 to the P-GW 224 based on the relay information 43 acquired at step S403 (step S404). The packet 44 includes not only various pieces of information of the packet 41 (within the dotted line frame) but also a UL communication path ID (ID_C_#p), a transmission source address (IP_A#a1), and a destination address (IP_C).

After that, the P-GW 224 relays the packet 41 by transmitting a packet 45 to the web/content server 231 (step S405). The packet 45 includes various pieces of information (within the dotted line frame) of the packet 41.

With the steps illustrated in FIG. 4, the packet 41 transmitted from the UE 211 may be transmitted to the web/content server 231.

The operation illustrated in FIG. 4 is same in the third to fifth embodiments to be described later.

(Operation of Load Distribution in Communication System According to Second Embodiment)

Figure 5B:
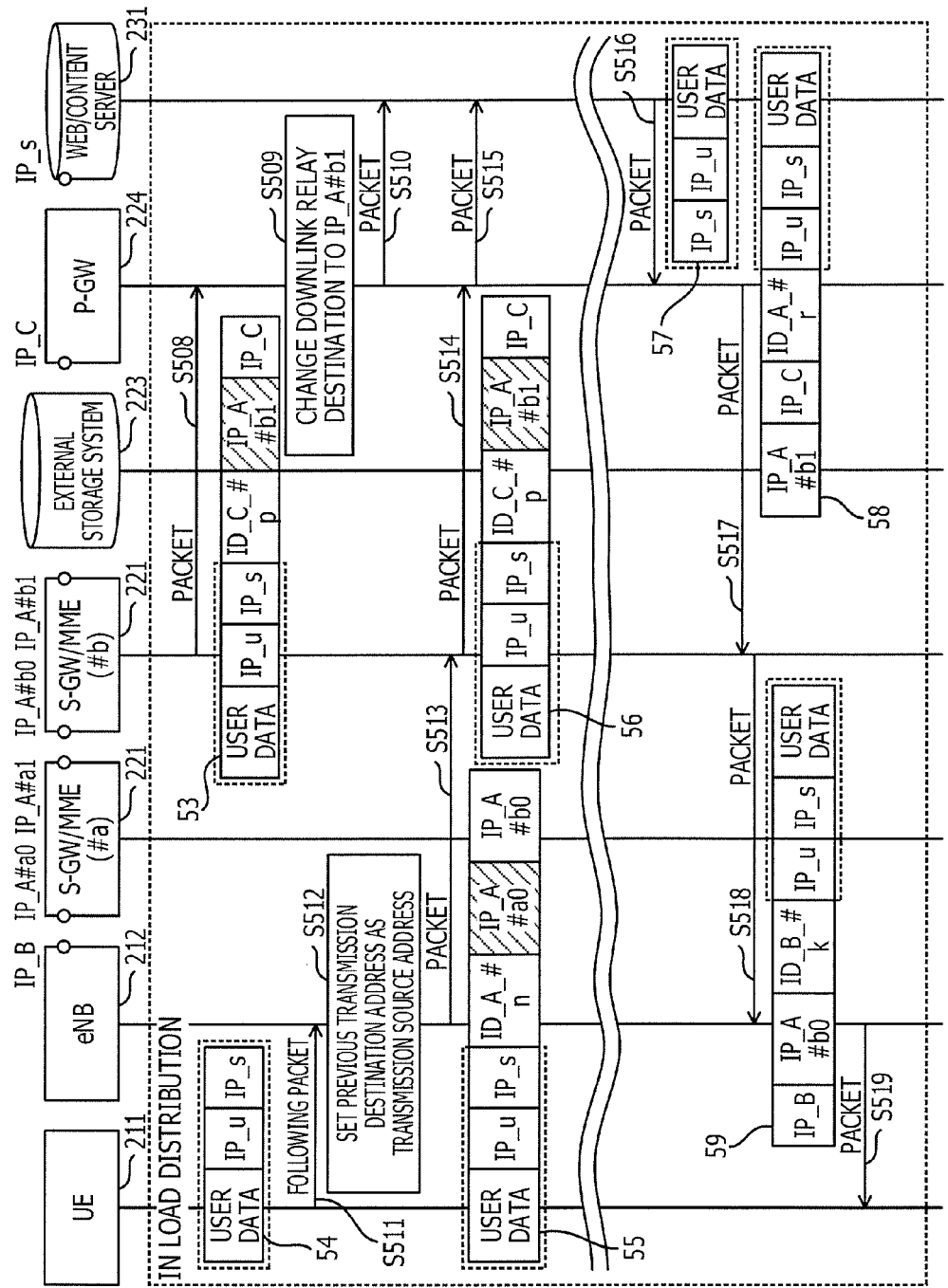
FIG. 5B is a sequential diagram (No. 2) illustrating an example operation in load distribution in the communication system according to the second embodiment.

FIG. 5A is a sequential diagram (No. 1) illustrating an example of an operation in load distribution in the communication system according to the second embodiment. FIG. 5B is a sequential diagram (No. 2) illustrating an example of an operation in load distribution in the communication system according to the second embodiment. In FIGS. 5A and 5B, same reference numerals are given to denote portions same as those illustrated in FIG. 3, and the description thereof is omitted.

It is assumed, for example, that congestion occurs in the S-GW/MME 221(#a) after the relay network coupling phase in FIG. 3 and the user data relay phase in FIG. 4. In this case, for example, the steps in FIGS. 5A and 5B are performed.

Steps S501 and S502 illustrated in FIG. 5A are same as steps S401 and S402 illustrated in FIG. 4. After step S502, the S-GW/MME 221(#a) determines if load distribution is performed (step S503). In the example illustrated in FIG. 5A, the S-GW/MME 221(#a) determines to perform load distribution, since the relay information (the correspondence information) associated with its internal storage 222 (cash) does not exist and congestion occurs in the S-GW/MME 221(#a).

After that, the S-GW/MME 221(#a) transmits a packet 52 in which the packet 42 is encapsulated to the eNB 212 so as to return the packet 42 to the eNB 212 (step S504). The packet 51 at step S504 includes not only various pieces of information of the packet 42 but also the transmission source address (IP_A#a0) and the destination address (IP_B).

Subsequently, the eNB 212 decides a load distribution destination (step S505). Deciding a load distribution destination may be performed based on a load state of each of the S-GW/MMEs 221(#0 to #k), for example. It is assumed in the example in FIG. 5A that the eNB 212 decides the S-GW/MME 221(#b) as a load distribution destination.

Then, the eNB 212 transmits the packet 52 to the S-GW/MME 221(#b) so as to distribute the packet 41 to the S-GW/MME 221(#b) (step S506). The packet 52 includes not only various pieces of information of the packet 41 (within the dotted line frame) but also the UL communication path ID (ID_A_#n), the transmission source address (IP_A#a0), and the destination address (IP_A#b0). As described above, not the address of the eNB 121 but the address of the S-GW/MME 221(#a) is set as the transmission source address of the packet 52.

The transmission source address of the packet 52 which is received by the S-GW/MME 221 at step S605 is the address of the S-GW/MME 221(#a) whose load distribution group is same as that of the S-GW/MME 221(#b). Accordingly, the S-GW/MME 221(#b) acquires the relay information from the external storage system 223 by using the pair of the transmission source address of the packet 52 (IP_A#a0) and the UL communication path ID (ID_A_#n) as an acquisition key (step S507). For this reason, of the relay information 30, the relay information 43 (IP_C+ID_C#p) may be acquired for the uplink communication of the UE 211. At this time, the S-GW/MME 221(#b) updates the address (IP_A#a1) of the S-GW/MME 221(#a) to an address for the S-GW/MME 221(#b) and holds it.

Based on the relay information acquired at step S507, the S-GW/MME 221(#b) transmits the packet 53 to the P-GW 224 so as to relay the packet 41 (step S508). The packet 52 includes not only various pieces of information (within the dotted line frame) of the packet 41 but also the UL communication path ID (ID_C_#p), a transmission source address (IP_A#b1), and a destination address (IP_C).

After that, the P-GW 224 changes the relay destination in the downlink communication associated with the DL communication path ID (ID_A_#r) from "IP_A#a1" to "IP_A#b1" (step S509). Accordingly, a path in the downlink communication may be changed along with the change in the path in the uplink communication.

Then, the P-GW 224 transmits the packet 41 included in the packet 53 to the web/content server 231 (step S510). Accordingly, the packet 41 transmitted from the UE 211 may be transmitted to the web/content server 231.

It is also assumed that the UE 211 transmits a packet 54 which is a following packet of the packet 41 to the eNB 212 (step S511). Then, the eNB 212 sets a previous transmission destination address (IP_A#a0), which is a transmission destination address in the packet 42 at step S502, as the transmission source address of the packet 55 including the packet 54 (step S512).

After that, the eNB 212 relays the packet 54 by transmitting a packet 55 in which the transmission source address is set at step S512 to the S-GW/MME 221(#b) (step S513).

Based on the relay information acquired at step S507, the S-GW/MME 221(#b) transmits a packet 56 to the P-GW 224 so as to relay the packet 54 (step S514). The packet 56 includes not only various pieces of information (within the dotted line frame) of the packet 54 but also a UL communication path ID (ID_C_#p), a transmission source address (IP_A#b1), and a destination address (IP_C).

It is then assumed that the P-GW 224 transmits the packet 54 included in the packet 56 at step S514 to the web/content server 231 (step S515). Accordingly, the packet 54 transmitted by the UE 211 reaches the web/content server 231.

It is also assumed that the web/content server 231 transmits a packet 57 whose destination is the UE 211 to the P-GW 224 (step S516). The packet 57 is content data in response to the request made by the packet 71 from the UE 211, for example.

Based on the relay destination (IP_A#b1) changed at step S509, the P-GW 224 transmits a packet 58 to the S-GW/MME 221(#b) so as to relay the packet 57 (step S517). The packet 58 includes not only various pieces of information (within the dotted line frame) of the packet 57 but also a DL communication path ID (ID_A_#r), a transmission source address (IP_C), and a destination address (IP_A#b1).

The S-GW/MME 221(#b) transmits a packet 59 to the eNB 212 so as to relay the packet 58 (step S518). For example, the S-GW/MME 221(#b) acquires the relay information from the external storage system 223 by using the pair of the address (IP_A#a1) of the S-GW/MME 221(#a) and the DL communication path ID (ID_A_#r) which are held at step S507 as an acquisition key. Accordingly, of the relay information 30, the relay information (IP_B+ID_B#k) about the downlink communication of the UE 211 may be acquired. The packet 59 includes not only the various pieces of information (within the dotted line frame) of the packet 41 but also a DL communication path ID (ID_B_#k), a transmission source address (IP_A#b0), a the destination address (IP_B).

After that, the eNB 212 transmits the packet 57 included in the packet 59 to the UE 211 (step S519). Accordingly, the packet 57 transmitted by the web/content server 231 may be transmitted to the UE 211.

(Processing on Node in Load Distribution Destination According to Second Embodiment)

Figure 6:
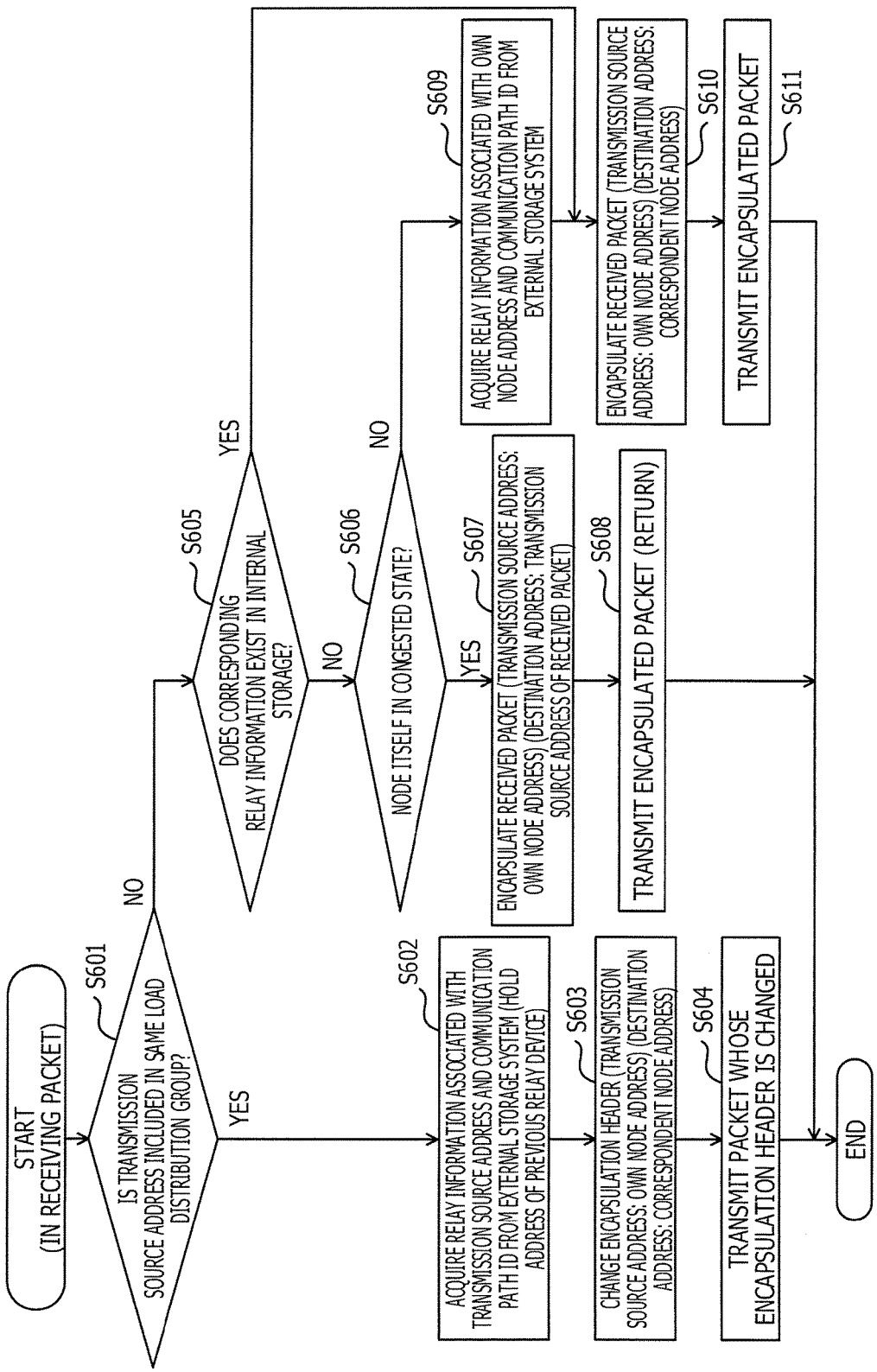
FIG. 6 is a flowchart illustrating example processing which is performed on a node in a load distribution destination according to the second embodiment.

FIG. 6 is a flowchart illustrating example processing which is performed on a node in a load distribution destination according to the second embodiment. In the examples illustrated in FIGS. 3 to 5B, each of the S-GW/MMEs 221(#a, #b), which is a node in a load distribution destination performs steps in FIG. 6 when receiving a packet. The S-GW/MME 221 first determines if the transmission source address of the received packet is included in the same load distribution group as that of the S-GW/MME 221 (step S601).

When the transmission source address of the received packet is included in the load distribution group at step S601 (step S601: Yes), the S-GW/MME 221 acquires the relay information associated with the transmission source address of the received packet and the communication path ID from the external storage system 223 (step S602). In this manner, when the S-GW/MME 221 receives the packet transferred from the node whose load distribution group is same as that of the S-GW/MME 221, the S-GW/MME 221 acquires the relay information from the external storage system 223 by using not the address thereof but the transmission source address of the received packet. Also, at this time, the S-GW/MME 221 updates the address of the previous relay device (the load distribution destination node), which is in the acquired relay information to the address for the S-GW/MME 221 and holds it.

Based on the relay information acquired at step S602, the S-GW/MME 221 changes an encapsulation header of the received packet (step S603). In other words, the S-GW/MME 221 sets the transmission source address of the encapsulation header to the address thereof. In addition, the S-GW/MME 221 sets the destination address of the encapsulation header as a correspondent node address which is indicated by the relay information acquired at step S603. Then, the S-GW/MME 221 transmits the packet whose encapsulation header is changed at step S603 (step S604) and terminates a series of the processing. Accordingly, the packet transferred from the node whose load distribution group is same as that of the S-GW/MME 221 may be relayed.

When the transmission source address of the received packet is not included in the load distribution group at step S601 (step S601: No), the S-GW/MME 221 determines if the corresponding relay information exists in the internal storage 222 of the S-GW/MME 221 (step S605). The corresponding relay information means relay information associated with the address of the S-GW/MME 221 (destination address of the received packet) and the communication path ID of the received packet. When the corresponding relay information does not exist in the internal storage 222 (step S605: No), the S-GW/MME 221 determines if the S-GW/MME 221 itself is in the congested state (step S606). For example, the S-GW/MME 221 is able to determine if the S-GW/MME 221 itself is in the congested state based on the access rate to the external storage system 223 or a usage rate of the cache of the S-GW/MME 221.

When the S-GW/MME 221 itself is in the congested state at step S606 (step S606: Yes), the S-GW/MME 221 extracts a user packet included in the received packet and adds an encapsulation header to the extracted user packet so as to encapsulate the received packet (step S607). At this time, the S-GW/MME 221 uses the transmission source address of the encapsulation header as an address thereof. Also, the S-GW/MME 221 uses the destination address of the encapsulation header as a transmission source address of the received packet.

Then, the S-GW/MME 221 transmits the packet encapsulated at step S607 (step S608) and terminates a series of the processing. Accordingly, the S-GW/MME 221 may return the received packet when the relay information corresponding to the received packet does not exist in the internal storage 222 and the S-GW/MME 221 is in the congested state.

When the S-GW/MME 221 is not in the congested state at step S606 (step S606: No), the S-GW/MME 221 acquires the relay information associated with the address thereof and the communication path ID of the received packet from the external storage system 223 (step S609).

Then, the S-GW/MME 221 extracts the user packet included in the received packet and adds the encapsulation header to the extracted user packet so as to encapsulate the received packet (step S610). At this time, the S-GW/MME 221 uses the transmission source address of the encapsulation header as the address of the S-GW/MME 221. Also, the S-GW/MME 221 uses the destination address of the encapsulation header as the address of the correspondent node which is indicated by the relay information acquired at step S609.

After that, the S-GW/MME 221 transmits the packet encapsulated at step S610 (step S611) and terminates a series of the processing. Accordingly, when the relay information corresponding to the received packet does not exist in the internal storage 222 but the S-GW/MME 221 itself is not in the congested state, the S-GW/MME 221 may acquire the corresponding relay information by making an access to the external storage system 223 and relay the received packet.

When the corresponding relay information exists in the internal storage 222 at step S605 (step S605: Yes), the S-GW/MME 221 proceeds to step S610. In this case, the S-GW/MME 221 transmits the received packet to the correspondent node address which is indicated by the corresponding relay information in the internal storage 222. Accordingly, when the corresponding relay information exists in the internal storage 222, the S-GW/MME 221 may relay the received packet by using the relay information in the internal storage 222.

(Processing on Node on Load Distribution Source According to Second Embodiment)

Figure 7:
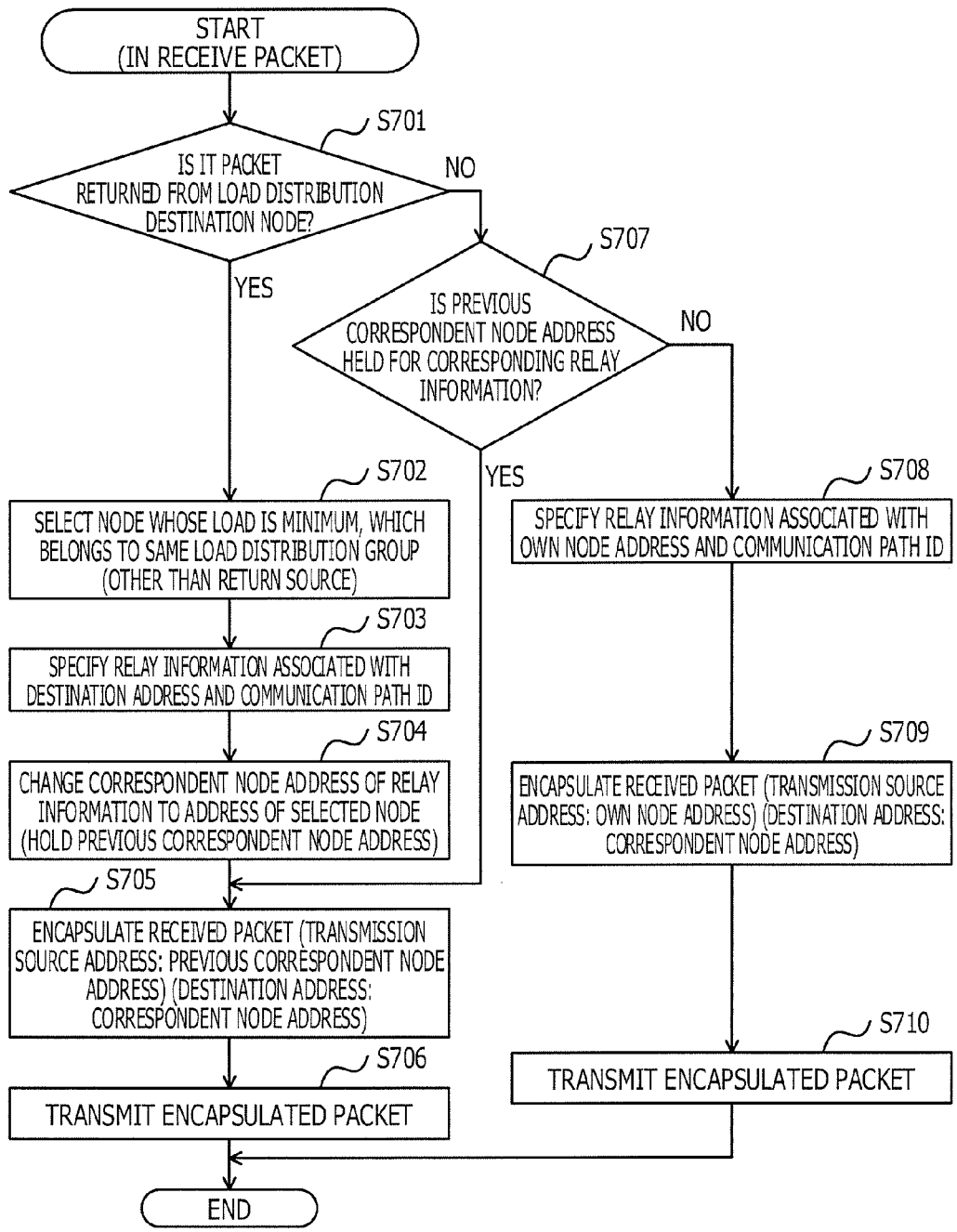
FIG. 7 is a flowchart illustrating example processing which is performed on a node in a load distribution source according to the second embodiment.

FIG. 7 is a flowchart illustrating an example flow of processing which is performed on a node in a load distribution source according to the second embodiment. In the examples illustrated in FIGS. 3 to 5B, for example, the eNB 212 which is a node in a load distribution source performs steps illustrated in FIG. 7 when receiving a packet.

The eNB 212 determines if the received packet is a packet returned from the load distribution source node (S-GW/MME 221) (step S701). When the received packet is the returned packet (step S701: Yes), the eNB 212 selects a node whose load is minimum from nodes whose load distribution group is same as that of the load distribution source node in the source of the returned packet (step S702). A node to be selected at step S702 is a node other than the source which returned the received packet. For example, the eNB 212 performs selection at step S702 based on the load state information which is received from each of the load distribution destination nodes.

After that, the eNB 212 specifies the relay information associated with the destination address of the received packet and the communication path ID among the relay information stored in the eNB 212 (step S703). Then, the eNB 212 changes the correspondent node address which is indicated by the relay information specified at step S703 to the address of the node selected at step S702 (step S704). At this time, the eNB 212 holds the correspondent node address (previous correspondent node address) before the relay information is changed by associating it with the relay information specified at step S703.

The eNB 212 extracts a user packet included in the received packet and adds an encapsulation header to the extracted user packet so as to encapsulate the received packet (step S705). At this time, the eNB 212 uses the transmission source address of the encapsulation header as a previous correspondent node address which is held at step S704. Also, the eNB 212 uses the destination address of the encapsulation header as a correspondent node address changed at step S704.

When the received packet is not the returned packet at step S701 (step S701: No), the eNB 212 transmits the packet encapsulated at step S705 (step S706) and terminates a series of the processing. Accordingly, when the packet is returned, the returned packet may be distributed to other load distribution destination node. Also, not the address of the eNB 212 but the address of the load distribution destination node (previous correspondent node address) in the return source may be used as the transmission source address of the packet to be distributed.

When the received packet is not the returned packet at step S701 (step S701: No), the eNB 212 determines if the previous correspondent node address is held at step S704 with respect to the relay information corresponding to the received packet (step S707). The corresponding relay information is relay information associated with the address of the eNB 212 (destination address of the received packet) and the communication path ID of the received packet.

When the previous correspondent node is held at step S707 (step S707: Yes), the eNB 212 proceeds to step S705. Accordingly, when the packet is returned from the load distribution destination node, a following packet may be directly transmitted to the node selected at step S702.

When the previous correspondent node address is not held at step S707 (step S707: No), the eNB 212 specifies the relay information associated with the address thereof and the communication path ID of the received packet (step S708).

Then, the eNB 212 extracts a user packet included in the received packet and adds an encapsulation header to the extracted user packet so as to encapsulate the received packet (step S709). At this time, the eNB 212 uses the transmission source address of the encapsulation header as the address of the eNB 212. Also, the eNB 212 uses the destination address of the encapsulation header as the address of the correspondent node which is indicated by the relay information specified at step S708.

After that, the eNB 212 transmits the packet encapsulated at step S709 (step S710) and terminates a series of the processing. Accordingly, the received packet may be relayed.

(Processing on Downstream Node of Load Distribution Destination Node According to Second Embodiment)

FIG. 8 is a flowchart illustrating example processing which is performed on a downstream node of the load distribution destination node according to the second embodiment. In the examples illustrated in FIGS. 3 to 5B, the P-GW 224 which is a downstream node of the load distribution destination node performs steps illustrated in FIG. 8, for example, when receiving a packet.

The P-GW 224 first relays the received packet based on the relay information of the P-GW 224 (step S801). Also, the P-GW 224 determines if the transmission source address of the received packet is different from the transmission source address which is stored when the relay path is established (for example, in the relay network coupling phase in FIG. 3)(step S802). When the transmission address of the received packet is same as that stored in establishing the relay path (step S802: No), the P-GW 224 terminates a series of the processing.

When the transmission source address of the received packet is different from the transmission source address stored in establishing the relay path at step S802 (step S802: Yes), the P-GW 224 determines if the received packet is the packet received from the node in the load distribution group (step S803). When the received packet is not the packet received from the node in the load distribution group (step S803: No), the P-GW 224 terminates a series of the processing.

When the received packet is the packet received from the node in the load distribution group (step S803: Yes), the P-GW 224 changes the correspondent node address which is indicated by the relay information in the downlink communication to the transmission source of the received packet (step S804) and terminates a series of the processing. Accordingly, when the path in the uplink communication is changed, the path in the downlink communication may be also changed.

The processing illustrated in FIG. 8 is same in the third to fifth embodiments to be described later.

(Relay Table of Load Distribution Destination Node Stored in External Storage According to Second Embodiment)

Figure 9A:
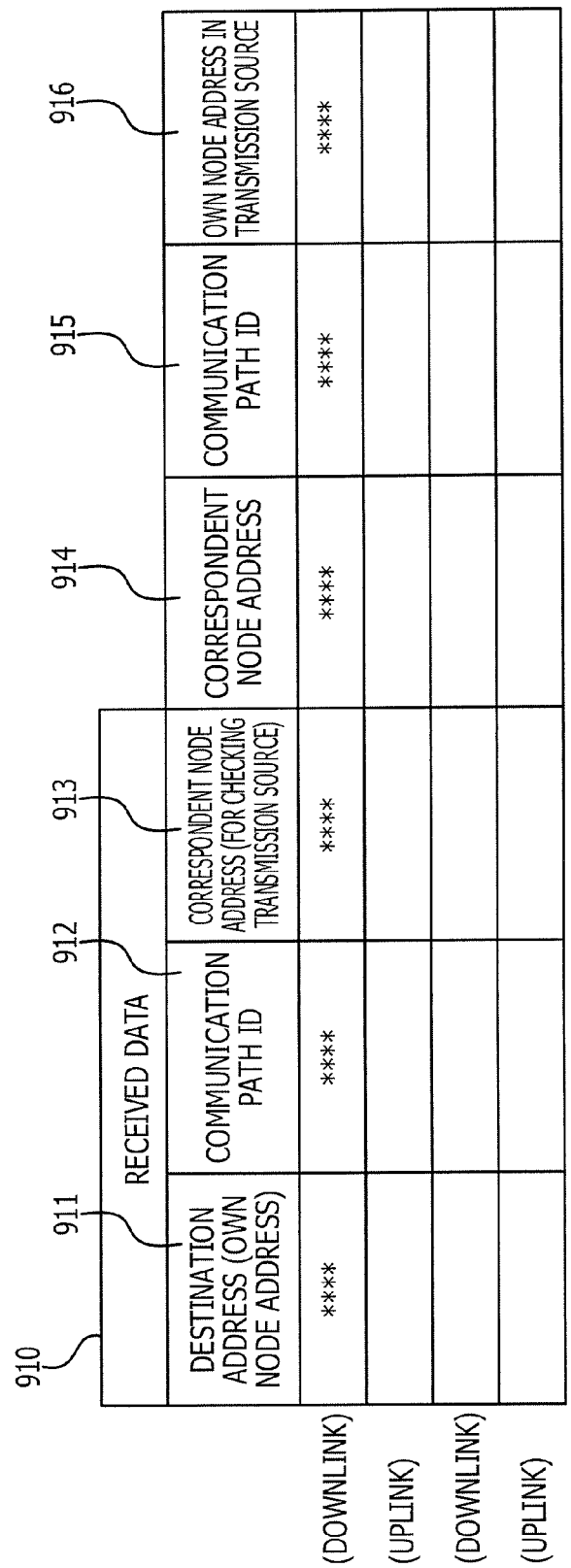
FIG. 9A is a diagram illustrating an example relay table of the load distribution destination node which is stored in the external storage according to the second embodiment.

FIG. 9A is a diagram illustrating an example relay table of the load distribution destination node which is stored in the external storage according to the second embodiment. The external storage system 223 stores a relay table 910 illustrated in FIG. 9A, for example.

The relay table 910 includes a destination address 911, a communication path ID 912, a correspondent node address 913, a correspondent node address 914, a communication path ID 915, and its own node address 916 in a transmission source.

The destination address 911, the communication path ID 912, and the correspondent node address 913 are items for the received data (received packet). The destination address 911 is a destination address (or its own node address) of the received data. The communication path ID 912 is a communication path ID of the received data. The correspondent node address 913 is an address in a transmission source of the received data and an address for checking the transmission source.

The correspondent node address 914 is an address in a transmission destination of the received data. The communication path ID 915 is a communication path ID which is used when the S-GW/MME 221 transmits the received data. The own node address 916 in the transmission source is an address in a transmission source (or its own node address) which is used when the S-GW/MME 221 transmits the received data.

It is noted that even when the relay information is stored in the internal storage 222 of the S-GW/MME 221, a relay table similar to the relay table 910 in FIG. 9A may be used.

FIG. 9B is a diagram illustrating an example relay table of the load distribution destination node after the relay network coupling phase. In FIG. 9B, same reference numerals are given to denote portions same as those illustrated in FIG. 9A, and the description thereof is omitted. For example, after the relay network coupling phase, the relay table 910 of the external storage system 223 becomes, for example, a relay table illustrated in FIG. 9B.

(Management Table of Load Distribution Group in Load Distribution Source According to Second Embodiment)

Figure 10:
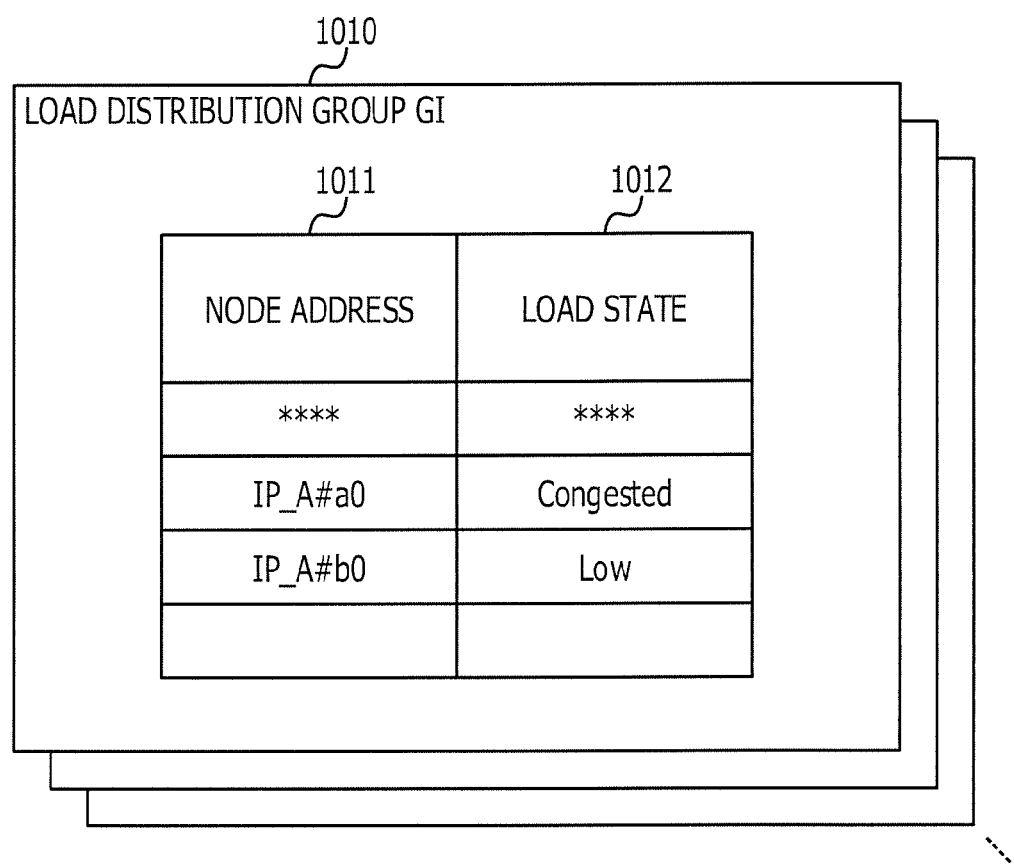
FIG. 10 is a diagram illustrating an example management table of the load distribution group in the load distribution source according to the second embodiment.

FIG. 10 is a diagram illustrating an example management table of the load distribution group in the load distribution source according to the second embodiment. For example, a memory of the eNB 212 stores multiple load distribution group management tables 1010 illustrated in FIG. 10. The multiple load distribution group management tables 1010 respectively indicate different load distribution groups.

The load distribution group management table 1010 includes a node address 1011 and a load state 1012. The node address 1011 indicates an address of each node included in a load distribution group Gi. The load state 1012 indicates a load state of a node indicated by the node address 1011. When the load state 1012 is "Congested," it indicates that the node is in a congested state. When the load state 1012 is "Low," it indicates that the node is not in a congested state.

In the load distribution group management table 1010 in FIG. 10, the address (IP_A#a0) of the S-GW/MME 221(#a) and the address (IP_A#b0) of the S-GW/MME 221(#b) are registered as the same load distribution group. Also, the load distribution group management table 1010 indicates that the S-GW/MME 221(#a) is in the congested state and the S-GW/MME 221(#b) is not in the congested state.

For example, at step S702 in FIG. 7, the eNB 212 is able to select a load distribution destination node in a distribution destination based on the node address 1011 and the load state 1012 of the load distribution group management table 1010.

(Uplink Relay Table Stored in Load Distribution Source Node According to Second Embodiment)

FIG. 11A is a diagram illustrating an example uplink relay table which is stored in the load distribution source node according to the second embodiment. For example, a memory of the eNB 212 which is a load distribution source node stores the uplink relay table 1110 illustrated in FIG. 11A. The relay table 1110 includes a radio communication path identifier 1111, a correspondent node address 1112, a communication path ID 1113, a transmission source own node address 1114, and a previous correspondent node address 1115.

The radio communication path identifier 1111 is an item for the received data (received packet) in the uplink of the eNB 212. The radio communication path identifier 1111 is an identifier for the radio communication path between UEs (for example, UEs 211) in the radio access network 210.

The correspondent node address 1112, the communication path ID 1113, the transmission source own node address 1114, and the previous correspondent node address 1115 are items for the transmission data (transmission packet) in the uplink of the eNB 212.

The correspondent node address 1112 is an address in the transmission source when the eNB 212 relays the received data. The communication path ID 1113 is a communication path ID for the received data. The transmission source own node address 1114 is an address in the transmission source (or its own node address) when the eNB 212 transmits the received data.

The previous correspondent node address 1115 is used when the correspondent node address 1112 is changed by the load distribution, and the correspondent node address 1112 before the change (before the load distribution) is stored. For example, at step S704 in FIG. 7, the eNB 212 stores and holds the correspondent node address before the node information is changed in the previous correspondent node address 1115.

(Downlink Relay Table Stored in Load Distribution Source Node According to Second Embodiment)

Figure 11B:
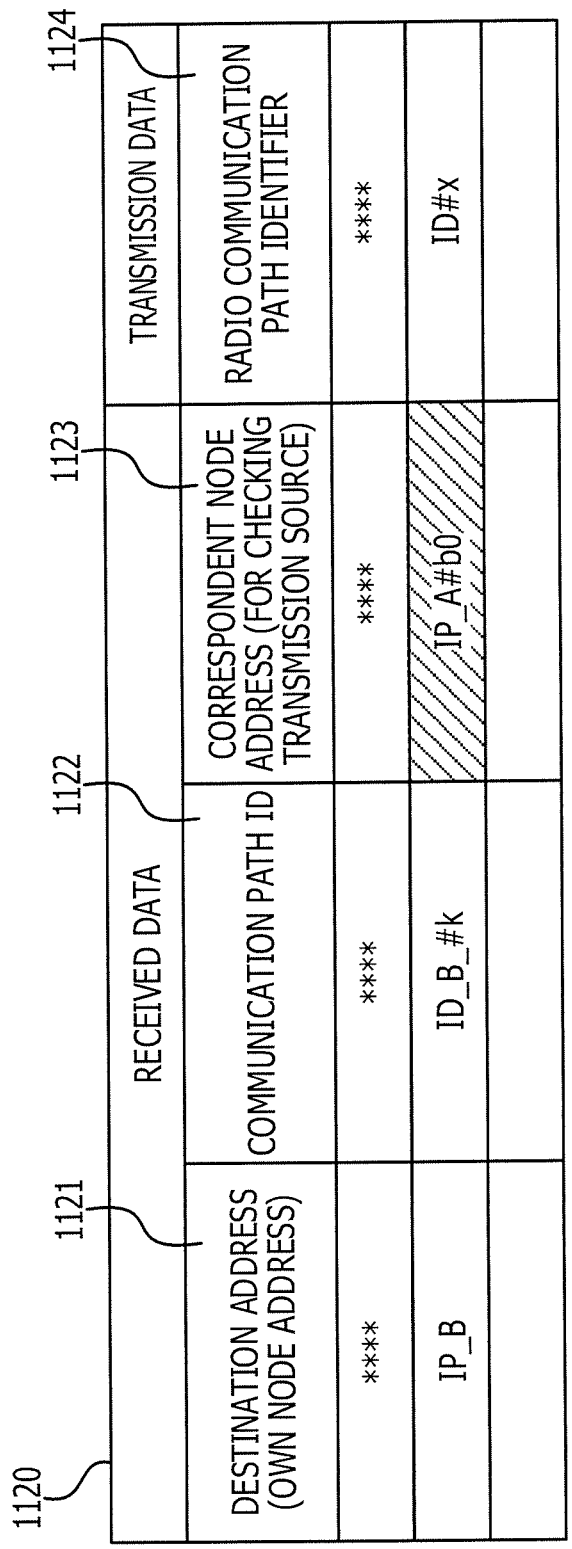
FIG. 11B is a diagram illustrating an example downlink relay table stored in the load distribution source node according to the second embodiment.

FIG. 11B is a diagram illustrating an example downlink relay table stored in the load distribution source node according to the second embodiment. For example, a memory of the eNB 212 which is the load distribution source node stores the downlink relay table 1120 in FIG. 11B. The relay table 1120 includes a destination address 1121, a communication path ID 1122, a correspondent node address 1123, and a radio communication path ID 1124.

The destination address 1121, the communication path ID 1122, and the correspondent node address 1123 are items for the received data (received packet) in the downlink of the eNB 212.

The destination address 1121 is a destination address of the downlink received data (or its own node address). The communication path ID 1122 is a communication path ID for the downlink received data of the eNB 212. The correspondent node address 1123 is an address in the transmission source of the downlink received data of the eNB 212 and an address for checking the transmission source.

The radio communication path identifier 1124 is an item for the downlink transmission data (transmission packet) of the eNB 212. The radio communication path identifier 1124 is an identifier of the radio communication path between the UEs (for example, the UE 211) in the radio access network 210 and is same as the radio communication path identifier 1111 in FIG. 11A. For example, at step S804 in FIG. 8, the eNB 212 changes the correspondent node address 1123 to the transmission source address of the received packet.

(Load Distribution Group Management Table of Downstream Node in Load Distribution Destination According to Second Embodiment)

Figure 12:
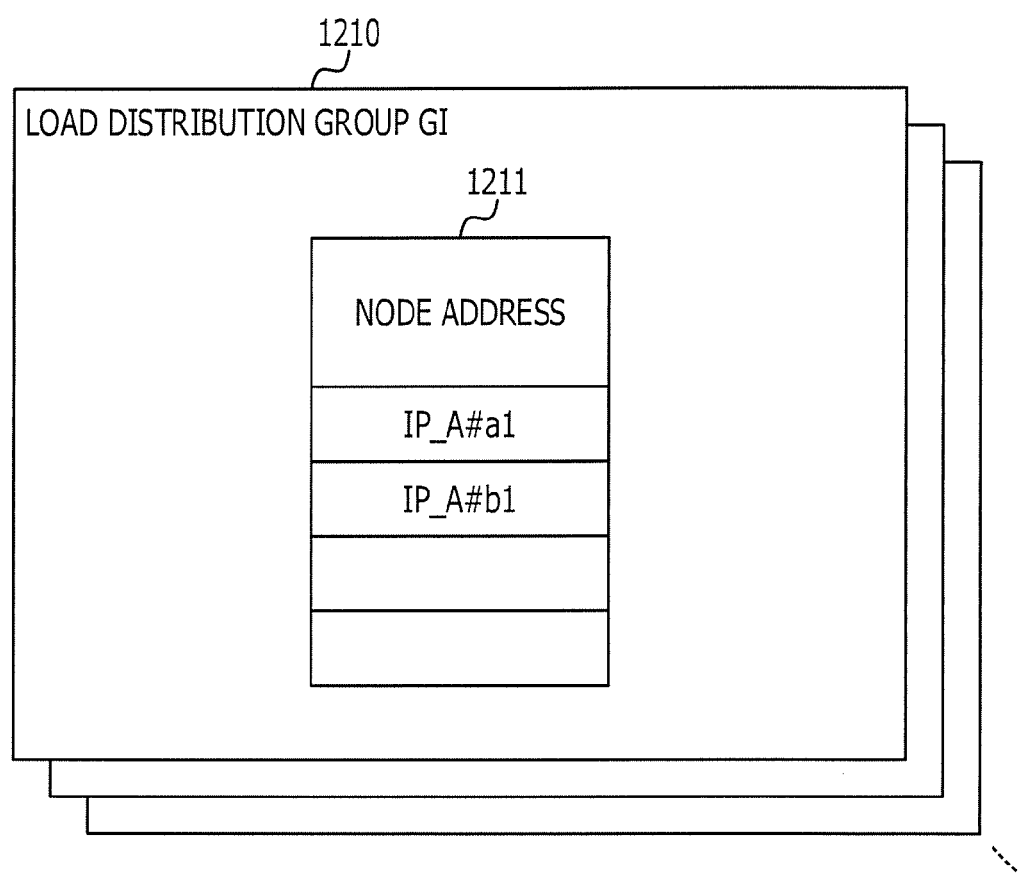
FIG. 12 is a diagram illustrating an example load distribution group management table of a downstream node in the load distribution destination according to the second embodiment.

FIG. 12 is a diagram illustrating an example load distribution group management table of a downstream node in the load distribution destination according to the second embodiment. For example, a memory of the P-GW 224 stores multiple load distribution group management tables 1210 illustrated in FIG. 12. The multiple load distribution group management tables 1210 respectively indicate different load distribution groups.

The load distribution group management table 1210 includes a node address 1211. The node address 1211 indicates an address of each node included in the load distribution group Gi. As illustrated in FIG. 12, in the load distribution group management table 1201, the address (IP_A#a1) of the S-GW/MME 221(#a) and the address (IP_A#b1) of the S-GW/MME 221(#b) are registered as the same load distribution group.

For example, at step S803 in FIG. 8, the P-GW 224 determines based on the destination address 1121 if the received packet is the packet received from the node in the load distribution group.

(Uplink Relay Table of Downstream Node of Load Distribution Destination According to Second Embodiment)

FIG. 13A is a diagram illustrating an example uplink relay table of the downstream node of the load distribution destination node according to the second embodiment. For example, in the P-GW 224 in the downstream (on an upstream side) of the S-GW/MME 221, the uplink relay table 1310 illustrated in FIG. 13A is stored. The relay table 1310 includes a destination address 1311, a communication path ID 1312, a correspondent node address 1313, a transmission destination interface 1314, and a reverse relay information management number 1315.

The destination address 1311, the communication path ID 1312, and the correspondent node address 1313 are items for the uplink received data (received packet) of the P-GW 224.

The destination address 1311 is a destination address (or its own node address) of the uplink received data of the P-GW 224. The communication path ID is a communication path ID for the uplink received data of the P-GW 224. The correspondent node address 1313 is a transmission source address of the P-GW 224 and an address for checking the transmission source.

The transmission destination interface 1314 is a destination interface when the P-GW 224 transmits the uplink received data of the P-GW 224. The reverse relay information management number 1315 is a management number of the relay information (see, for example, FIG. 13B) associated with the downlink communication path in a reverse direction of the uplink received data of the P-GW 224.

(Downlink Relay Table of Downstream Node of Load Distribution Destination Node According to Second Embodiment)

FIG. 13B is a diagram illustrating an example downlink relay table of the downstream node of the load distribution destination node according to the second embodiment. For example, a memory of the P-GW 224 stores the downlink relay table 1320 illustrated in FIG. 13B. The relay table 1320 includes a relay information management number 1321, a reception interface 1322, a destination address 1323, a correspondent node address 1324, a communication path ID 1325, and a transmission source own node address 1326.

The relay information management number 1321 is a management number of the relay information. The reverse relay information management number 1315 in FIG. 13A indicates a number of the relay information management number 1321.

The reception interface 1322 and the destination address 1323 are items for the downlink received data (received packet) of the P-GW 224. The received interface 1322 is an interface of the P-GW 224 and receives the downlink received data of the P-GW 224. The destination address 1323 is an address (UE address) of a destination UE (for example, UE 211) of the downlink received data of the P-GW 224.

The correspondent node address 1324 is a destination address when the P-GW 224 relays the downlink received data of the P-GW 224. The communication path ID 1325 is a communication path ID which is used when the P-GW 224 relays the downlink received data of the P-GW 224. The transmission source own node address 1326 is a transmission source address (or own node address) which is used when the P-GW 224 relays the downlink received data of the P-GW 224.

For example, at step S801 in FIG. 8, the P-GW 224 relays the received packet by using the relay tables 1310 and 1320 illustrated in FIGS. 13A and 13B.

(Load Distribution Source Node According to Second Embodiment)

Figure 14A:
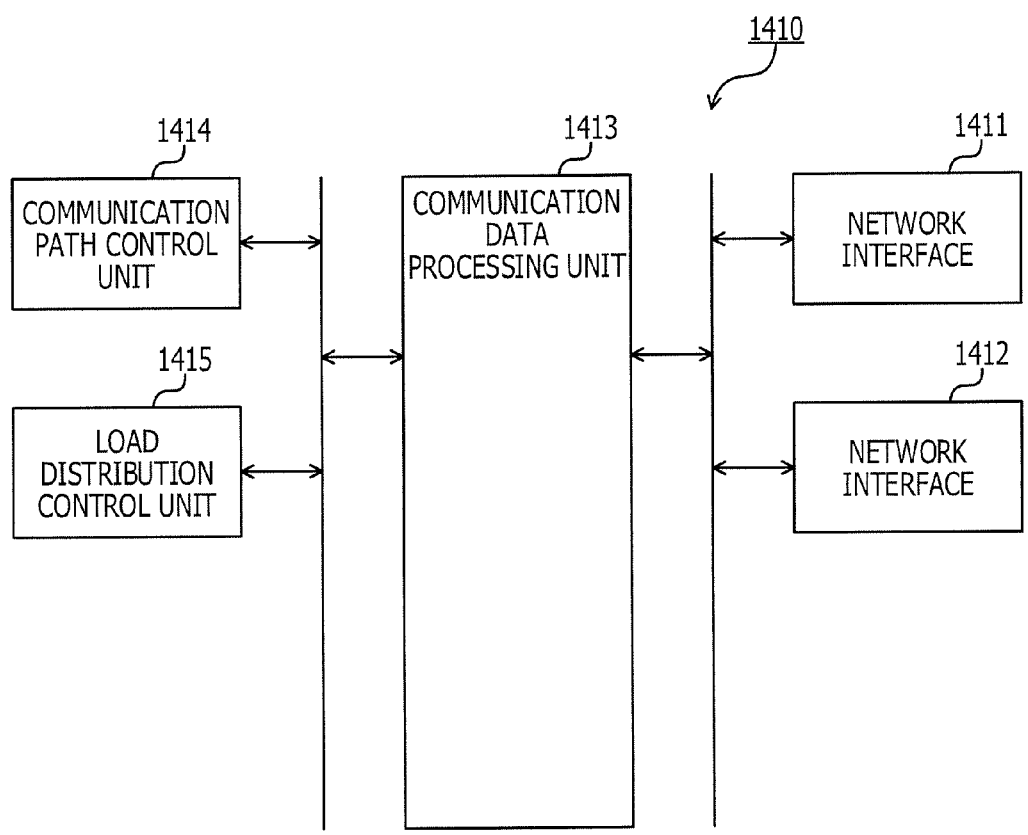
FIG. 14A is a diagram illustrating an example load distribution source node according to the second embodiment.

FIG. 14A is a diagram illustrating an example load distribution source node according to the second embodiment. The eNB 212 which is a load distribution source node may be achieved by the communication device 1410 illustrated in FIG. 14A, for example. The communication device 1410 includes network interfaces 1411 and 1412, a communication data processing unit 1413, a communication path control unit 1414, and a load distribution control unit 1415.

The Internet interfaces 1411 and 1412 terminate the L1/L2/L3 protocol unique to the network interface and perform transmission and reception of data with an external node. For example, the network interface 1411 is a wired communication interface performing communications with the S-GW/MME 221. Also, the network interface 1412 is a communication interface performing radio communications with the UE 211, for example.

The communication data processing unit 1413 performs processing relating to data routing or data transfer protocol. Also, the communication data processing unit 1413 acquires signaling information, such as a signal message with other node, which is addressed to the communication device, and also performs data transmission and data reception with other function to perform processing on the acquired signaling information.

The communication path control unit 1414 performs setting, release, and change processing on the relay information to the communication data processing unit 1413, and manages the set information. The load distribution control unit 1415 performs processing relating to the distribution in the load distribution destination.

Figure 14B:
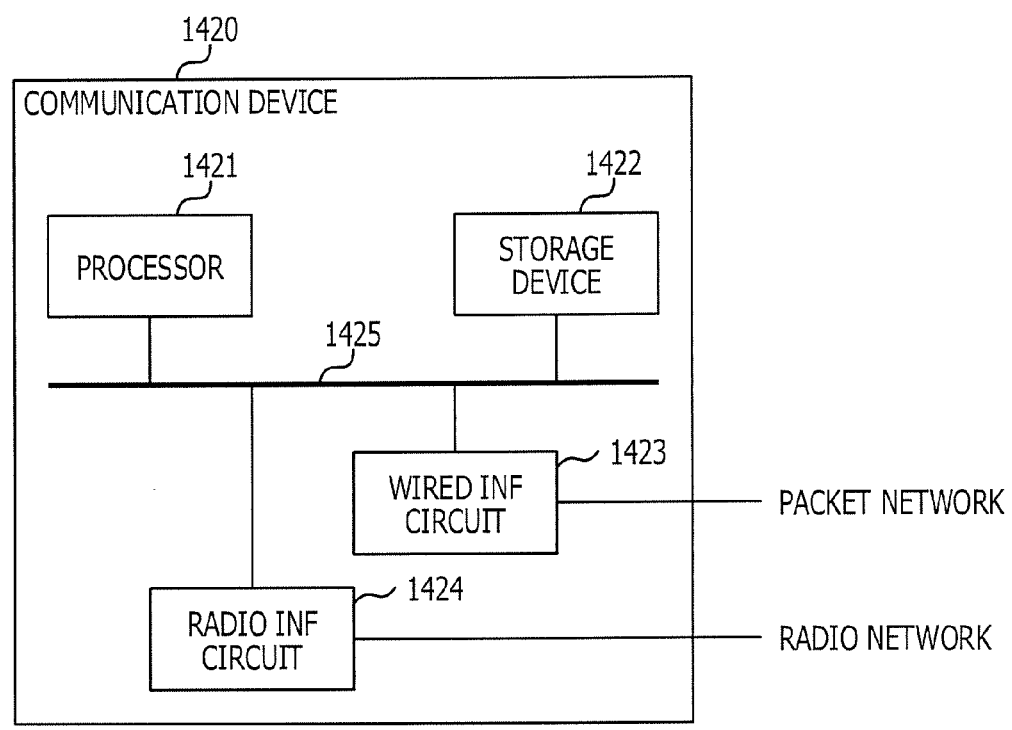
FIG. 14B is a diagram illustrating an example hardware configuration of the load distribution source node according to the second embodiment.

FIG. 14B is a diagram illustrating an example hardware configuration of the load distribution source node according to the second embodiment. The communication device 140 in FIG. 14A may be achieved by a communication device 1420 in FIG. 14B, for example. The communication device 1420 includes a processor 1421, a storage device 1422, a wired INF circuit 1423, and a radio INF circuit 1424. The processor 1421, the storage device 1422, the wired INF circuit 1423, and the radio INF circuit 1424 are coupled by a bus 1425.

The processor 1421 is a processor such as a central processing unit (CPU) which entirely controls the communication device 1420.

The communication device 142 includes a main memory and an auxiliary memory, for example. The main memory is a random access memory (RAM), for example. The main memory is used as a work area of the processor 1421. The auxiliary memory is a non-volatile memory such as a magnetic disk, an optical disk, or a flash memory. The auxiliary memory stores various kinds of programs which operate the communication device 1420. The programs stored in the auxiliary memory are executed by the processor 1421 after being loaded to the main memory.

The wired INF circuit 1423 is a communication interface which performs wired communications with a packet network (for example, the mobile core network 220) of the communication device 1420. The wired INF circuit 1423 is controlled by the processor 1421.

The radio INF circuit 1424 is a communication interface which performs wireless communications with a radio network (for example, the radio access network 210) in the outside of the radio communication device 1420. The radio INF circuit 1424 is controlled by the processor 1421.

The communication data processing unit 1413, the communication path control unit 1414, and the load distribution control unit 1415 illustrated in FIG. 14A may be achieved by the processor 1421, for example. The network interface 1411 illustrated in FIG. 14A may be achieved by the wired INF circuit 1423, for example. The network interface 1412 illustrated in FIG. 14A may be achieved by the radio INF circuit 1424, for example.

(Load Distribution Destination Node According to Second Embodiment)

Figure 15A:
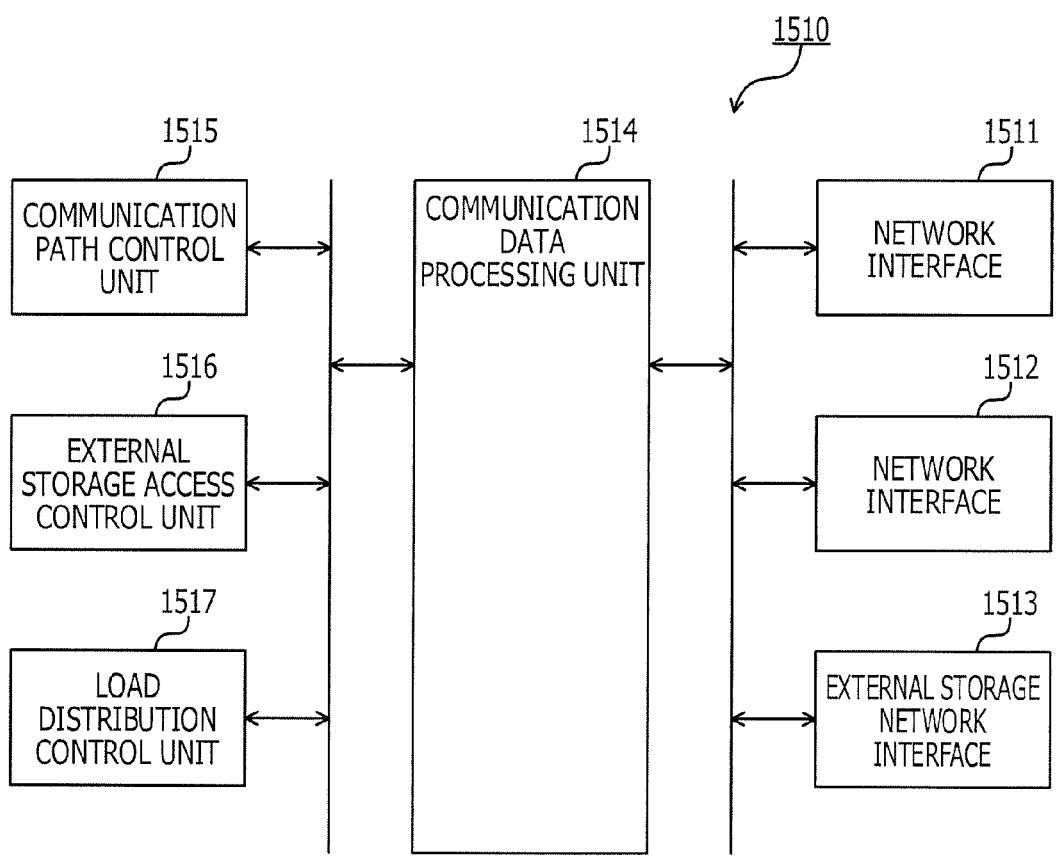
FIG. 15A is a diagram illustrating an example load distribution destination node according to the second embodiment.

FIG. 15A is a diagram illustrating an example load distribution destination node according to the second embodiment. The S-GW/MME 221 which is a load distribution node may be achieved by a communication device 1510 illustrated in FIG. 15A, for example. The communication device 1510 includes network interfaces 1511 and 1512, and an external storage network interface 1513. The communication device 1510 also includes a communication data processing unit 1514, a communication path control unit 1515, an external storage access control unit 1516, and a load distribution control unit 1517.

The network interfaces 1511 and 1512 terminate L1/L2/L3 protocols which are unique to the network interfaces 1511 and 1512, respectively, and perform data transmission and data reception with an external node. For example, the network interface 1511 is a wired communication interface which performs wired communications with the eNB 212. The network interface 1512 is a communication interface which performs radio communications with the P-GW 224, for example.

The external storage network interface 1513 terminates an L1/L2/L3 protocol which is unique to the external storage network interface 1513 and performs data transmission and data reception with an external node. For example, the external storage network interface 1513 is a communication interface which performs wired communications with the external storage system 223.

The communication data processing unit 1514 performs processing relating to the data routing and the data transfer protocol based on the setting information of the communication path. The communication data processing unit 1514 also acquires signaling information which is addressed to the communication device, such as a signal message with other node, and performs data transmission and data reception with other function to process the acquired signaling information.

According to the signaling with other node, the communication path control unit 1515 performs setting, release, and change processing on the relay information to the communication data processing unit 1514 and manages the setting information. The external storage access control unit 1516 is coupled to and communicates with the external storage system 223 and performs processing of acquiring, writing, and erasing data from the external storage system 223. The load distribution control unit 1517 performs processing relating to distribution of the load distribution destination.

The acquisition unit 161 illustrated in FIGS. 1D and 1E may be achieved by the external storage interface 1513, the communication data processing unit 1514, and the external storage access control unit 1516, for example. The relay unit 162 illustrated in FIGS. 1D and 1E may be achieved by the network interfaces 1511 and 1512, the communication data processing unit 1514, and the communication path control unit 1515, for example. The transfer unit 163 illustrated in FIGS. 1D and 1E may be achieved by the network interfaces 1511 and 1512, the communication data processing unit 1514, and the load distribution control unit 1517, for example.

The reception unit 171 illustrated in FIGS. 1F and 1G may be achieved by the network interfaces 1511 and 1512, the communication data processing unit 1514, and the load distribution control unit 1517, for example. The acquisition unit 172 illustrated in FIGS. 1F and 1G may be achieved by the external storage network interface 1513, the communication data processing unit 1514, and the external storage access control unit 1516, for example. The relay unit 173 illustrated in FIGS. 1F and 1G may be achieved by the network interfaces 1511 and 1512, the communication data processing unit 1514, and the communication path control unit 1515, for example.

Figure 15B:
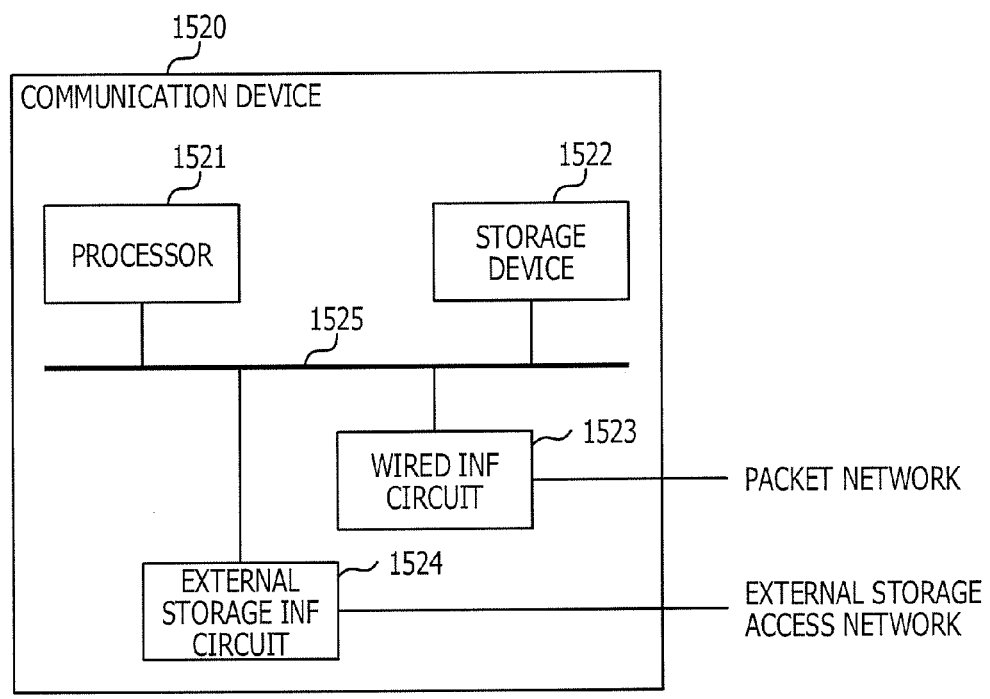
FIG. 15B is a diagram illustrating an example hardware configuration of the load distribution destination node according to the second embodiment.

FIG. 15B is a diagram illustrating an example hardware configuration of the load distribution destination node according to the second embodiment. The communication device 1510 in FIG. 15A may be achieved by a communication device 1520 in FIG. 15B, for example. The communication device 1520 includes a processor 1521, a storage device 1522, a wired INF circuit 1523, and an external storage INF circuit 1524. The processor 1521, the storage device 1522, the wired INF circuit 1523, and the external storage INF circuit 1524 are coupled by a bus 1525. The processor 1521 is a processor such as a CPU which entirely controls the communication device 1520.

For example, the storage device 1522 includes a main memory and an auxiliary memory. The main memory is a RAM, for example. The main memory is used as a work area of the processor 1521. The auxiliary memory is a non-volatile memory such as a magnetic disk, an optical disk, or a flash memory, for example. The auxiliary memory stores various kinds of programs which operate the communication device 1520. The programs stored in the auxiliary memory are executed by the processor 1521 after being loaded to the main memory.

The wired INF circuit 1523 is a communication interface which performs wired communications with the packet network (for example, the mobile core network 220) of the communication device 1520. For example, the wired INF circuit 1523 includes a communication interface performing communications with the eNB 212 and a communication interface performing communications with the P-GW 224. The wired INF circuit 1523 is controlled by the processor 1521.

For example, the external storage INF circuit 1524 is a communication interface which performs wired communications with the external storage access network (for example, the external storage system 223) of the communication device 1520. The external storage INF circuit 1524 is controlled by the processor 1521.

The communication data processing unit 1514, the communication path control unit 1515, the external storage access control unit 1516, and the load distribution control unit 1517 illustrated in FIG. 15A may be achieved by the processor 1521, for example. The network interfaces 1511 and 1512 illustrated in FIG. 15A may be achieved by the wired INF circuit 1523, for example. The external storage network interface 1513 illustrated in FIG. 15A may be achieved by the external storage INF circuit 1524, for example.

(Downstream Node of Load Distribution Destination Node According to Second Embodiment)

Figure 16A:
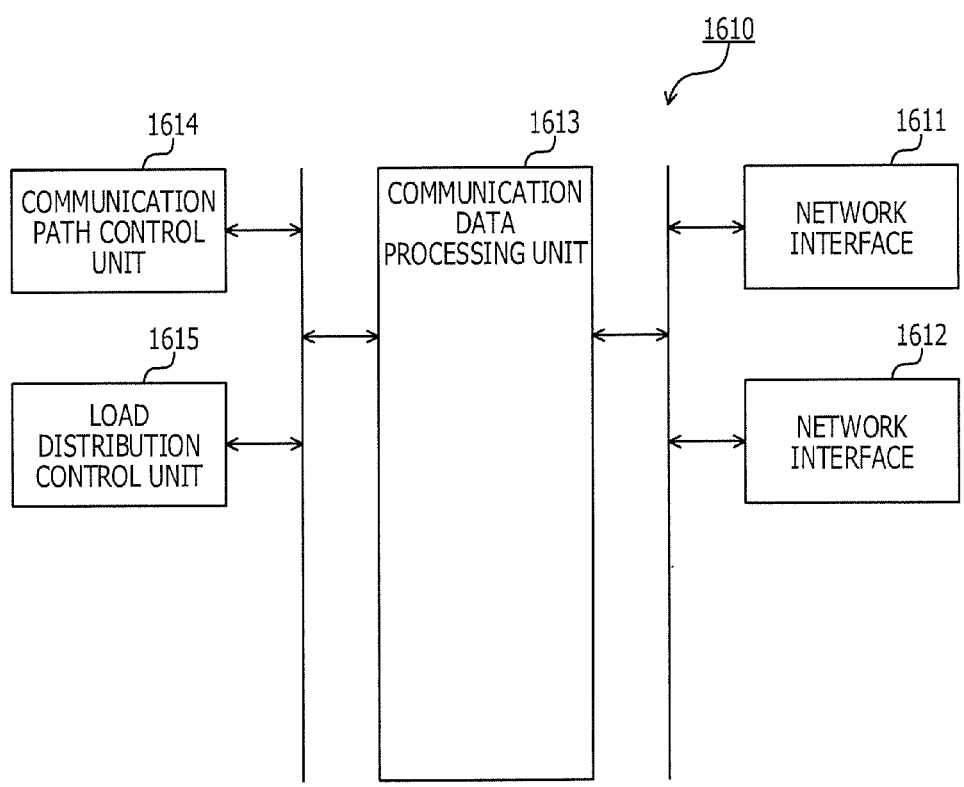
FIG. 16A is a diagram illustrating an example of a downstream node of the load distribution destination node according to the second embodiment.

FIG. 16A is a diagram illustrating an example of a downstream node of the load distribution destination node according to the second embodiment. For example, the downstream node (for example, the P-GW 224) of the load distribution destination node may be achieved by a communication device 1610 illustrated in FIG. 16A. The communication device 1610 includes network interfaces 1611 and 1612, the communication data processing unit 1613, the communication path control unit 1614, and the load distribution control unit 1615.

The network interfaces 1611 and 1612 terminate L1/L2/L3 protocols which are unique to the network interfaces 1611 and 1612, respectively and perform data transmission and data reception with an external node. For example, the network interface 1611 is a wired communication interface performing communications with the S-GW/MME 221. The network interface 1612 is a communication interface performing radio communication with the web/content server 231, for example.

The communication data processing unit 1613 performs processing relating to data routing and data transfer protocol based on the setting information of the communication path. Also, the communication data processing unit 1613 acquires signaling information and the like which are addressed to the communication device, such as a signal message with other node, and performs data transmission and data reception with other function to process the acquired signaling information.

According to the signaling with other node, the communication path control unit 1614 performs processing of setting, release, and change on the relay information to the communication data processing unit 1613 and manages the setting information. The load distribution control unit 1615 performs processing relating to distribution in the load distribution destination.

Figure 16B:
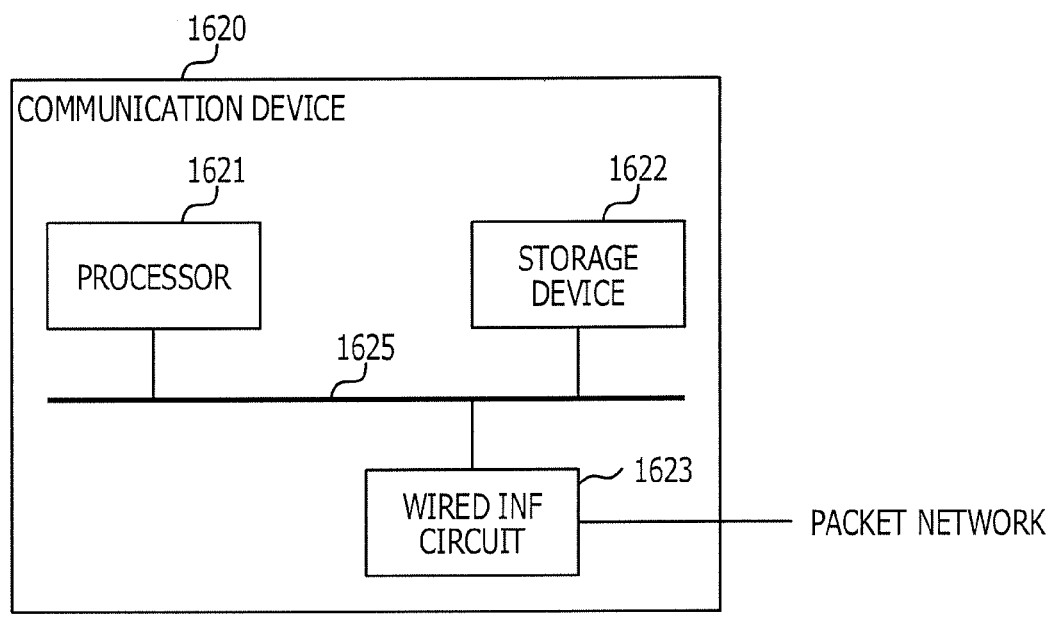
FIG. 16B is a diagram illustrating an example hardware configuration of the downstream node of the load distribution destination node according to the second embodiment.

FIG. 16B is a diagram illustrating an example hardware configuration of the downstream node of the load distribution destination node according to the second embodiment. The communication device 1610 in FIG. 14A may be achieved by a communication device 1620 in FIG. 16B, for example. The communication device 1620 includes a processor 1621, and a storage device 1622, a wired INF circuit 1623. The processor 1621, the storage device 1622, and the wired INF circuit 1623 are coupled by a bus 1625. The processor 1621 is a processor such as a CPU which entirely controls the communication device 1620.

The storage device 1622 includes a main memory and an auxiliary memory, for example. The main memory is a RAM, for example. The main memory is used as a work area of the processor 1621. The auxiliary memory is a non-volatile memory such as a magnetic disk, an optical disk, or a flash memory. The auxiliary memory stores various kinds of programs which operate the communication device 1620. The programs stored in the auxiliary memory are executed by the processor 1621 after being loaded to the main memory.

The wired INF circuit 1623 is a communication interface which performs wired communications with a packet network of the communication device 1620. For example, the wired INF circuit 1623 includes a communication interface performing communications with the S-GW/MME 221 and a communication network performing communications with the web/content server 231. The wired INF circuit 1623 is controlled by the processor 1621.

The communication data processing unit 1613, the communication path control unit 1614, and the load distribution control unit 1615 illustrated in FIG. 16A may be achieved by the processor 1621, for example. The network interfaces 1611 and 1612 illustrated in FIG. 16A may be achieved by the wired INF circuit 1623, for example.

As described above, in the second embodiment, when the S-GW/MME 221(#a) performs load distribution, the data received from the eNB 212 and the address of the S-GW/MME 221(#a) are transferred to the S-GW/MME 221(#b) through the eNB 212. Using the address transferred from the S-GW/MME 221(#a), the S-GW/MME 221(#b) acquires a relay destination address from the external storage system 223 and relays the data transferred from the S-GW/MME 221(#a) to the relay destination address.

Accordingly, when the S-GW/MME 221(#a) performs the load distribution, the S-GW/MME 221(#b) is able to perform the load distribution by relaying the data without reestablishing a communication path. Thus, communications may be efficiently performed.

Third Embodiment

The description is given of a third embodiment in portions different from those of the second embodiment. In the third embodiment, when an S-GW/MME 221(#b) to which data is distributed is in a congested state, the S-GW/MME 221(#b) returns the data to an eNB 212. The eNB 212 distributes the returned data again.

(Operation in Load Distribution in Communication System According to Third Embodiment)

Figure 17A:
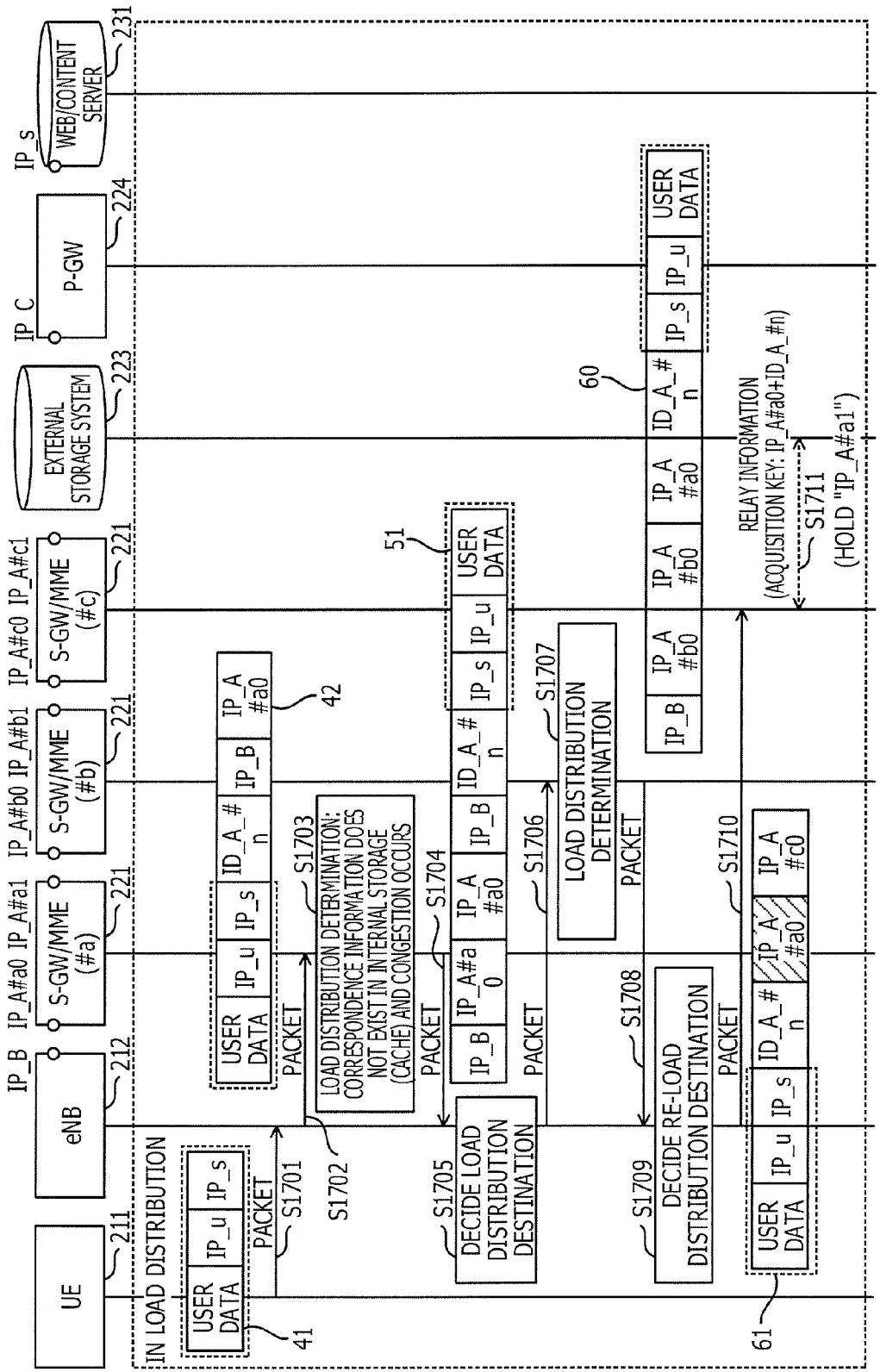
FIG. 17A is a sequential diagram (No. 1) illustrating an example of an operation in load distribution in a communication system according to a third embodiment.
Figure 17B:
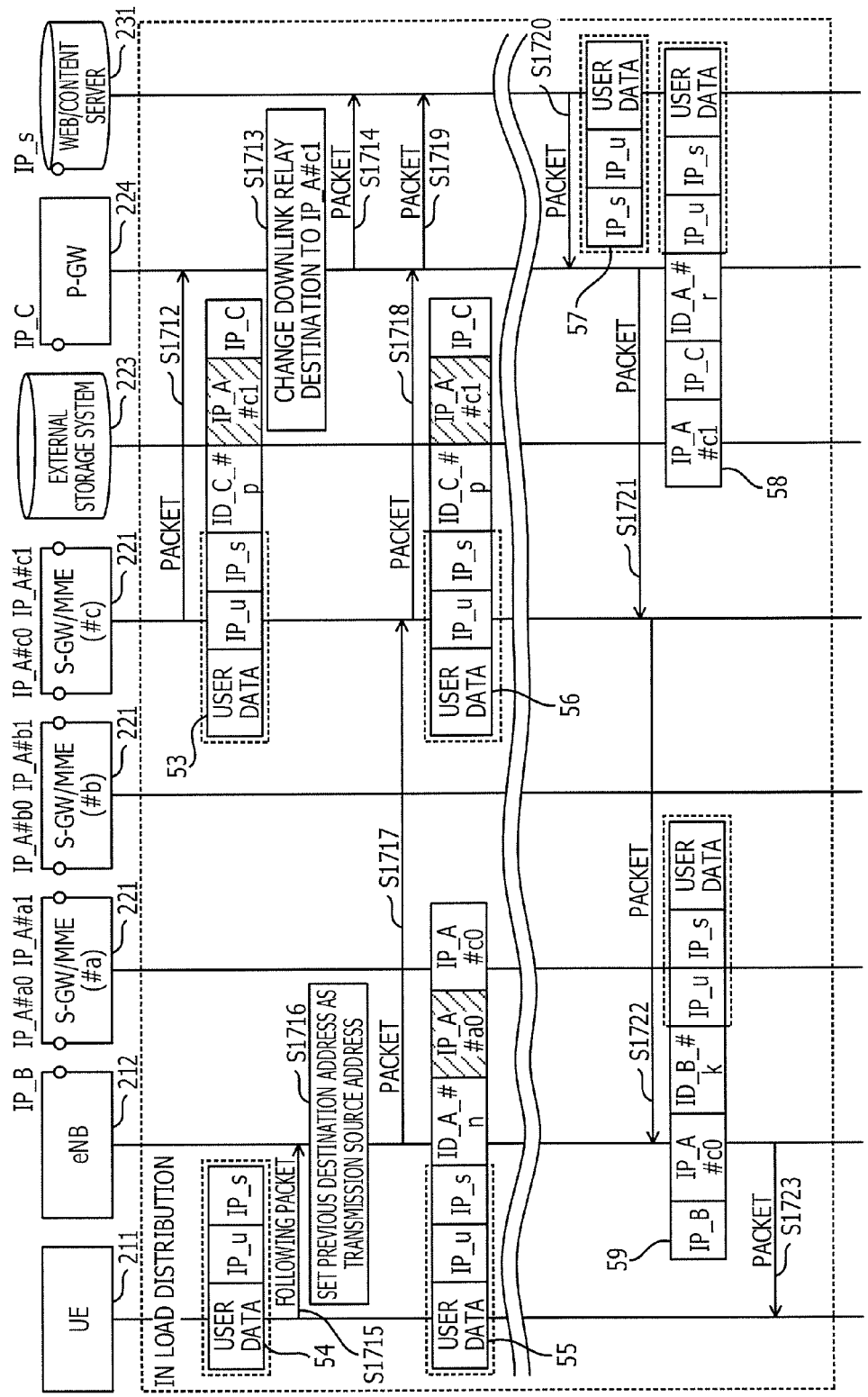
FIG. 17B is a sequential diagram (No. 2) illustrating an example of an operation in load distribution in the communication system according to the third embodiment.

FIG. 17A is a sequential diagram (No. 1) illustrating an example of an operation in load distribution in a communication system according to the third embodiment. FIG. 17B is a sequential diagram (No. 2) illustrating an example of an operation in load distribution in the communication system according to the third embodiment.

In FIGS. 17A and 17B, same reference numerals are given to denote portions same as those illustrated in FIGS. 5A and 5B, and the description thereof is omitted. Steps S1701 to S1706 in FIG. 17A are same as steps S501 to S506 in FIGS. 5A and 5B.

After step S1706, the S-GW/MME 221(#b) determines if load distribution is performed (step S1707). In the example in FIG. 17A, the S-GW/MME 221(#b) does not have corresponding relay information (correspondence information) in its own internal storage 222 (cache) and is in a congested state. Therefore, it is determined that the load distribution is performed.

Then, the S-GW/MME 221(#b) transmits a packet 60 in which a packet 52 (unillustrated in FIG. 17A) is encapsulated to the eNB 212 so as to return the packet 52 to the eNB 212 (step S1708). A packet 60 at step S1708 includes not only various pieces of information of the packet 52 but also a transmission source address (IP_A#Ab0) and a destination address (IP_B).

Thereafter, the eNB 212 decides a load redistribution destination (step S1709). It is assumed in the example in FIG. 17A that the eNB 212 decides the S-GW/MME 221(#c) as a load redistribution destination.

After that, the eNB 212 transmits a packet 61 at step S1708 to the S-GW/MME 221(#c) so as to distribute the packet 41 to the S-GW/MME 221(#c)(step S1710). The packet 61 includes not only various pieces of information (within the dotted line frame) of the packet 41 but also a UL communication path ID (ID_A_#n), a transmission source address (IP_A#Aa0), and a destination address (IP_A#c0). As described above, it is assumed that the transmission source address of the packet 61 is the address indicating not the eNB 212 but the S-GW/MME 221(#a).

The transmission source address of the packet 61 which is received by the S-GW/MME 221(#c) at step S1710 is an address of the S-GW/MME 221(#a) in the load distribution group same as that of the S-GW/MME 221(#c). For this reason, the S-GW/MME 221(#c) uses a pair of the transmission source address (IP_A_#a0) of the packet 61 and the UL communication path ID (ID_A_#n) as an acquisition key so as to acquire the relay information from the external storage system 223 (step S1711). Accordingly, of the relay information 30, the relay information 43 (IP_C+ID_C_#p) about the uplink communication of the UE 211 may be acquired. Also, at this time, the S-GW/MME 221(#c) updates the address (IP_A#a1) of the S-GW/MME 221(#a) to an address for the S-GW/MME 221(#c) and holds the updated address.

As illustrated in FIG. 17B, the S-GW/MME 221(#c) transmits the packet 53 to the P-GW 224 so as to relay the packet 61 at step S1710 (step S1712). The packet 53 includes not only various pieces of information (within the dotted line frame) but also a UL communication path ID (ID_C_#p), a transmission source address (IP_A#c1), and a transmission address (IP_C).

Then, the P-GW 224 changes the relay destination in the downlink communication associated with the DL communication path ID (ID_A_#r) from "IP_A#a1" to "IP_A#c1" (step S1713). Accordingly, when the path in the uplink communication is changed, the path in the downlink communication may be also changed.

The P-GW 224 transmits the packet 41 included in the packet 53 to the web/content server 231 (step S1714). Accordingly, the packet transmitted from the UE 211 may be transmitted to the web/content server 231.

It is also assumed that the UE 211 transmits the packet 54 after the packet 41 to the eNB 212 (step S1715). Then, the eNB 212 sets the previous transmission destination address (IP_A#a0) which is the transmission destination address in the packet 42 at step S1702 as a transmission source address of the packet 55 including the packet 54 (step S1716).

The eNB 212 transmits the packet 55 in which the transmission source address is set at step S1716 to the S-GW/MME 221(#c) so as to relay the packet 54 (step S1717).

Based on the relay information acquired at step S1711, the S-GW/MME 221(#c) transmits the packet 56 to the P-GW 224 so as to relay the packet 54 (step S1718). The packet 56 includes not only various pieces of information (within the dotted line frame) of the packet 54 but also a UL communication path ID (ID_C_#p), a transmission source address (IP_A#c1), and a destination address (IP_C).

It is then assumed that the P-GW 224 transmits the packet 54 included in the packet 56 at step S1718 to the web/content server 231 (step S1719). Accordingly, the packet 54 transmitted by the UE 211 reaches the web/content server 231.

It is also assumed that the web/content server 231 transmits the packet 57 which is addressed to the UE 211 to the P-GW 221 (step S1720). The packet 57 is content data corresponding to a request of the packet 41 from the UE 211, for example.

Based on the relay destination (IP_A#c1) which is changed at step S1713, the P-GW 224 transmits a packet 58 to the S-GW/MME 221(#c) so as to relay the packet 57 (step S1721). The packet 58 includes not only various pieces of information (within the dotted line frame) of the packet 57 but also a UL communication path ID (ID_A_#r), a transmission source address (IP_C), and a destination address (IP_A#c1).

After that, the S-GW/MME 221(#c) transmits a packet 59 to the eNB 212 so as to relay the packet 58 (step S1722). The packet 59 includes not only various pieces of information (within the dotted line frame) of the packet 41 but also a DL communication path ID (ID_B_#k), a transmission source address (IP_A#c0), and a destination address (IP_B).

Then, the eNB 212 transmits the packet 57 included in the packet 59 to the UE 211 (step S1723). Accordingly, the packet 57 transmitted by the web/content server 231 may be transmitted to the UE 211.

(Processing on Load Distribution Destination Node)

FIG. 18 is a flowchart illustrating example processing which is performed on a load distribution destination node according to the third embodiment. In the examples in FIGS. 17A and 17B, for example, each of the S-GW/MMEs 221(#a to #c) performs steps in FIG. 18 when a packet is received.

The S-GW/MME 221 determines if the S-GW/MME 221 itself is in a congested state (step S1801). When the S-GW/MME 221 itself is in a congested state (step S1801: Yes), the S-GW/MME 221 extracts a user packet included in the received packet and adds an encapsulation header to the extracted user packet so as to encapsulate the received packet (step S1802). At this time, the S-GW/MME 221 uses the transmission source address of the encapsulation header as the own node address. Also, the S-GW/MME 221 uses the destination address of the encapsulation header as the transmission source address of the received packet.

The S-GW/MME 221 transmits the packet encapsulated at step S1802 (step S1803) and terminates a series of the processing. Accordingly, the S-GW/MME 221 may return the received packet.

When the S-GW/MME 221 itself is not in a congested state at step S1801 (step S1801: No), the S-GW/MME 221 determines if the transmission source address of the received packet is included in the load distribution group same as that of the S-GW/MME 221 (step S1804). When the transmission source address of the received packet is included in the same load distribution group (step S1804: Yes), the S-GW/MME 221 acquires the relay information associated with the transmission source address of the received packet and the communication path ID from the external storage system 223 (step S1805). At this time, the S-GW/MME 221 updates the address of the previous relay device (the load distribution destination node) in the acquired relay information to an address for the S-GW/MME 221 itself and holds the updated address.

Then, the S-GW/MME 221 changes the encapsulation header of the received packet (step S1806). In other words, the S-GW/MME 221 sets the transmission source address of the encapsulation header to the own node address. Also, the S-GW/MME 221 sets the destination address of the encapsulation header to the correspondent node address which is indicated by the relay information acquired at step S1805.

The S-GW/MME 221 transmits the packet in which the encapsulation header is changed at step S1806 (step S1807) and terminates a series of the processing. Accordingly, the packet transferred from the node in the load distribution group same as that of the S-GW/MME 221 may be relayed.

When the transmission source address of the received packet is not included in the load distribution group at step S1804 (step S1804: No), the S-GW/MME 221 determines if the corresponding relay information exists in the internal storage 222 thereof (step S1808). The corresponding relay information is relay information associated with the own node address (the destination address of the received packet) and the communication path ID of the received packet.

When the corresponding relay information does not exist in the internal storage 222 at step S1808 (step S1808: No), the S-GW/MME 221 acquires the relay information associated with the own node address and the communication path ID of the received packet from the external storage system 223 (step S1809).

Then, the S-GW/MME 221 extracts a user packet included in the received packet and adds an encapsulation header to the extracted user packet so as to encapsulate the received packet (step S1810). At this time, the S-GW/MME 221 uses the transmission source address of the encapsulation header as the own node address. Also, the S-GW/MME 221 uses the destination address of the encapsulation header as the correspondent node address which is indicated by the relay information acquired at step S1809.

The S-GW/MME 221 transmits the packet encapsulated at step S1810 (step S1811) and terminates a series of the processing. Accordingly, the S-GW/MME 221 may relay the received packet.

When the corresponding relay information exists in the internal storage 222 at step S1808 (step S1808: Yes), the S-GW/MME 221 proceeds to step S1810. In this case, the S-GW/MME 221 transmits the received packet to the correspondent node address which is indicated by the corresponding relay information in the internal storage 222.

(Processing which is Performed on Load Distribution Source Node According to Third Embodiment)

Figure 19:
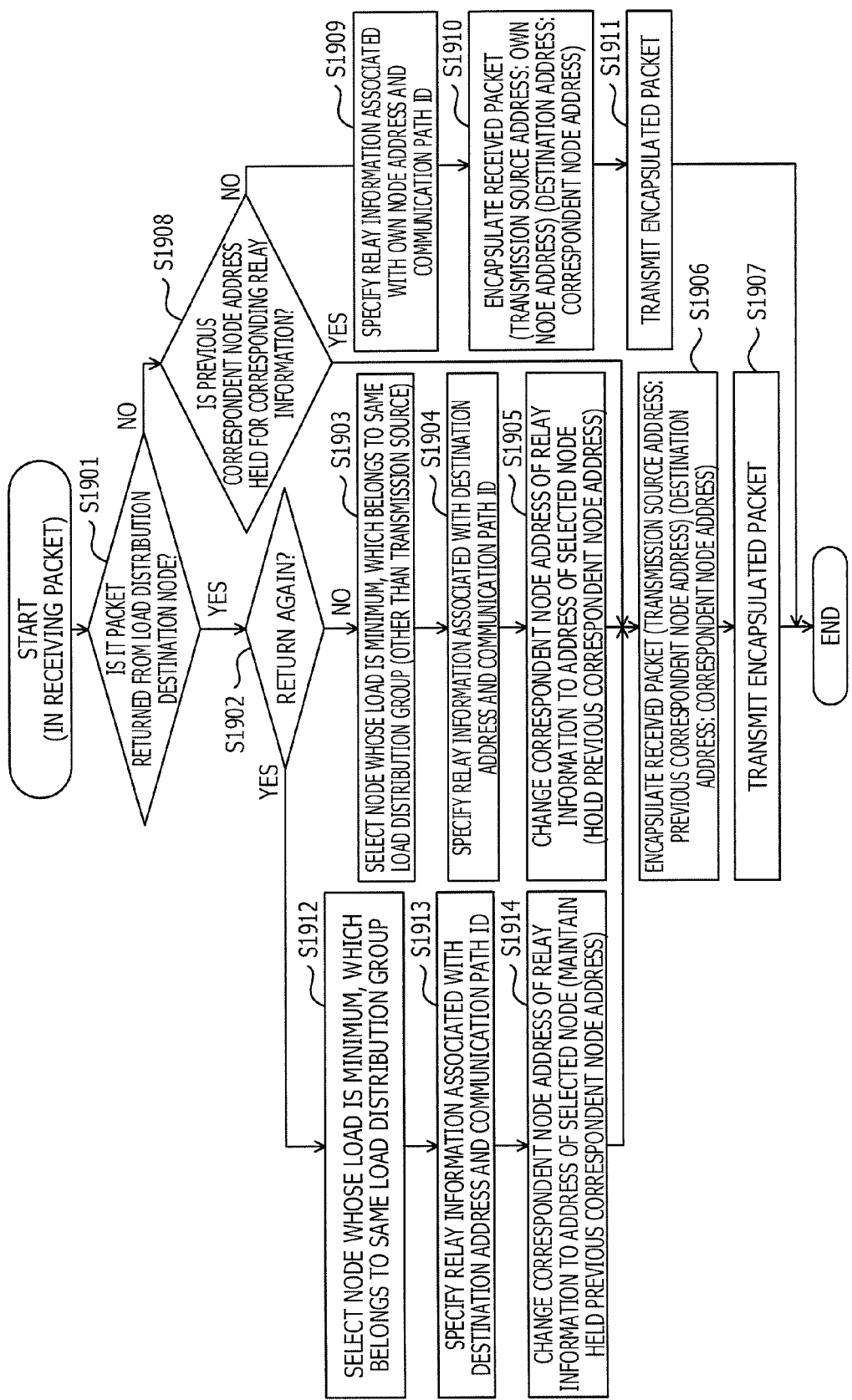
FIG. 19 is a flowchart illustrating example processing which is performed on a load distribution source node according to the third embodiment.

FIG. 19 is a flowchart illustrating example processing which is performed on a load distribution source node according to the third embodiment. The eNB 212 which is a load distribution source node in the example illustrated in FIGS. 17A and 17B performs steps in FIG. 19 when a packet is received, for example.

The eNB 212 first determines if the received packet is the packet returned from the load distribution source node (step S1901). When the received packet is the returned packet (step S1901: Yes), the eNB 212 determines if the received packet is a re-returned packet (step S1902). Whether or not the received packet is the re-returned packet may be determined depending on, for example, if the transmission source address of the encapsulation header of the received packet is different from the destination address in the encapsulated packet.

When the received packet is not the re-returned packet at step S1902 (step S1902: No), the eNB 212 proceeds to step S1903. Steps S1903 to S1907 in FIG. 19 are same as steps S702 to S706 in FIG. 7.

When the received packet is the re-returned packet at step S1902 (step S1902: Yes), the eNB 212 selects a node whose load is minimum from nodes whose load distribution group is same as that of the load distribution source node in the source of the returned packet (step S1912). A node to be selected at step S1912 is a node other than the return source and the destination of the encapsulated node. For example, the eNB 212 performs selection at step S1912 based on the load state information which is received from each of the load distribution destination nodes (the S-GW/MME 221).

After that, the eNB 212 specifies the relay information associated with the destination address and the communication path ID from the relay information stored in the eNB 212 (step S1913).

The eNB 212 changes the correspondent node address which is indicated by the relay information specified at step S193 to an address of the node selected at step S1902 (step S1914). At this time, the eNB 212 maintains the previous correspondent node address which is held in association with the specified relay information. Then, the eNB 212 proceeds to step S1906.

When the received packet is not a returned packet at step S1901 (step S1901: No), the eNB 232 determines if the previous correspondent node address is held for the relay information associated with the received packet (step S1908). When the previous correspondent node address is held (step S1908: Yes), the eNB 212 proceeds to step S1906. Accordingly, when a packet is returned from the load distribution destination node, the following packet may be directly transmitted to the node selected at step S1903 or S1912.

When the previous correspondent node address is not held at step S1908 (step S1908: No), the eNB 212 proceeds to step S1909. Steps 1909 to S1911 are same as steps S708 to S710 illustrated in FIG. 7.

(Load Distribution Group Management Table in Load Distribution Source According to Third Embodiment)

Figure 20:
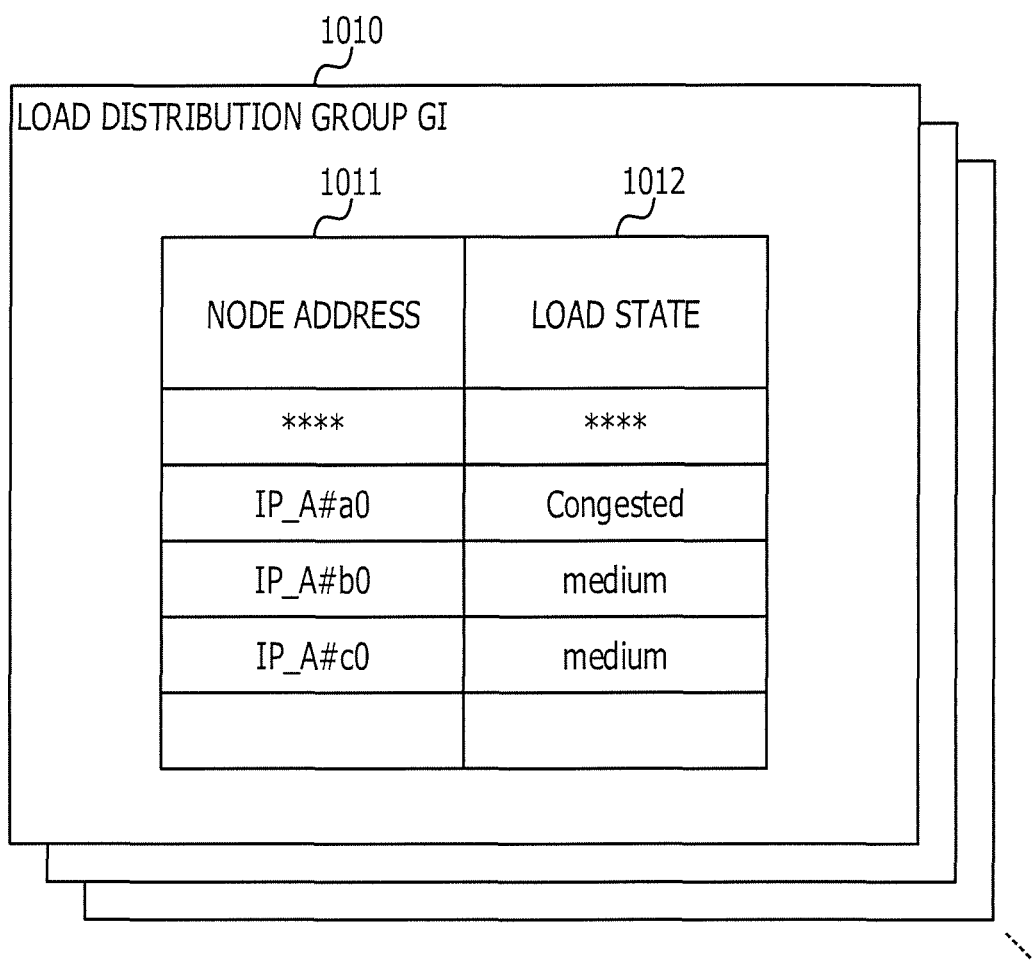
FIG. 20 is a diagram illustrating an example load distribution group management table in a load distribution source according to the third embodiment.

FIG. 20 is a diagram illustrating an example load distribution group management table in a load distribution source according to the third embodiments. In FIG. 20, same reference numerals are given to denote portions same as those illustrated in FIG. 10, and the description thereof is omitted. In the examples illustrated in FIGS. 17A and 17B, the eNB 212 stores multiple load distribution group management tables 1010 in FIG. 20.

The load distribution group management tables 1010 in FIG. 20 are registered in a load distribution group in which addresses of the S-GW/MME 221(#a) and the S-GW/MME 221(#b) and the address (IP_A#c0) of the S-GW/MME 221(#c) are same. The load state 1012 is "medium," which indicates an intermediate state between "Congested" and "Low."

(Uplink Relay Table which is Stored in Load Distribution Source Node According to Third Embodiment)

FIG. 21A is a diagram illustrating an uplink relay table which is stored in a load distribution source node according to the third embodiment. In FIG. 21A, same reference numerals are given to denote portions same as those illustrated in FIG. 11A, and the description thereof is omitted.

In the examples illustrated in FIGS. 17A and 17B, the eNB 212 which is a load distribution source node stores an uplink relay table 1110 in FIG. 21A, for example. In other words, in the examples in FIGS. 17A and 17B, the address (IP_A#c0) of the S-GW/MME 221(#c) is set as a correspondent node address 1112 of the relay table 1110.

(Downlink Relay Table Stored in Load Distribution Source Node)

FIG. 21B is a diagram illustrating an example downlink rely table which is stored in the load distribution source node according to the third embodiment. In FIG. 21B, same reference numerals are given to denote portions same as those illustrated in FIG. 11B, and the description thereof is omitted.

In the examples illustrated in FIGS. 17A and 17B, the eNB 212 which is a load distribution destination node stores a downlink relay table 1120 in FIG. 21B, for example. In other words, in the examples illustrated in FIGS. 17A and 17B, the address (IP_A#c0) of the S-GW/MME 221(#c) is set as the correspondent node address 1123 of the relay table 1120.

As described above, in the third embodiment, when the S-GW/MME 221(#b) to which data is distributed is in a congested state, the S-GW/MME 221(#b) returns the data to the eNB 212. Then, the eNB 212 further distributes the returned data to the S-GW/MME 221(#c). At this time, the eNB 212 sets the transmission source of the data to be distributed to the address of the S-GW/MME 221(#a).

Consequently, the S-GW/MME 221(#c) may acquire the address in a relay destination from the external storage 223 by using the address of the S-GW/MME (#a) and relay the data distributed from the eNB 212 to the address in the relay destination.

Fourth Embodiment

The description is given of a fourth embodiment in portions different from those of the second embodiment. In the fourth embodiment, when an S-GW/MME 221(#a) performs load distribution, data received from an eNB 212 and an address of the S-GW/MME 221(#a) are transferred to an S-GW/MME 221(#b) without involving the eNB 212.

(Operation in Load Distribution in Communication System According to Fourth Embodiment)

FIG. 22A is a sequential diagram (No. 1) illustrating an example of an operation in load distribution in a communication system according to the fourth embodiment. FIG. 22B is a sequential diagram (No. 2) illustrating an example of an operation in load distribution in the communication system according to the fourth embodiment.

For example, it is assumed that congestion occurs in the S-GW/MME 221(#a) after the relay network coupling phase in FIG. 3 and the user data relay phase illustrated in FIG. 4, for example. In this case, steps illustrated in FIGS. 22A and 22B are performed.

Steps S2201 to S2203 in FIG. 22A are same as steps S501 to S503 in FIG. 5A. After step S2203, the S-GW/MME 221(#a) decides a load distribution destination (step S2204). It is assumed in the example in FIG. 22A that the S-GW/MME 221(#a) decides the S-GW/MME 221(#a) as the load distribution destination.

After that, the S-GW/MME 221(#a) transmits a packet 52 to an S-GW/MME 221(#b), so as to distribute a packet 41 to the S-GW/MME 221(#b) (step S2205). In this manner, when determination if load distribution is performed is made and it is determined that the load distribution is performed, the S-GW/MME 221(#a) directly transmits the packet 52 to the S-GW/MME 221(#b) without returning the packet 41.

Steps S2206 to S2209 in FIG. 21A are same as steps S507 to S510 in FIGS. 5A and 5B.

Steps S2210 to S2213 are same as steps S516 to S519 in FIG. 5B.

After step S2213, the eNB 212 changes uplink relay information to an address (IP_A#b0) of an interface of the S-GW/MME 221(#b) and holds an address (IP_A#a0) of an interface of the S-GW/MME 221(#a) before being changed (step S2214).

Steps S2215 to S2218 in FIG. 22B are same as steps S511, S513 to S515 in FIG. 5B. At step S2216, the eNB 212 sets the address (IP_A#a0) which is held at step S2214 as the transmission source address of the packet 55 included in the packet 54.

(Processing Performed on Load Distribution Destination Node According to Fourth Embodiment)

FIG. 23 is a flowchart illustrating example processing of the load distribution destination node according to the fourth embodiment. In the examples illustrated in FIGS. 22A and 22B, each of the S-GW/MME 221s (#a, #b) which is a load distribution destination node performs steps in FIG. 23 when a packet is received.

Steps S2301 to 2306 in FIG. 23 are same as steps S601 to S606 in FIG. 6. When the S-GW/MME 221 itself is in a congested state at step S2306 (step S2306: Yes), the S-GW/MME 221 selects a node whose load is minimum, which belongs to a same load distribution group (step S2307). The node to be selected at step S2307 is a node different from the S-GW/MME 221 itself. For example, the S-GW/MME 221 performs selection at step S2307 based on load state information received from each of the load distribution destination nodes (other S-GW/MMEs 221).

Then, the S-GW/MME 221 extracts a user packet included in a received packet and adds an encapsulation header to the extracted user packet so as to encapsulate the received packet (step S2308). At this time, the S-GW/MME 221 uses the transmission source address of the encapsulation header as its own node address. Also, the S-GW/MME 221 uses the destination address of the encapsulation header as an address of the node selected at step S2307.

Then, the S-GW/MME 221 transmits the packet encapsulated at step S2308 (step S2309) and terminates a series of the processing. Accordingly, the S-GW/MME 221 may directly distribute the received packet.

Steps S2310 to S2312 in FIG. 23 are same as steps S609 to S611.

(Processing Performed on Load Distribution Source Node According to Fourth Embodiment)

Figure 24:
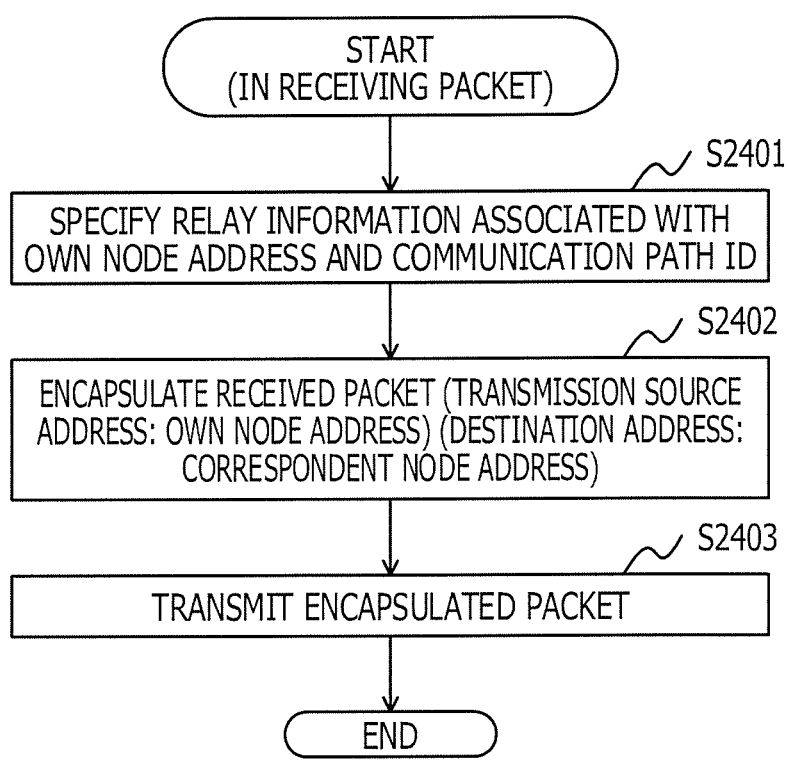
FIG. 24 is a flowchart illustrating example processing which is performed on a load distribution source node according to the fourth embodiment.

FIG. 24 is a flowchart illustrating example processing which is performed on a load distribution source node according to the fourth embodiment. In the examples in FIGS. 22A and 22B, the eNB 212 which is a load distribution source node performs steps in FIG. 24 when a packet is received, for example. The eNB 212 first specifies relay information associated with its own node address (destination address of the received packet) and a communication path ID from the relay information which is stored in the eNB 212 (step S2401).

After that, the eNB 212 extracts a user packet included in the received packet and adds an encapsulation header to the extracted user packet so as to encapsulate the received packet (step S2402). At this time, the eNB 212 uses the transmission source address of the encapsulation header as the own node address. Also, the eNB 212 uses the destination address of the encapsulation header as a correspondent node address which is indicated by the relay information specified at step S2401.

Then, the eNB 212 transmits the packet encapsulated at step S2402 (step S2303) and terminates a series of the processing. Accordingly, the eNB 212 which is a load distribution source node according to the fourth embodiment does not have to perform the load distribution processing.

(Uplink Relay Table which is Stored in Load Distribution Source Node According to Fourth Embodiment)

Figure 25A:
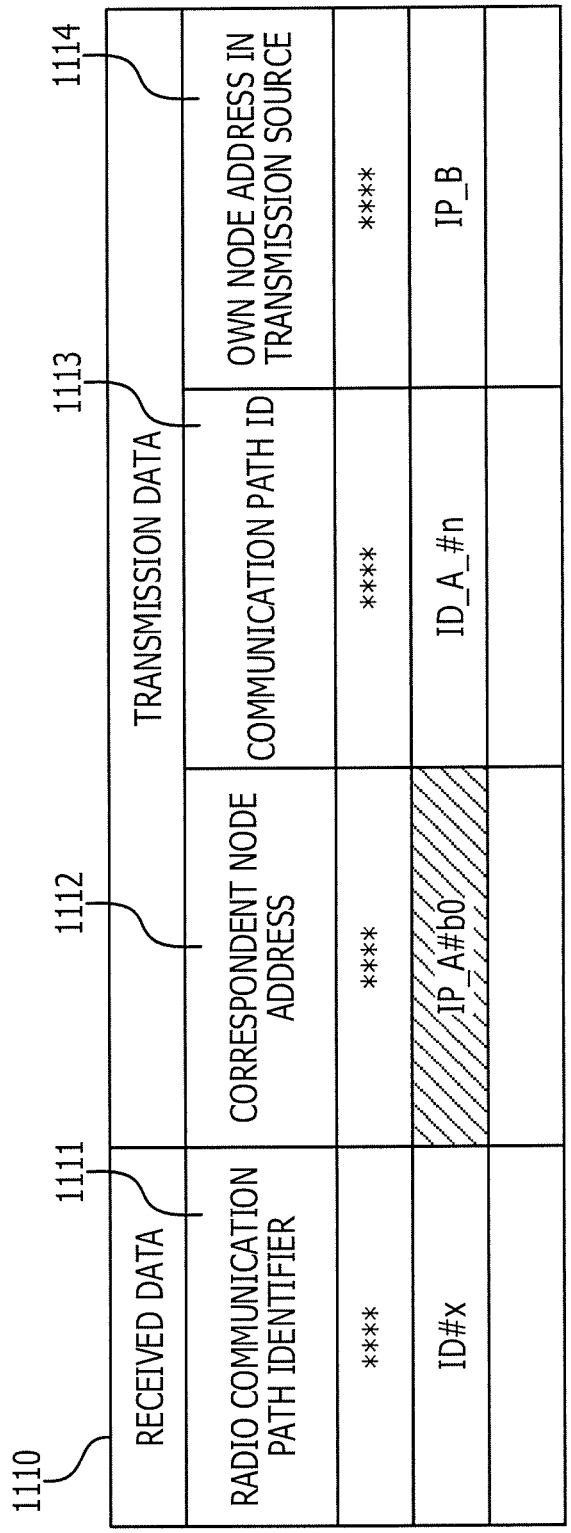
FIG. 25A is a diagram illustrating an example uplink relay table which is stored in the load distribution source node according to the fourth embodiment.

FIG. 25A is a diagram illustrating an example uplink relay table which is stored in the load distribution source node according to the fourth embodiment. FIG. 25B is a diagram illustrating an example downlink relay table which is stored in the load distribution source node according to the fourth embodiment. As illustrated in FIG. 25A, in the fourth embodiment, the relay table 1110 which is stored in the eNB 212 of the load distribution source node does not have to include previous correspondent node address 1115 in FIG. 11A.

As described above, in the fourth embodiment, when the S-GW/MME 221(#a) performs load distribution, the data received from the eNB 212 and the address of the S-GW/MME 221(#a) are transferred to the S-GW/MME 221(#b) without passing through the eNB 212. The S-GW/MME 221(#b) acquires a relay destination address from the external storage system 223 by using the address transferred from the S-GW/MME 221(#a) and relays the relay destination address which is transferred from the S-GW/MME 221(#a) to the relay destination address.

Accordingly, when the S-GW/MME 221(#a) performs load distribution, the S-GW/MME 221(#b) may perform load distribution to relay the data without reestablishing a communication path. Thus, communications may be made efficient.

Fifth Embodiment

A fifth embodiment is described in portions different from those of the fourth embodiment. In the fifth embodiment, when an S-GW/MME 221(#b) to which data is distributed is in a congested state, the S-GW/MME 221(#b) further distributes the data.

(Operation in Load Distribution in Communication System According to Fifth Embodiment)

Figure 26A:
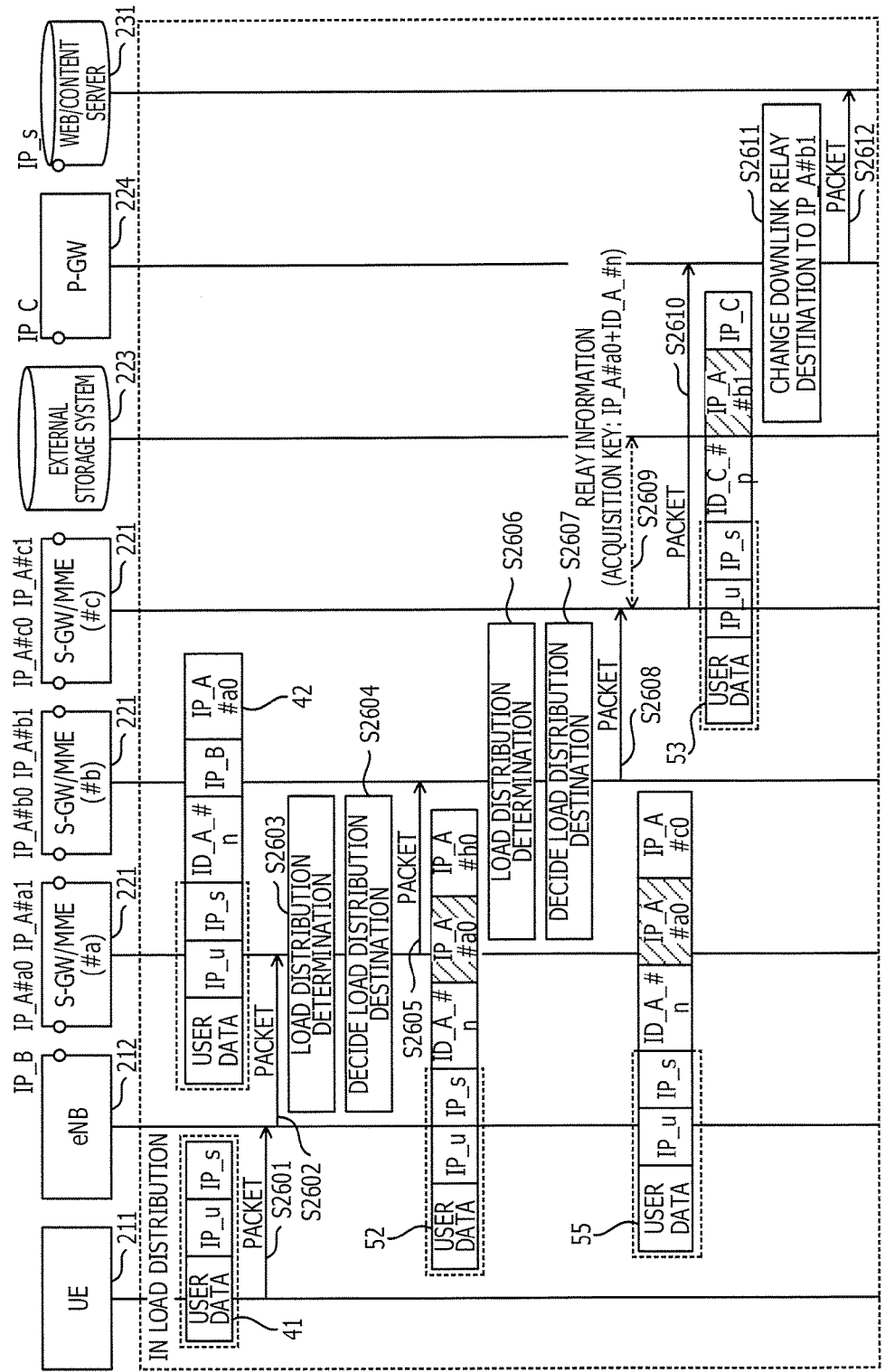
FIG. 26A is a sequential diagram (No. 1) illustrating an example of an operation in load distribution in a communication system according to a fifth embodiment.
Figure 26B:
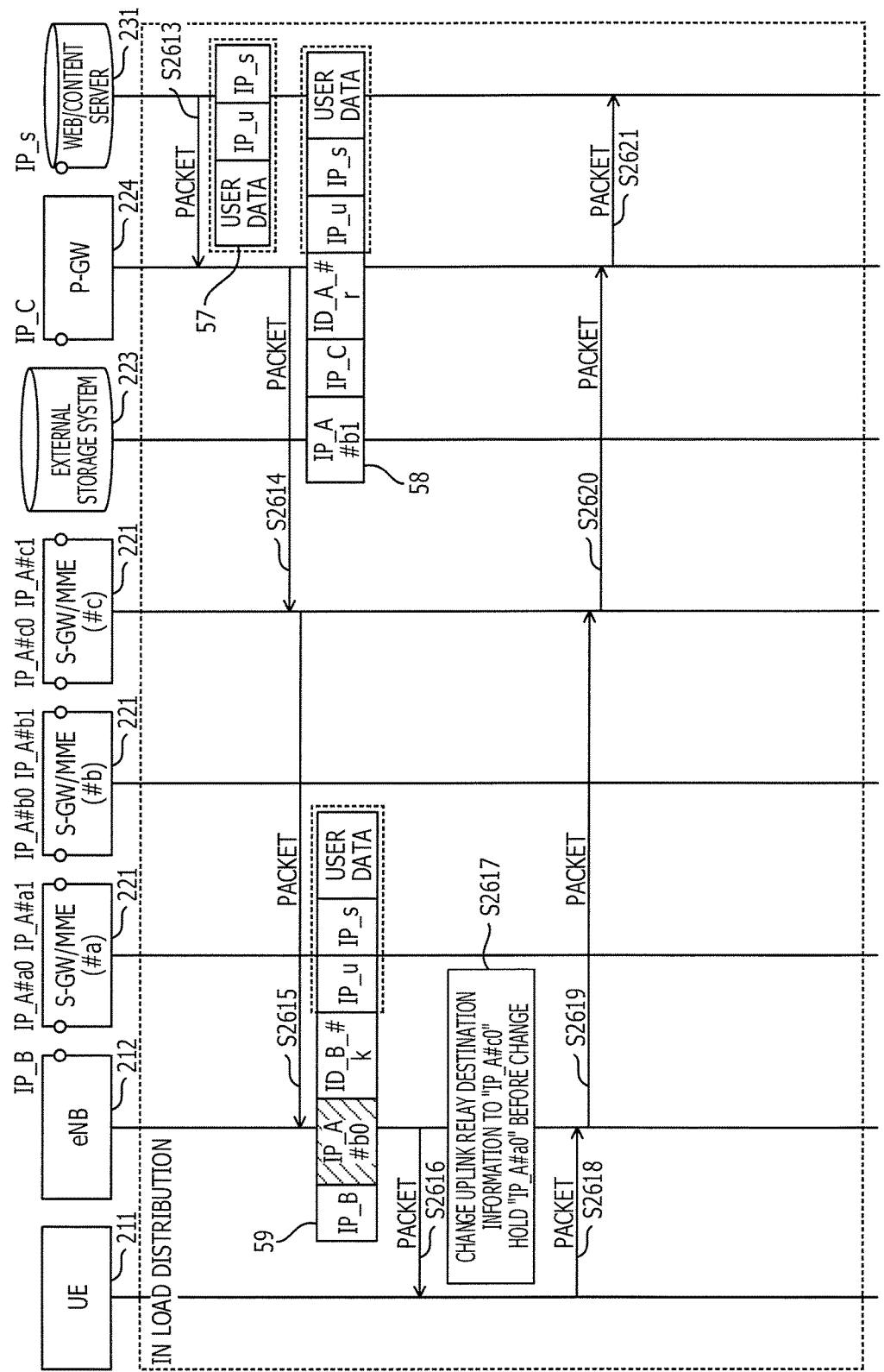
FIG. 26B is a sequential diagram (No. 2) illustrating an example of an operation in load distribution in the communication system according to the fifth embodiment.

FIG. 26A is a sequential diagram (No. 1) illustrating an example of an operation in load distribution in a communication system according to the fifth embodiment. FIG. 26B is a sequential diagram (No. 2) illustrating an example of an operation in load distribution in the communication system according to the fifth embodiment.

Steps S2601 to S2606 in FIG. 26A are same as steps S2201 to S2205 in FIG. 22A. After step S2605, the S-GW/MME 221(#b) determines if load distribution is performed (step S2606). In the example in FIG. 26A, the S-GW/MME 221(#b) determines that load distribution is performed because corresponding relay information (correspondence information) does not exist in its own internal storage 222 (cache) and congestion occurs in the S-GW/MME 221(#b).

Then, the S-GW/MME 221(#b) decides a load distribution destination (step S2607). It is assumed in the example in FIG. 26A that the 5-GW/MME 221(#b) decides an S-GW/MME 221(#c) as a load distribution destination.

After that, the S-GW/MME 221(#b) transmits a packet 61 to the S-GW/MME 221(#c) so as to distribute a packet 41 to the S-GW/MME 221(#c)(step S2608). In this manner, the S-GW/MME 221(#b) determines if load distribution is performed, and when it is determined that the load distribution is performed, S-GW/MME 221(#b) does not return the packet 41 but directly transmits a packet 53 to the S-GW/MME 221(#c).

Steps S2609 to S2612 in FIG. 26A are same as steps S507 to S510 in FIGS. 5A and 5B. Steps S2613 to S2616 in FIG. 26B are same as steps S516 to S519 in FIG. 5B.

After step S2616, an eNB 212 changes uplink relay information to an address (IP_A#c0) of an interface of the S-GW/MME 221(#c) and holds the address (IP_A#a0) of the interface of the S-GW/MME 221(#a) before the change (step S2617).

Steps S2618 to S2621 in FIG. 26B are same as steps S511 and S513 to S515 in FIG. 5B. At step S2619, the eNB 212 sets the address (IP_A#a0) held at step S2617 as a transmission source address of the packet including the packet 41 at step S2618.

(Processing Performed on Load Distribution Destination Node According to Fifth Embodiment)

Figure 27:
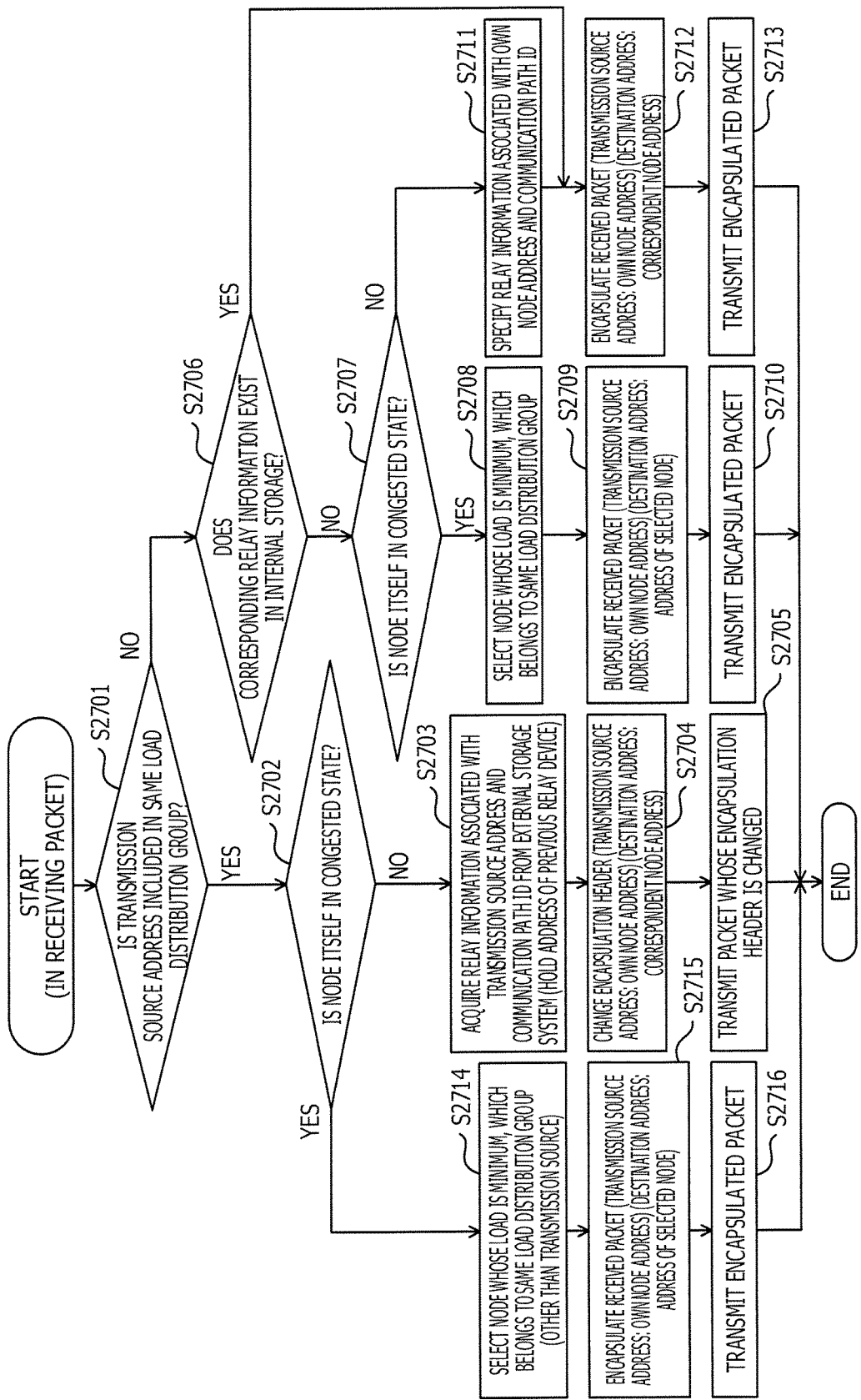
FIG. 27 is a flowchart illustrating example processing which is performed on a load distribution destination node according to the fifth embodiment.

FIG. 27 is a flowchart illustrating example processing which is performed on a load distribution destination node according to the fifth embodiment. In the examples in FIGS. 26A and 26B, each of the S-GW/MMEs 221(#a, #b) which is a load distribution destination node performs steps in FIG. 27 when a packet is received, for example. The S-GW/MME 221 first determines if the transmission source address of the received packet is included in a load distribution group same as that of the S-GW/MME 221 (step S2701).

At step S2701, when the transmission source address of the received packet is not included in the load distribution group (step S2701: No), the S-GW/MME 221 proceeds to step S2706. Steps S2706 to S2713 are same as steps S2305 to S2312 in FIG. 23. When the transmission source address of the received packet is included in the load distribution group (step S2701: Yes), the S-GW/MME 221 determines if the S-GW/MME 221 itself is in a congested state (step S2702). When the S-GW/MME 221 itself is not in a congested state (step S2702: No), the S-GW/MME 221 proceeds to step S2703. Steps S2703 to S2705 are same as steps S2302 to S2304 in FIG. 23.

At step S2702, when the S-GW/MME 221 itself is in a congested state (step S2702: Yes), the S-GW/MME 221 selects a node whose load is minimum, which is in the same load distribution group (step S2714). The node to be selected at step S2714 is a node other than the node in the transmission source of the received packet. For example, the eNB 212 performs the selection at step S2714 based on the load state information received from each of load distribution destination nodes (other S-GW/MMEs 221).

After that, the S-GW/MME 221(#a) extracts a user packet included in the received packet and adds an encapsulation header to the extracted user packet so as to encapsulate the received packet (step S2715). At this time, the S-GW/MME 221 uses the transmission source address of the encapsulation header as its own node address. Also, the S-GW/MME 221 uses the destination address of the encapsulation header as the address of the node selected at step S2714.

Then, the S-GW/MME 221 transmits the packet encapsulated at step S2715 (step S2716) and terminates a series of the processing. Accordingly, the S-GW/MME 221 may directly distribute the received packet distributed to the S-GW/MME 221 itself in a congested state to other node.

As described above, in the fifth embodiment, when the S-GW/MME 221(#b) to which data is distributed is in a congested state, the S-GW/MME 221(#b) sets the transmission source of the data to be distributed to the address of the S-GW/MME 221(#a). Accordingly, the S-GW/MME 221 (#c) may acquire the address in the relay destination from the external storage system 223 by using the address of the S-GW/MME 221(#a) and relay the data distributed from the S-GW/MME 221(#b) to the relay destination address.

Sixth Embodiment

Communication System According to Sixth Embodiment

Figure 28:
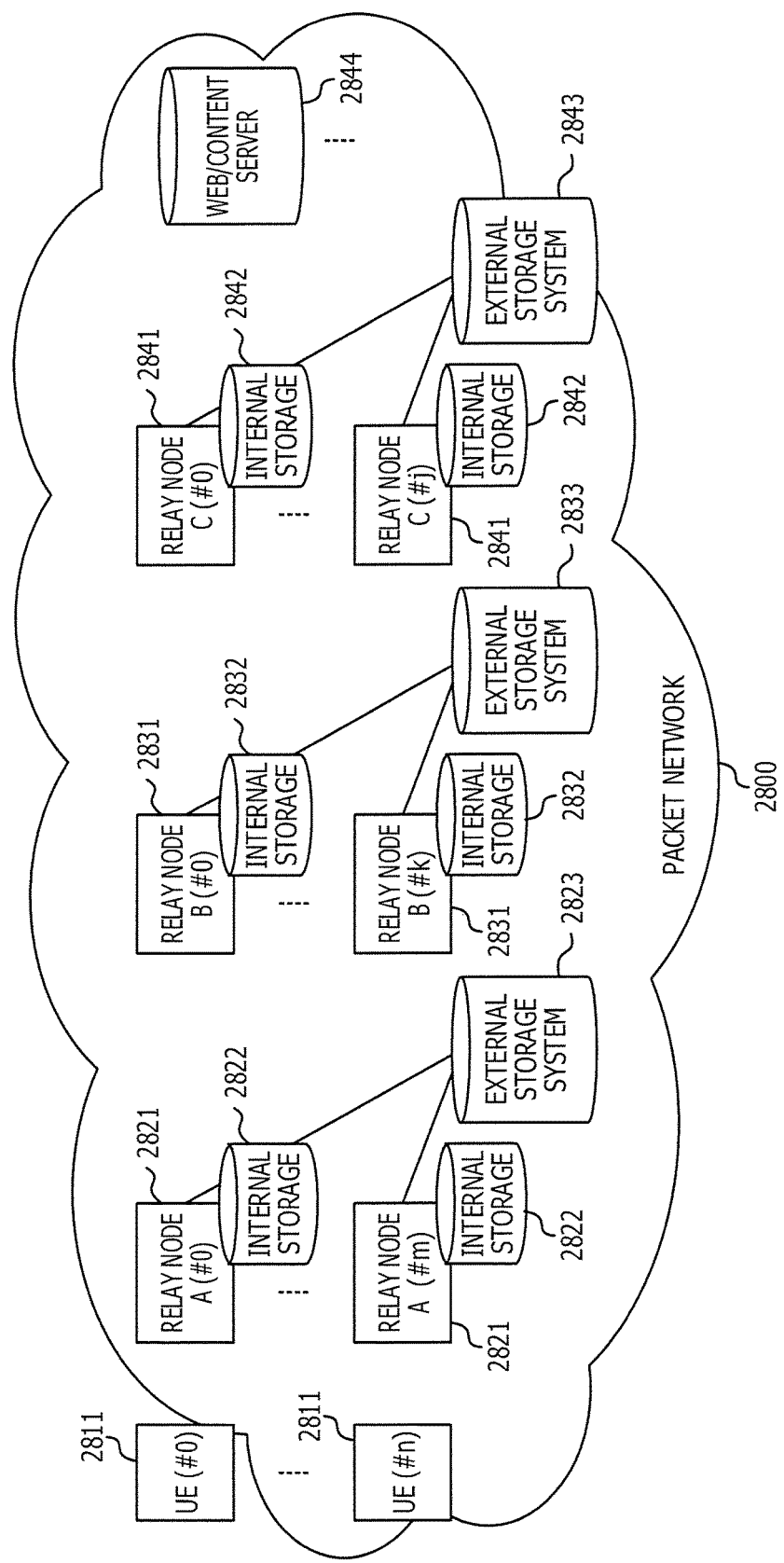
FIG. 28 is a diagram illustrating an example communication system according to a sixth embodiment.

FIG. 28 is a diagram illustrating an example communication system according to a sixth embodiment. In the above-described second to fifth embodiments, the communication system 200 of LTE is described. However, the communication system 200 in the first embodiment is not necessarily the LTE and is applicable to various kinds of communication systems in which a communication path is set by performing signaling each other between nodes, for example. The communication system 100 in FIGS. 1A to 1C may be applied to a packet network 2800 in FIG. 28.

The packet network 2800 includes UEs 2811(#0 to #n), relay nodes 2821, 2831, and 2841(#0 to #m, #0 to #k, #0 to #j), external storage systems 2823, 2833, and 2843, and a web/content server 2844.

The UEs 2811(#0 to #n) communicate with the web/content server 2844 through the relay nodes 2821, 2831, and 2841(#0 to #m, #0 to #k, #0 to #3). The relay nodes 2821(#0 to #m), the relay nodes 2831(#0 to #k), and the relay nodes 2841(#0 to #j) are relay nodes in different load distribution groups.

The internal storage 2822 is an internal storage of the relay node 2821(#0 to #m). The external storage system 2823 is provided in the outside of the relay node 2821(#0 to #m) and is an external storage system capable of being accessed from the relay nodes 2821(#0 to #m). The external storage system 2823 stores relay information which is used by the relay nodes 2821 (#0 to #m). The external storage system 2823 may be distribution database which is formed by multiple storage devices.

The internal storage 2832 is an internal storage of the relay node 2831(#0 to #k). The external storage system 2833 is provided in the outside of the relay node 2831(#0 to #k) and is an external storage system capable of being accessed from the relay nodes 2831(#0 to #k). The external storage system 2833 stores relay information which is used by the relay nodes 2831(#0 to #k). The external storage system 2833 may be distribution database which is formed by multiple storage devices.

The internal storage 2842 is an internal storage of the relay node 2811(#0 to #3). The external storage system 2843 is provided in the outside of the relay node 2841(#0 to #j) and is an external storage system capable of being accessed from the relay nodes 2841(#0 to #3). The external storage system 2843 stores relay information which is used by the relay nodes 2841 (#0 to #3). The external storage system 2843 may be distribution database which is formed by multiple storage devices.

Each of the communication devices in the communication system 100 in FIGS. 1A to 1C is applicable to any node in the packet network 2800. Also, for example, the communication device 110 may be applied to the relay node 2821, the communication devices 120 and 130 may be applied to the relay node 2831, and the communication device 140 may be applied to the relay node 2841. Furthermore, the communication devices 120 and 130 may be also applied to the relay node 2841 so as to have several-layered redundant configuration.

As described above, the communication system, the communication device, and the communication method may improve efficiency in communications.

For example, it has been discussed that control data to be used for relaying packets, which is conventionally held in an internal storage of a network service node, is put in an external storage, so that other network service nodes having a same function becomes possible to refer to the data. Reasons behind this are network function virtualization and an increase in the number of machine-to-machine (M2M) devices.

As for the network function virtualization, a network function which is achieved by dedicated hardware is caused to be software by an application to be mounted on a general-purpose server, so that a system cost may be reduced. Also, what is looked for is such architecture that context data of a user (for example, relay information) is developed on distribution database.

On the other hand, it is predicted that the number of mobile communication terminals becomes huge when M2M devices obtain full-scale popularity. Communication characteristics desired for the M2M devices vary from one another. Also, there are M2M devices whose allowable degree of delay is large. It is likely caused in the M2M devices that communications happen abruptly and in a burst manner by using a specific event as a trigger.

When a huge volume of service data (context data) which is accompanied with the increase in the M2M devices is held, a node configuration using the load database is suitable for securing scalability in a system level. In this case, since the external database is referred, the service delay is increased. However, this is effective to the M2M devices whose delay allowable degree is high.

As measures to reduce the service delay and load on database in which accesses are concentrated, cache of context data by a network application is possible. As described above, the distribution database may be configured so as to be capable of being accessed from the network applications which are deployed in a distributed manner for enhancing fault tolerance (service information handoff of a fault node). In a system using such distribution database, context data may be referred from same kinds of multiple applications. Therefore, it becomes easier to achieve load distribution of the same function of the application.

However, when the distribution architecture of a network function using a distributed BD is applied to a system, such as the 3rd generation partnership project (3GPP), in which local information is exchanged between nodes, following problems occur in load distribution.

That is to say, the distribution database holds context data unique to a network application (virtualized node) which is created in the signaling process and determined. Accordingly, even when a destination is simply changed and traffic is distributed to another network application in the same type in a conventional way, the context data which is used for transfer service is not acquired and utilized.

For this reason, normal relay processing is not performed in a load distribution destination, which causes an error delivery of a user packet, and, as a result of the error delivery, causes a loss. Accordingly, the quality of the communication services is deteriorated. On the other hand, the context data may be created when signaling activation is performed among the same kind of network applications in a distribution destination. However, signaling is generated by the load distribution and, thus, access load to the distribution database for storing new data is increased.

For this reason, the accesses to the distribution database become a burden, which becomes a bottleneck of scalability. Also, during the signaling, the packet transfer is stopped and buffering is desired, which increases a risk in a packet loss.

On the other hand, according to each of the above-described embodiments, in load distribution of a first station which acquires and relays relay information from an external device, an address of the first station is notified to a second station in a distribution destination. Accordingly, the second station may acquire and relay the relay information from an external device using the notified address.

Accordingly, in a case where the first station is in a congested state and relay information is not stored in a memory inside the first station, the second station may relay the data without reestablishing a communication path. Thus, an access to the external device when the first station is in a congested state is suppressed and communications may be made efficient.

For example, suppressing the load to be generated in reestablishing a communication path or making an access to an external device, a system with a larger capacity may be provided. Also, load of communications with context data in the cache is not distributed, so that the deterioration in the cache resource usage efficiency of the entire system may be suppressed. In addition, the list of the context data in the cache does not have to be created, so that increase in signal load between nodes may be suppressed. Moreover, back-pressure information transmission by the signal may be made unnecessary, so that the risk of packet loss which is caused by waiting until a relay path is changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system, comprising:
a first device including first circuitry configured to transmit first data;
a second device including second circuitry configured to receive the first data from the first circuitry of the first device;
a third device including third circuitry;
a fourth device including fourth circuitry; and
a storage device including fifth circuitry configured to store correspondence information which associates a first address of the second device and a second address of the third device, wherein
the second circuitry of the second device receives the first data from the first circuitry of the first device and determines whether the second device is in a first state or a second state, and,
when it is determined that the second device is in the first state,
the second circuitry of the second device notifies the storage device of the first address of the second device,
the storage device notifies the second circuitry of the second device of the second address of the third device associated with the first address of the second device based on the correspondence information, and the second circuitry of the second device transmits the first data to the third device using the second address notified by the storage device, and when it is determined that the second device is in the second state, the second circuitry of the second device transmits the first data to the fourth device, the second circuitry of the second device notifies the fourth device of the first address of the second device, the fourth circuitry of the fourth device receives the first data and notifies the storage device of the first address of the second device notified by the second device, the fifth circuitry of the storage device notifies the fourth device of the second address of the third device associated with the first address of the second device based on the correspondence information, and the fourth circuitry of the fourth device transmits the first data to the third device using the second address notified by the storage device.

2. The communication system according to claim 1, wherein the second device includes a data storage, the first state is at least one of a state where the correspondence information is stored in the data storage and a state where the second device is not in a predetermined congested state, and the second state is a state where the correspondence information is not stored in the data storage and the second device is in the predetermined congested state.

3. The communication system according to claim 1, further comprising:

a first communication path coupling the first device and the second device and a second communication path coupling the second device and the third device, wherein the correspondence information associates a combination of the first address of the second device and an identifier of the first communication path with a combination of the second address of the third device and an identifier of the second communication path, and when the second device is in the first state, the second circuitry of the second device notifies the storage device of the first address of the second device and the identifier of the first communication path, and the fifth circuitry of the storage device notifies the second device of the second address of the third device and the identifier of the second communication path associated with the first address of the second device and the identifier of the first communication path based on the correspondence information, when the second device is in the second state, the second circuitry of the second device transmits the first data to the fourth device, and notifies the fourth device of the first address of the second device and the identifier of the first communication path, the fourth circuitry of the fourth device notifies the storage device of the first address of the second device and the identifier of the first communication path, and the fifth circuitry of the storage device notifies the fourth device of the second address of the third device and the identifier of the second communication path associated with the first address of the second device and the identifier of the first communication path based on the correspondence information.

4. The communication system according to claim 1, wherein in the second state, the second circuitry of the second device transmits the first data to the fourth device through the first device, and notifies the fourth device of the first address of the second device through the first device.

5. The communication system according to claim 4, wherein in the second state, the second circuitry of the second device returns the first data to the first device with the first address of the second device set as a transmission source address, and the first circuitry of the first device transmits the first data returned from the second device to the fourth device with the first address of the second device set as the transmission source address.

6. The communication system according to claim 5, wherein after transmitting the first data returned from the second device to the fourth device, the first circuitry of the first device transmits second data through the first communication path designated as a communication path to the fourth device with the first address of the second device set as the transmission source address, instead of transmitting the second data to the second device.

7. The communication system according to claim 4, further comprising:

a fifth device including sixth circuitry coupled to the first device, wherein the sixth circuitry of the fourth device returns, to the first device, the first data transmitted from the second device through the first device when the fourth device is in a predetermined congested state, the first circuitry of the first device transmits the first data returned from the fourth device to the fifth device with the first address of the second device set as the transmission source address, the sixth circuitry of the fifth device notifies the storage device of the first address of the second device, the fifth circuitry of the storage device notifies the fifth device of the second address of the third device associated with the first address of the second device based on the correspondence information, and the sixth circuitry of the fifth device transmits the first data to the second address of the third device.

8. The communication system according to claim 1, wherein in the second state, the second circuitry of the second device transmits the first data and the first address of the second device to the fourth device not through the first device.

9. The communication system according to claim 8, wherein in the second state, the second circuitry of the second device transmits the first data with the first address of the second device set as the transmission source address.

10. The communication system according to claim 9, wherein after the first data is transmitted from the second device to the fourth device, the first circuitry of the first device transmits third data, designating the first communication path as a communication path, to the fourth device without transmitting the third data to the second device with the first address of the second device set as the transmission source address.

11. The communication system according to claim 8, further comprising:
a sixth device including seventh circuitry coupled to the fourth device, wherein
when the fourth device is in a predetermined congested state, the fourth circuitry of the fourth device transmits the first data transmitted from the second device to the sixth device with the first address of the second device set as the transmission source address,
the seventh circuitry of the sixth device notifies the storage device of the first address of the second device,
the fifth circuitry of the storage device notifies the sixth device of the second address of the third device associated with the first address of the second device based on the correspondence information, and
the seventh circuitry of the sixth device transmits the first data to the second address of the third device.

12. The communication system according to claim 1, wherein
when receiving the first data through the fourth device, the third circuitry of the third device transmits fourth data to the fourth device, and
the fourth circuitry of the fourth device transmits the third data to the first device.

13. A communication method using a first device configured to transmit first data, a second device configured to receive the first data from the first device, a third device, a fourth device, and a storage device configured to store correspondence information which associates a first address of the second device and a second address of the third device, the method comprising:
receiving, from the first device, the first data by the second device;
determining whether the second device is in a first state or a second state; and
when it is determined that the second device is in the first state,
notifying the storage device of the first address of the second device by the second device;
notifying, by the storage device, the second device of the second address of the third device associated with the first address of the second device based on the correspondence information; and
transmitting the first data from the second device to the third device using the second address notified by the storage device, and
when it is determined that the second device is in the second state,
transmitting the first data to the fourth device;
notifying the fourth device of first address of the second device from the second device;
receiving the first data by the fourth device;
notifying the storage device of the first address of the second data by the fourth device notified by the second device;
notifying, by the storage device, the fourth device of the second address of the third device associated with the first address of the second device based on the correspondence information; and
transmitting the first data to the third device from the fourth device using the second address notified by the storage device.

14. The communication method according to claim 13, wherein
the second device includes a data storage,
the first state is at least one of a state where the correspondence information is stored in the data storage and a state where the second device is not in a predetermined congested state, and
the second state is a state where the correspondence information is not stored in the data storage and the second device is in the predetermined congested state.

15. The communication method according to claim 13, a first communication path coupling the first device and the second device, a second communication path coupling the second device and the third device, and the correspondence information associates a combination of the first address of the second device and an identifier of the first communication path with a combination of the second address of the third device and an identifier of the second communication path, the method further comprising:
in the first state,
notifying, by the second device, the storage device of the first address of the second device and the identifier of the first communication path; and
notifying, by the storage device, the second device of the second address of the third device and the identifier of the second communication path associated with the first address of the second device and the identifier of the first communication path based on the correspondence information,
in the second state,
transmitting the first data from the second device to the fourth device, notifying, by the second device, the fourth device of the first address of the second device and the identifier of the first communication path;
notifying, by the fourth device, the storage device of the first address of the second device and the identifier of the first communication path; and
notifying, by the storage device, the fourth device of the second address of the third device and the identifier of the second communication path associated with the first address of the second device and the identifier of the first communication path based on the correspondence information.

16. The communication method according to claim 13, further comprising:
in the second state,
transmitting the first data from the second device to the fourth device through the first device; and
notifying by the second device, the fourth device of the first address of the second device through the first device.

17. The communication method according to claim 16, further comprising:
in the second state,
returning the first data from the second device to the first device with the first address of the second device set as a transmission source address; and
transmitting the first data from the first device to the fourth device with the first address of the second device set as the transmission source address.

18. The communication method according to claim 17, further comprising:
after transmitting the first data returned from the second device to the fourth device, transmitting second data from the first device through the first communication path designated as a communication path to the fourth device with the first address of the second device set as the transmission source address, instead of transmitting the second data to the second device.

\* \* \* \* \*